(12) United States Patent
Lee

(10) Patent No.: US 12,168,291 B2
(45) Date of Patent: Dec. 17, 2024

(54) METHOD AND SYSTEM FOR CONTROLLING CLEANING ROBOT

(71) Applicant: SAMSUNG ELECTRONICS CO., LTD., Suwon-si (KR)

(72) Inventor: Kunyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 17/703,215

(22) Filed: Mar. 24, 2022

(65) Prior Publication Data

US 2022/0347862 A1    Nov. 3, 2022

Related U.S. Application Data

(63) Continuation of application No. PCT/KR2022/003605, filed on Mar. 15, 2022.

(30) Foreign Application Priority Data

May 3, 2021   (KR) .......................... 10-2021-0057478

(51) Int. Cl.
| | | |
|---|---|---|
| *B25J 11/00* | (2006.01) | |
| *B25J 13/00* | (2006.01) | |
| *G05D 1/00* | (2024.01) | |
| *G06F 3/0482* | (2013.01) | |

(Continued)

(52) U.S. Cl.
CPC ......... *B25J 13/006* (2013.01); *B25J 11/0085* (2013.01); *G06F 3/0482* (2013.01); *G06F 3/04847* (2013.01)

(58) Field of Classification Search
CPC .... B25J 13/006; B25J 11/0085; B25J 11/008; G06F 3/0482; G06F 3/04847; G05D 1/0016; H04L 12/282; H04L 12/2825
See application file for complete search history.

(56) References Cited

U.S. PATENT DOCUMENTS 10,265,858 B2 *   4/2019   Yoon ...................... B25J 9/1697
2015/0279205 A1 * 10/2015   Arling .................. G06F 3/0486
                                                            340/12.54

(Continued)

FOREIGN PATENT DOCUMENTS

| JP | 2019-634 A |   | 1/2019 |
| KR | 20190003157 A | * | 6/2017 |

(Continued)

OTHER PUBLICATIONS

International Search Report dated Jun. 16, 2022, issued in PCT Application No PCT/KR2022/003605.

*Primary Examiner* — Adam R Mott
*Assistant Examiner* — Heather J Keniry
(74) *Attorney, Agent, or Firm* — STAAS & HALSEY LLP

(57) ABSTRACT

A method, performed by a server device, of controlling a cleaning robot includes: receiving a first user input related to the cleaning robot, through a first home appliance; identifying a first scenario corresponding to the received first user input, from a scenario list defining operations of the cleaning robot; identifying a control command including movement position information indicating a destination of the cleaning robot, based on the identified first scenario; and transmitting the identified control command to the cleaning robot.

20 Claims, 31 Drawing Sheets

(51) Int. Cl.
*G06F 3/04847* (2022.01)
*H04L 12/28* (2006.01)

(56) References Cited

U.S. PATENT DOCUMENTS

| | | | |
|---|---|---|---|
| 2016/0013980 A1* | 1/2016 | Mcknight | H04L 67/568 |
| | | | 709/221 |
| 2016/0372138 A1* | 12/2016 | Shinkai | G10L 25/66 |
| 2017/0144311 A1* | 5/2017 | Yoon | B25J 9/1697 |
| 2018/0157266 A1* | 6/2018 | Xie | G05D 1/0297 |
| 2018/0360285 A1 | 12/2018 | Erkek et al. | |
| 2020/0134995 A1 | 4/2020 | Lee et al. | |
| 2022/0095872 A1* | 3/2022 | Bassa | G06V 10/82 |

FOREIGN PATENT DOCUMENTS

| | | |
|---|---|---|
| KR | 10-2019-0003157 A | 1/2019 |
| KR | 10-2014057 B1 | 8/2019 |
| KR | 10-2045385 B1 | 11/2019 |
| KR | 10-2094347 B1 | 3/2020 |
| KR | 10-2020-0049189 | 5/2020 |
| KR | 20210137807 A * | 5/2020 |

\* cited by examiner

METHOD AND SYSTEM FOR CONTROLLING CLEANING ROBOT

CROSS-REFERENCE TO RELATED APPLICATIONS

This application is a continuation application filed under 35 U.S.C. § 111(a), of International Application PCT/KR2022/003605, filed Mar. 15, 2022, it being further noted that foreign priority benefit is based upon Korean patent application 10-2021-0057478, filed May 3, 2021, in the Korean Intellectual Property Office, the disclosures of which are incorporated by reference herein in their entireties.

BACKGROUND ART

1. Field

Various embodiments of the disclosure relate to a method and a system for controlling a cleaning robot based on a scenario created by using an idle button of a home appliance. In addition, various embodiments of the disclosure relate to a method and a system for distributed processing of information obtained by a cleaning robot by using an idle resource of a home appliance.

2. Description of Related Art

Internet of Things (IoT) is the base technology and service of a hyper-connected society and the next-generation Internet. IoT is defined as Internet of Things or Internet of Objects, and refers to an environment in which information generated by uniquely identifiable objects is shared through the Internet.

Internet-connected devices (e.g., IoT devices) use their built-in sensors to collect data, and operate according to the data. IoT devices are useful for improving the way people work and live. IoT devices are being applied in various fields, from smart home devices that automatically control heating and lighting to smart factories that monitor industrial equipment to automatically find and resolve issues.

In particular, in recent years, home appliance products have tended to pursue a combination with IoT in order to strengthen hygiene-related functions. Humidifiers, dehumidifiers, air purifiers, air circulators, etc. are combined with IoT functions, so as to automatically optimize indoor environments by analyzing whether a user is staying indoors, the indoor and outdoor levels of fine dust, etc.

Cleaning robots may also be used as IoT devices. For example, in a case where a cleaning robot is connected to the Internet, a user may remotely control the cleaning robot from the outside by using a mobile terminal even when the user is not indoors, and may also schedule a cleaning time by using the mobile terminal. Accordingly, the use of cleaning robots has been increasing in recent years.

SUMMARY

Aspects of various embodiments of the disclosure will be set forth in part in the description which follows and, in part, will be apparent from the description, or may be learned by practice of the embodiments.

According to an embodiment of the disclosure, a method, performed by a server device, of controlling a cleaning robot may include: receiving a first user input related to the cleaning robot, through a first home appliance; identifying a first scenario corresponding to the received first user input, from a scenario list defining operations of the cleaning robot; identifying a control command including movement position information indicating a destination of the cleaning robot, based on the identified first scenario; and transmitting the identified control command to the cleaning robot.

According to an embodiment of the disclosure, the first user input may include an input related to an idle button of the first home appliance, the idle button being not matched to an original function provided by the first home appliance.

According to an embodiment of the disclosure, the first scenario may include at least one operation of the cleaning robot, the at least one operation corresponding to the input related to the idle button of the first home appliance.

According to an embodiment of the disclosure, the identified control command may include a command to clean a first area within a preset distance from the first home appliance, and the method may further include transmitting, to the first home appliance, a cleaning completion message with respect to the first area, according to a cleaning completion message of the cleaning robot.

According to an embodiment of the disclosure, the method may further include obtaining information about idle buttons of at least one home appliance; and providing a user with a plurality of recommended scenarios in which each idle button of the idle buttons is matched to an operation of the cleaning robot, through a display device. According to an embodiment of the disclosure, the method may further include receiving an input of selecting a second scenario related to an idle button of a second home appliance from among the plurality of recommended scenarios, through the display device; and adding the selected second scenario to the scenario list.

According to an embodiment of the disclosure, the method may further include providing a display device with a scenario setting window comprising a list of a plurality of home appliances, a list of idle buttons, and an operation list of the cleaning robot; receiving an input of setting a second scenario related to an idle button of a second home appliance, through the scenario setting window; and adding the second scenario to the scenario list. According to an embodiment of the disclosure, the providing a display device with a scenario setting window may further including obtaining, from the cleaning robot, idle button information of a third home appliance which is not connected to the server device; and adding, to the scenario setting window, identification information of the third home appliance and the obtained idle button information of the third home appliance.

According to an embodiment of the disclosure, the method may further include receiving, from the cleaning robot, a distributed processing request on at least one of image information and sensing information; checking idle resource information of a plurality of home appliances according to the received distributed processing request; selecting a second home appliance from among the plurality of home appliances, based on the checked idle resource information of the plurality of home appliances; and requesting the second home appliance for distributed processing for the at least one of the image information and the sensing information.

According to an embodiment of the disclosure, the method may further including receiving, from the second home appliance, a result of the distributed processing of the at least one of the image information and the sensing information; and transmitting, to the cleaning robot, the received result of the distributed processing of the at least one of the image information and the sensing information.

According to an embodiment of the disclosure, a server device may include: a communication interface configured to communicate with at least one home appliance and a cleaning robot; a memory storing one or more instructions; and at least one processor connected to the memory, and the at least one processor may be configured to execute the one or more instructions to: receive a first user input related to the cleaning robot, through a first home appliance of the at least one home appliance; identify a first scenario corresponding to the received first user input, from a scenario list defining operations of the cleaning robot; identify a control command including movement position information indicating a destination of the cleaning robot, based on the identified first scenario; and transmit the identified control command to the cleaning robot through the communication interface. According to an embodiment of the disclosure, the first user input may include an input related to an idle button of the first home appliance, the idle button being not matched to an original function provided by the first home appliance. According to an embodiment of the disclosure, the identified control command may include a command to clean a first area within a preset distance from the first home appliance, and the at least one processor may further be configured to execute the one or more instructions to transmit, to the first home appliance through the communication interface, a cleaning completion message with respect to the first area, according to a cleaning completion message of the cleaning robot.

According to an embodiment of the disclosure, the at least one processor may further be configured to execute the one or more instructions to: obtain information about idle buttons of the at least one home appliance; and provide a user with a plurality of recommended scenarios in which each idle button of the idle buttons is matched to an operation of the cleaning robot, through a display device. According to an embodiment of the disclosure, the at least one processor may further be configured to execute the one or more instructions to: receive an input of selecting a second scenario related to an idle button of a second home appliance from among the plurality of recommended scenarios, through the display device; and add the selected second scenario to the scenario list.

According to an embodiment of the disclosure, the at least one processor may further be configured to execute the one or more instructions to: provide a display device with a scenario setting window comprising a list of a plurality of home appliances, a list of idle buttons, and an operation list of the cleaning robot; receive an input of setting a second scenario related to an idle button of a second home appliance, through the scenario setting window; and add the second scenario to the scenario list. According to an embodiment of the disclosure, the at least one processor may further be configured to execute the one or more instructions to: obtain, from the cleaning robot through the communication interface, idle button information of a third home appliance which is not connected to the server device; and add, to the scenario setting window, identification information of the third home appliance and the idle button information of the third home appliance.

According to an embodiment of the disclosure, the at least one processor may further be configured to execute the one or more instructions to: receive, from the cleaning robot through the communication interface, a distributed processing request for at least one of image information and sensing information; check idle resource information of a plurality of home appliances according to the received distributed processing request; select a second home appliance from among the plurality of home appliances, based on the checked idle resource information of the plurality of home appliances; and request, through the communication interface, the selected second home appliance for distributed processing of the at least one of the image information and the sensing information. According to an embodiment of the disclosure, the at least one processor may further be configured to execute the one or more instructions to: receive, from the second home appliance through the communication interface, a result of the distributed processing of the at least one of the image information and the sensing information; and transmit, to the cleaning robot through the communication interface, the received result of the distributed processing of the at least one of the image information and the sensing information.

According to an embodiment of the disclosure, a non-transitory computer-readable recording medium may have stored a program that, when executed by at least one processor, causes a server device to: receive a first user input related to a cleaning robot, through a first home appliance; identify a first scenario corresponding to the received first user input, from a scenario list defining operations of the cleaning robot; identify a control command including movement position information of the cleaning robot, based on the identified first scenario; and transmit the identified control command to the cleaning robot.

BRIEF DESCRIPTION OF DRAWINGS

The above and other aspects, features, and advantages of embodiments of the disclosure will be more apparent from the following description taken in conjunction with the accompanying drawings, in which.

DETAILED DESCRIPTION

Figure 1:
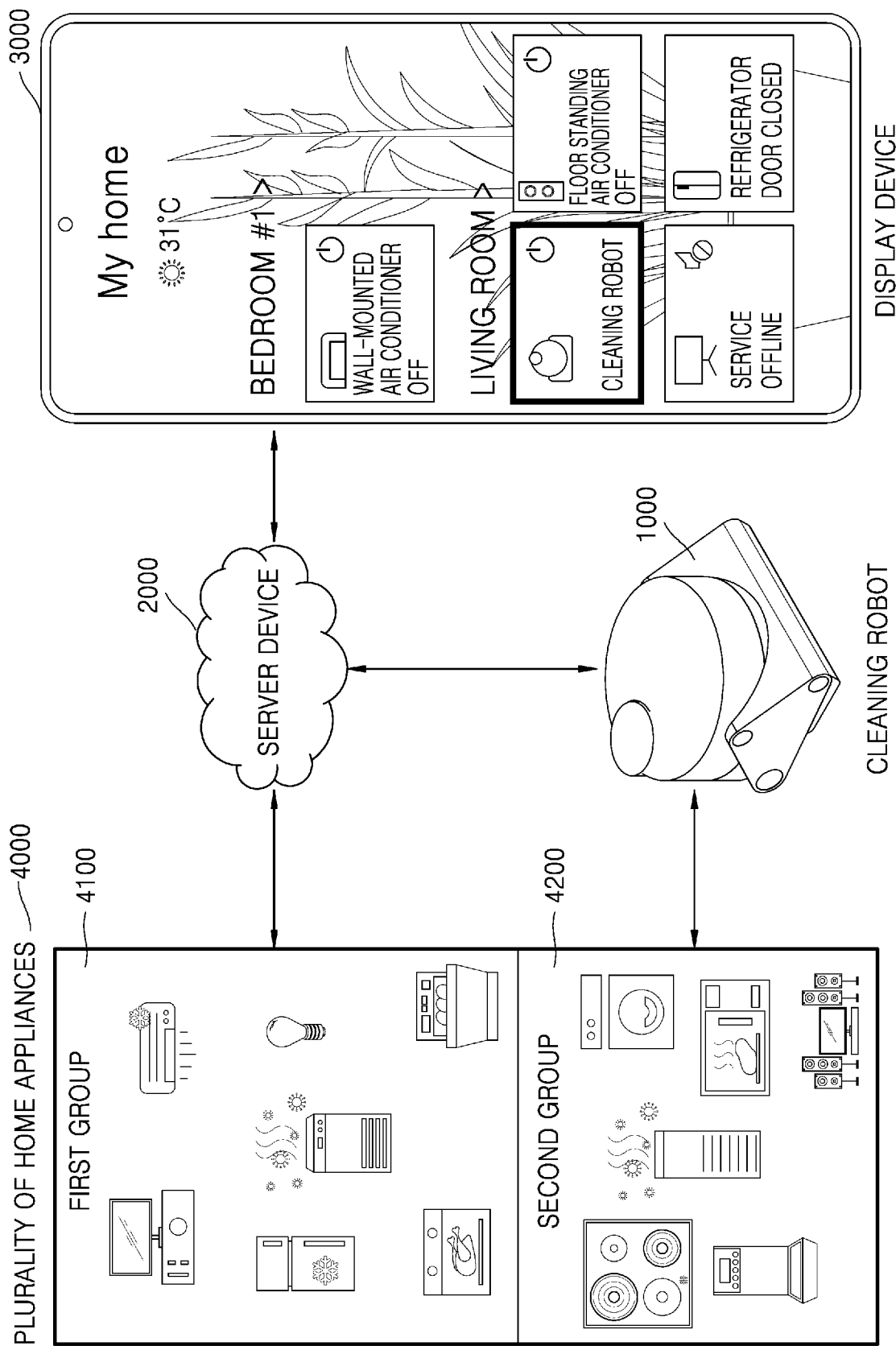
FIG. 1 is a diagram illustrating a system for controlling a cleaning robot, according to an embodiment of the disclosure.

Throughout the disclosure, the expression "at least one of a, b or c" indicates only a, only b, only c, both a and b, both a and c, both b and c, all of a, b, and c, or variations thereof.

The terms as used herein will be briefly described and the disclosure will be described in detail below.

The terms as used herein are those general terms currently widely used in the art by taking into account functions in the disclosure, but the terms may vary according to the intention of those of ordinary skill in the art, precedents, or new technology in the art. Moreover, terms may be arbitrarily selected, and in this case, the detailed meaning thereof will be described in or will be understood from the description in the disclosure. Therefore, the terms as used herein should be understood not as simple names but based on the meaning of the terms and the overall description of the disclosure.

Throughout the specification, when a part "includes" an element, it is to be understood that the part may additionally include other elements rather than excluding other elements as long as there is no particular opposing recitation. Also, the terms such as " . . . er (or)", " . . . unit", " . . . module", etc., used herein denote a unit that performs at least one function or operation, which may be implemented as hardware or software or a combination thereof.

Throughout the specification, terms such as first, second, etc. may be used herein to describe various components. However, these components should not be limited by these terms, and the terms are only used to distinguish one component from another.

Hereinafter, embodiments of the disclosure will now be described in detail with reference to the accompanying drawings for one of skill in the art to be able to perform the disclosure without any difficulty. The disclosure may, however, be embodied in many different forms and should not be construed as being limited to the embodiments of the disclosure set forth herein. Also, parts in the drawings unrelated to the detailed description are omitted to ensure clarity of the disclosure, and like reference numerals in the drawings denote like elements.

Various embodiments of the disclosure provide a method, performed by a server device, of controlling a cleaning robot, and a system for controlling a cleaning robot. Specifically, an embodiment of the disclosure provides a method and a system for controlling a cleaning robot based on a scenario created by using an idle button of a home appliance in a house. Another embodiment of the disclosure provides a method and a system for distributed processing for image information of a cleaning robot by using an idle resource of a home appliance in a house.

FIG. 1 is a diagram illustrating a system for controlling a cleaning robot 1000, according to an embodiment of the disclosure.

Referring to FIG. 1, a system for controlling a cleaning robot (hereinafter, referred to as a cleaning robot control system) according to an embodiment of the disclosure includes the cleaning robot 1000, a server device 2000, a display device 3000, and a plurality of home appliances 4000. However, all components shown in FIG. 1 are not indispensable components of the cleaning robot control system. The cleaning robot control system may be implemented by more components than the components shown in FIG. 1, or by fewer components than the components shown in FIG. 1. For example, the cleaning robot control system may be implemented by the cleaning robot 1000 and the plurality of home appliances 4000, may be implemented by the cleaning robot 1000, the server device 2000, and the plurality of home appliances 4000, or may be implemented by the cleaning robot 1000 and the server device 2000. Each component will be described below.

The cleaning robot 1000 according to an embodiment of the disclosure is a robotic device capable of moving by itself using wheels, etc., and may perform a cleaning operation while moving in a cleaning space. The cleaning space may be, for example, a space requiring cleaning, such as a house or an office.

The cleaning robot 1000 may search an indoor space by using at least one sensor and generate an indoor space map. The indoor space may refer to an area in which the cleaning robot 1000 is substantially freely movable. For example, the indoor space map may include data regarding at least one of, for example, a navigation map used for driving during cleaning, a simultaneous localization and mapping (SLAM) map used for position recognition, or an obstacle recognition map on which information about a recognized obstacle is recorded. According to an embodiment of the disclosure, the indoor space map may include a plurality of cleaning areas (e.g., a living room, a kitchen, Room #1, Room #2, etc.) divided by the cleaning robot 1000. According to an embodiment of the disclosure, the indoor space map may include position information of the plurality of home appliances 4000. The cleaning robot 1000 may estimate the position of the plurality of home appliances 4000 based on at least one of image information obtained through a camera, obstacle information obtained by a three-dimensional (3D) sensor or a lidar sensor, or communication strength of the home appliance. The indoor space map may be updated whenever the cleaning robot 1000 performs a cleaning operation.

According to an embodiment of the disclosure, the cleaning robot 1000 may be equipped with an artificial intelligence (AI) processor. The AI processor may be manufactured in the form of a dedicated hardware chip for AI, or may be manufactured as part of an existing general-purpose processor (e.g., a central processing unit (CPU) or an application processor) or a dedicated graphics processor (e.g., a graphics processing unit (GPU)), and mounted on the cleaning robot 1000. The cleaning robot 1000 may use the AI processor to plan a cleaning route or an operation mode. For example, the cleaning robot 1000 may use the AI processor to adjust suction strength according to an amount of dust in a room or a material of a floor. The cleaning robot 1000 may also use the AI processor to set an intensive cleaning area. Also, the cleaning robot 1000 may change the cleaning route according to the position of an obstacle, and may return to a charging station according to the remaining battery level.

According to an embodiment of the disclosure, the cleaning robot 1000 may include a communication interface for communicating with an external device. For example, the cleaning robot 1000 may communicate with the server device 2000 or the plurality of home appliances 4000 through the communication interface. The communication interface may include a short-range communication interface, a mobile communication interface, and the like. The short-range wireless communication interface may include, but is not limited to, a Bluetooth communication interface, a Bluetooth Low Energy (BLE) communication interface, a near-field communication interface, a wireless local access network (WLAN) (Wi-Fi) communication interface, a Zigbee communication interface, an infrared data association (IrDA) communication interface, a Wi-Fi direction (WFD) communication interface, an ultra-wideband (UWB) communication interface, an Ant+ communication interface, etc.

According to an embodiment of the disclosure, the cleaning robot 1000 may receive a control command from the server device 2000 and perform a cleaning operation according to the control command. Here, according to an embodiment of the disclosure, the cleaning operation of the cleaning robot 1000 may be matched to an input related to an idle button of a home appliance. The idle button may refer to a manipulation (or an input pattern) of a certain button which is not matched to at least one function provided by the home appliance. An operation, performed by the cleaning robot 1000, of receiving a control command from the server device 2000 will be described below in detail with reference to FIG. 2.

According to an embodiment of the disclosure, the cleaning robot 1000 may communicate with a nearby home appliance while moving along the cleaning route. The cleaning robot 1000 may share, with the home appliance, information related to a surrounding cleaning state of the home appliance, and may obtain idle resource information of the home appliance. Also, the cleaning robot 1000 may request distributed processing for image information (or sensing information) from the home appliance. In this case, the cleaning robot 1000 may request distributed processing for image information (or sensing information) from the home appliance directly through short-range wireless communication (e.g., Wi-Fi Direct), or through the server device 2000. An operation, performed by the cleaning robot 1000, of performing distributed processing for image information (or sensing information) with an external home appliance will be described below in detail with reference to FIGS. 19 to 21.

The server device 2000 according to an embodiment of the disclosure may include an AI processor. The AI processor may train an artificial neural network to generate an AI model for providing a recommended scenario by using an idle button of a home appliance. The 'training' of the artificial neural network may mean constructing, by appropriately changing weights based on data, a mathematical model in which connections of neurons constituting the artificial neural network may make an optimal decision.

According to an embodiment of the disclosure, the server device 2000 may include a communication interface for performing communication with an external device. For example, the server device 2000 may communicate with the cleaning robot 1000, the plurality of home appliances 4000, or the display device 3000. According to an embodiment of the disclosure, the cleaning robot 1000 may transmit identification information of the cleaning robot 1000 or identification information (e.g., login information or account information) of the user, to the server device 2000. As the identification information of the cleaning robot 1000 or the identification information of the user is authenticated by the server device 2000, the cleaning robot 1000 may access the server device 2000.

According to an embodiment of the disclosure, the server device 2000 may collect information of the plurality of home appliances 4000 or the cleaning robot 1000. For example, when the plurality of home appliances 4000 and the cleaning robot 1000 are registered in the server device 2000, the server device 2000 may obtain information about idle buttons of the plurality of home appliances 4000 and the cleaning robot 1000. The server device 2000 may receive sensing information collected by the plurality of home appliances 4000. The server device 2000 may receive the sensing information from the plurality of home appliances 4000 periodically or when a certain event occurs. The server device 2000 may receive information related to a cleaning state from the cleaning robot 1000. For example, the server device 2000 may receive, from the cleaning robot 1000, a cleaning completion message, a cleaning stop message, a cleaning start message, an image of a cleaning route, and the like.

Meanwhile, according to an embodiment of the disclosure, the server device 2000 may monitor the state of the plurality of home appliances 4000 or the state of the cleaning robot 1000. For example, the server device 2000 may monitor idle resource information of the plurality of home appliances 4000 and may monitor the position of the cleaning robot 1000.

The display device 3000 according to an embodiment of the disclosure may be a device that is connected to the server device 2000 and is configured to display information provided by the server device 2000. According to an embodiment of the disclosure, the display device 3000 may transmit and receive information to and from the server device 2000 through a predefined application installed in the display device 3000. According to an embodiment of the disclosure, the predefined application may be an application that provides a function of allowing the user to check information of the cleaning robot 1000 or the plurality of home appliances 4000 or to remotely control the cleaning robot 1000 or the plurality of home appliances 4000.

According to an embodiment of the disclosure, the display device 3000 may be a device connected to the server device 2000 with the same account information as that of the cleaning robot 1000. The display device 3000 may be connected to the cleaning robot 1000 directly through a short-range communication link or indirectly through the server device 2000.

The display device 3000 according to an embodiment of the disclosure may be implemented in various forms. For example, the display device 3000 described in the disclosure may be, but is not limited to, a mobile terminal, a refrigerator including a display, a television (TV), a computer, an oven including a display, or the like. In addition, the mobile terminal may be, but is not limited to, a smart phone, a laptop computer, a tablet personal computer (PC), a digital camera, an electronic book (e-book) terminal, a digital broadcasting terminal, a personal digital assistant (PDA), a portable multimedia player (PMP), a navigation system, an MP3 player, or the like. For example, the mobile terminal may be a wearable device that may be worn by a user. The wearable device may include at least one of an accessory-type device (e.g., a watch, a ring, a cuff band, an ankle band, a necklace, spectacles, and a contact lens), a head-mounted device (HMD), a textile- or garment-integrated device (e.g. an electronic garment), a body attachment device (e.g., a skin pad), or a bioimplantable device (e.g., an implantable circuit). Hereinafter, for convenience of description, the case where the display device 3000 is a smart phone will be described as an example.

According to an embodiment of the disclosure, the cleaning robot 1000 or the display device 3000 may receive a voice signal, which is an analog signal, through a microphone, and convert a voice part into computer-readable text by using an automatic speech recognition (ASR) model. The cleaning robot 1000 or the display device 3000 may interpret the converted text by using a natural language understanding (NLU) model to obtain an utterance intention of the user. Here, the ASR model or the NLU model may be an AI model. The AI model may be processed by an AI-dedicated processor designed with a hardware structure specialized for processing the AI model. The AI model may be generated through training. Here, generating the AI model through training means generating a predefined operation rule or AI model set to perform a desired characteristic (or a purpose) by training a basic artificial intelligence model with a plurality of pieces of training data by a learning algorithm. The AI model may include a plurality of neural network layers. Each of the neural network layer has a plurality of weight values and performs a neural network operation through an operation between an operation result of a previous layer and the plurality of weight values.

Linguistic understanding is a technology to recognize and apply/process human language/characters and includes natural language processing, machine translation, dialogue systems, question answering, speech recognition/synthesis, and the like.

The plurality of home appliances 4000 according to an embodiment of the disclosure may be home appliances in the same space as the cleaning robot 1000. For example, in the case where the cleaning robot 1000 is in a house, the plurality of home appliances 4000 may be home appliances in the house.

According to an embodiment of the disclosure, the plurality of home appliances 4000 may include, but are not limited to, a refrigerator, an air purifier, an air conditioner, an audio device, an induction range, a washing machine, a dryer, a clothes care apparatus, a TV, a dishwasher, an oven, a microwave oven, an air fryer, and an automatic feeder for pets, a water purifier, a lighting device, a bidet, and the like.

The plurality of home appliances 4000 may include an idle button. In the disclosure, when a manipulation of a certain button is not matched to a certain function of a home appliance, the manipulation of the certain button may be defined as an idle button. For example, in the case where a manipulation of touching a power button once is matched to a function of turning on/off the power of the home appliance, the manipulation of touching the power button once may not be an idle button, whereas, in the case where a manipulation of touching the power button twice is not matched to any function, the manipulation of touching the power button twice may be an idle button. As various types of home appliances are provided and the number of functions provided by the home appliance increases, the number of buttons of the home appliance may increase, and the number of idle buttons in which certain manipulations are not matched to certain functions of the home appliance may also increase.

According to an embodiment of the disclosure, by setting a scenario in which an operation of the cleaning robot 1000 is matched to an idle button of the home appliance, the user may perform input with an idle button of a nearby home appliance to call the cleaning robot 1000 to the vicinity of the home appliance. In this case, the user may easily call the cleaning robot 1000 at any time even when the user is not carrying a remote controller or a mobile terminal for controlling the cleaning robot 1000. An operation of setting a scenario in which an operation of the cleaning robot 1000 is matched to an idle button of a home appliance will be described in detail below with reference to FIG. 10.

The plurality of home appliances 4000 may have idle resources. As the performance of hardware (e.g., a CPU, a GPU, random-access memory (RAM), etc.) of home appliances improves, the amount of idle resources of the home appliances may also increase. For example, in the case of a refrigerator, the amount of required computation is not large, and thus the amount of idle resources may be also large compared to the total available resources. According to an embodiment of the disclosure, the plurality of home appliances 4000 may assist the cleaning robot 1000 in image processing by using the idle resources.

According to an embodiment of the disclosure, the plurality of home appliances 4000 may be classified into home appliances of a first group 4100, which are connected to the server device 2000, and home appliances of a second group 4200, which are not connected to the server device 2000.

The home appliances of the first group 4100 may transmit identification information to the server device 2000 to register the identification information (or account information) in the server device 2000. Here, the server device 2000 may register, in a memory, the identification information (or the account information) of the home appliances of the first group 4100, and may obtain idle button information of the home appliances of the first group 4100 based on the identification information (or the account information). The idle button information may refer to information about a manipulation of a certain key (e.g., pressing a reservation button for 3 seconds) which is not matched to a certain function provided by a home appliance. According to an embodiment of the disclosure, when a user input with respect to an idle button is received, the home appliances of the first group 4100 may transmit information about the user input to the server device 2000.

The home appliances of the first group 4100 may transmit, to the server device 2000, sensing information (e.g., a fine dust value, a temperature value, a humidity value, etc.) or state information (e.g., driving mode information, air volume information, wind speed information, battery information, information about resources being currently used, etc.). The home appliances of the first group 4100 may periodically transmit the sensing information or the status information to the server device 2000, or may transmit the sensing information or the status information to the server device 2000 when a certain event occurs.

Meanwhile, the home appliances of the first group 4100 may communicate with the cleaning robot 1000 through the server device 2000, and may also directly communicate with the cleaning robot 1000 through short-range wireless communication (e.g., Wi-Fi Direct, Bluetooth, etc.).

Because the home appliances of the second group 4200 are not connected to the server device 2000, they may directly communicate with the cleaning robot 1000 through short-range wireless communication. For example, the home appliances of the second group 4200 may receive and store a scenario in which idle buttons of the home appliances of the second group 4200 are matched to operations of the cleaning robot 1000, from the cleaning robot 1000 through short-range wireless communication. Also, the home appliances of the second group 4200 may directly transmit a call command to the cleaning robot 1000 based on a scenario. According to an embodiment of the disclosure, the home appliances of the second group 4200 may receive a request for distributed processing for image information (or sensing information) from the cleaning robot 1000 through short-range wireless communication, and may directly transmit a result of distributed processing for the image information (or the sensing information) to the cleaning robot 1000.

Meanwhile, according to an embodiment of the disclosure, because the home appliances of the second group 4200 are not connected to the server device 2000, the cleaning robot 1000 may transmit identification information of the second group 4200 to the server device 2000, so as to register, in the server device 2000, the identification information of the second group 4200.

Hereinafter, among the plurality of home appliances 4000, an embodiment in which the idle buttons and the idle resources of the home appliances of the first group 4100, which are connected to the server device 2000, are utilized will be first described with reference to FIGS. 2 to 12 and 19, and an embodiment in which the idle buttons and the idle resources of the home appliances of the second group 4200, which are not connected to the server device 2000, are utilized will be then described with reference to FIGS. 13 to 18 and 20.

Figure 2:
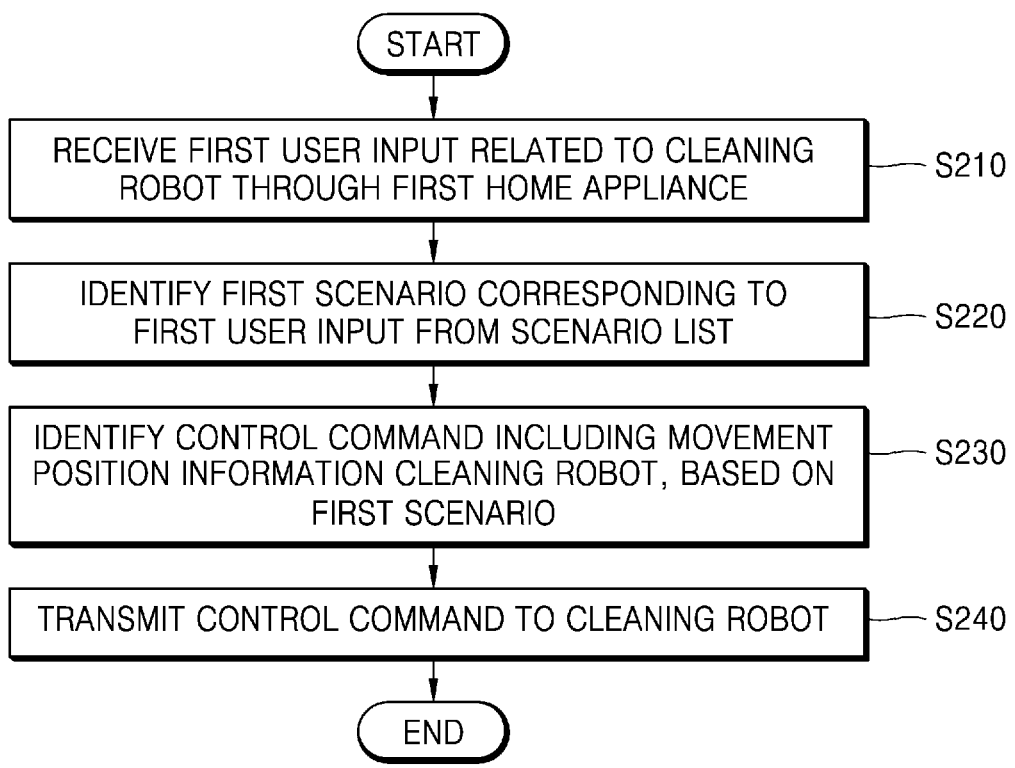
FIG. 2 is a flowchart illustrating a method, performed by a server device, of controlling a cleaning robot, according to an embodiment of the disclosure.

FIG. 2 is a flowchart illustrating a method, performed by the server device, of controlling the cleaning robot, according to an embodiment of the disclosure.

In operation S210, the server device 2000 according to an embodiment of the disclosure may receive a first user input related to the cleaning robot through a first home appliance. For example, when the first home appliance has received the first user input related to the cleaning robot 1000, the first home appliance may notify the server device 2000 that the first home appliance has received the first user input related to the cleaning robot 1000. In this case, the server device 2000 may receive information about the first user input (e.g., an input type, an input time, etc.) from the first home appliance, thereby receiving the first user input through the first home appliance. Here, the first home appliance may be one of the home appliances of the first group 4100 which are connected to the server device 2000.

According to an embodiment of the disclosure, the first user input may be an input related to an idle button of the first home appliance, which is not matched to at least one function provided by the first home appliance. For example, in the case where the first home appliance is an air conditioner, a first manipulation of touching a wind speed button of the air conditioner three times, a second manipulation of pressing a power button for 3 seconds or longer, a third manipulation of simultaneously touching a wind direction button and a reservation button, etc. may not be matched to functions basically provided by the air conditioner. In this case, the first manipulation, the second manipulation, and the third manipulation of the air conditioner may be inputs related to the idle button of the air conditioner.

In operation S220, the server device 2000 according to an embodiment of the disclosure may identify a first scenario corresponding to the first user input from a scenario list.

According to an embodiment of the disclosure, the scenario list may include at least one scenario in which an idle button of at least one home appliance is matched to at least one operation of the cleaning robot 1000. The scenario list may include a scenario which is approved by the user in advance. For example, the scenario list may include a scenario selected by the user from among scenarios recommended by the server device 2000 or a scenario which is set by the user.

According to an embodiment of the disclosure, the server device 2000 may select the first scenario from the scenario list based on the first user input received through the first home appliance. For example, if the first scenario corresponds to the first user input, the server device 2000 may select the first scenario. According to an embodiment of the disclosure, the first scenario may include at least one operation of the cleaning robot 1000 corresponding to the input related to the idle button of the first home appliance (i.e., a first user input).

According to an embodiment of the disclosure, the at least one operation of the cleaning robot 1000 may include, but is not limited to, an operation of cleaning around a home appliance (hereinafter, also referred to as a call operation) and an operation of cleaning in a certain mode, an operation of returning to the charging station, an operation of changing the direction, and the like. The certain mode may include, but is not limited to, an intensive mode, a normal mode, a repeat mode, and the like. The intensive mode may be a mode in which a suction operation is continuously performed, and may be a mode in which a cleaning route interval is narrower than that in the normal mode. The normal mode may be a mode in which the suction operation is not performed when moving and the suction operation is performed in a section in which dust exists. The repeat mode may be a mode in which the cleaning robot 1000 repeatedly perform cleaning until the remaining battery level is less than a threshold value.

In operation S230, the server device 2000 according to an embodiment of the disclosure may identify a control command including movement position information indicating a destination of the cleaning robot 1000, based on the first scenario.

According to an embodiment of the disclosure, the movement position information of the cleaning robot 1000 may be information about a destination to which the cleaning robot 1000 is required to move. For example, the movement position information of the cleaning robot 1000 may include, but is not limited to, identification information of a home appliance, position information of the home appliance, position information of the charging station, route information (e.g., navigation information) for moving to the home appliance, etc.

According to an embodiment of the disclosure, when the first scenario includes an operation of calling the cleaning robot 1000 to the vicinity of the first home appliance, the server device 2000 may extract the control command including position information of the first home appliance. In the case where the cleaning robot 1000 has the indoor space map in which the positions of the home appliances are indicated, because the cleaning robot 1000 is able to move to the vicinity of the first home appliance even when only identification information of the first home appliance is notified to the cleaning robot 1000, the server device 2000 may transmit, to the cleaning robot 1000, the identification information of the first home appliance as the position information of the first home appliance.

According to an embodiment of the disclosure, the control command may include, but is not limited to, a command to clean the vicinity of the first home appliance, a command to return to the charging station, a command to change the direction, a command to change the operation mode, a command to performing cleaning in a certain mode (e.g., the intensive mode, the normal mode, the repeat mode, etc.), etc.

For example, in the case where the first scenario includes an operation, performed by the cleaning robot 1000, of cleaning the vicinity of the first home appliance in the intensive mode, the server device 2000 may extract the control command including the position information of the first home appliance and operation mode information of the cleaning robot 1000 (e.g., the intensive mode).

In operation S240, the server device 2000 according to an embodiment of the disclosure may transmit the control command to the cleaning robot 1000.

According to an embodiment of the disclosure, the control command transmitted to the cleaning robot 1000 may include a command to clean a first area within a preset distance from the first home appliance. The first area may be an area designated by the user from the indoor space map (e.g., a floor plan or a map generated by the cleaning robot 1000), may be an area recommended by the server device 2000, or may be an area partitioned by the cleaning robot 1000.

When the control command is received from the server device 2000, the cleaning robot 1000 may move to the vicinity of the first home appliance to complete cleaning of the first area. For example, the cleaning robot 1000 may plan a cleaning route for the first area and complete cleaning of the first area along the planned cleaning route. When the cleaning robot 1000 recognizes an obstacle in the first area while cleaning, the cleaning robot 1000 may modify the planned cleaning route. According to an embodiment of the disclosure, the server device 2000 may receive, from the cleaning robot 1000, a cleaning completion message according to the control command, and may transmit, the first home appliance, a message indicating that the cleaning of the first area is completed (i.e., the cleaning completion message).

Meanwhile, according to an embodiment of the disclosure, the server device 2000 may output a message indicating that the cleaning of the first area is completed, to the user through the display device 3000.

According to an embodiment of the disclosure, even without any remote control device for controlling the cleaning robot 1000, by using an idle button of a home appliance near the user, the user may quickly call the cleaning robot 1000 to the vicinity of the home appliance. An operation, performed by the server device 2000, of controlling the cleaning robot 1000 based on a scenario in which an idle button of a home appliance is matched to an operation of the cleaning robot 1000 will be described in more detail with reference to FIG. 3.

Figure 3:
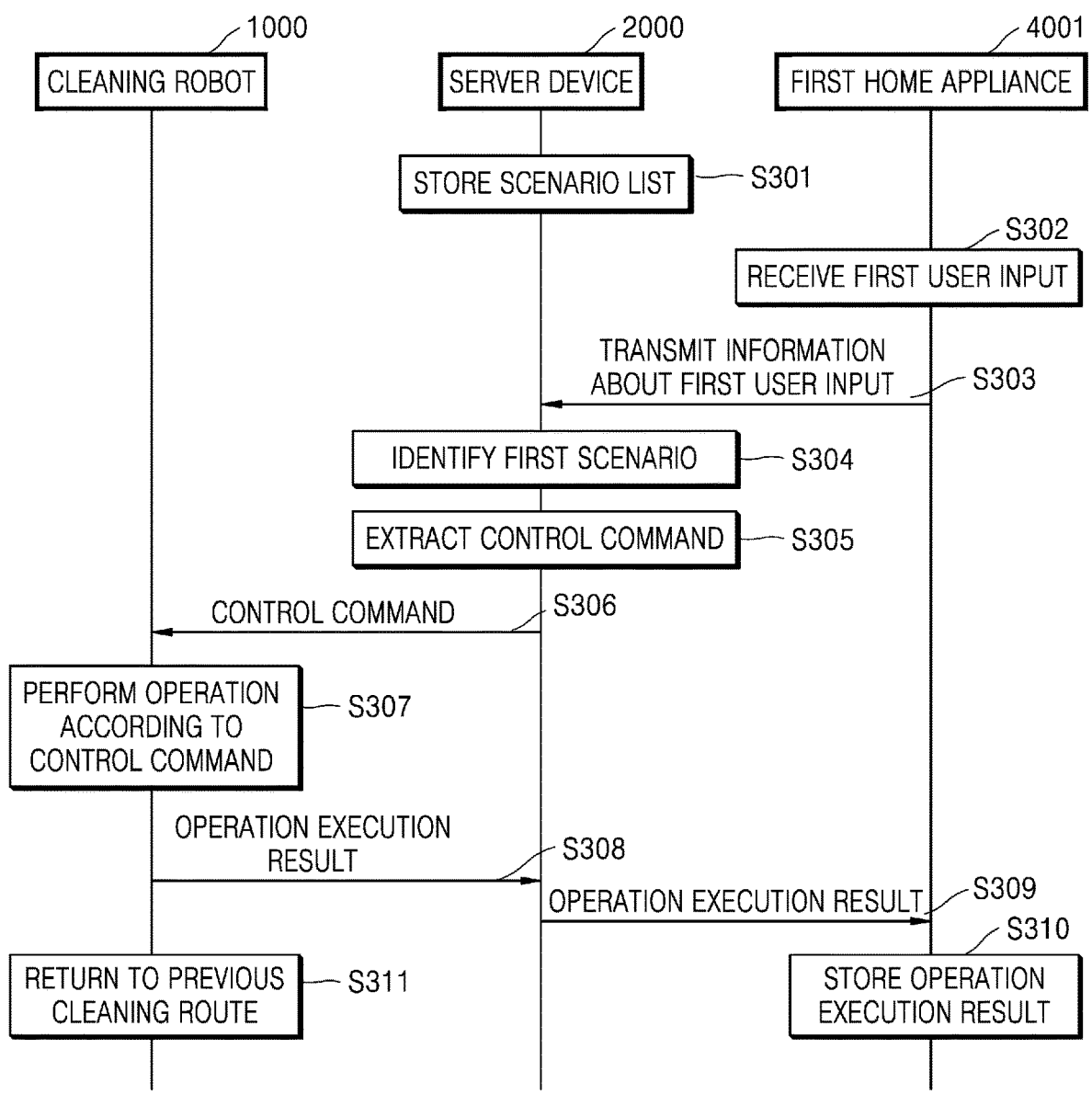
FIG. 3 is a flowchart illustrating a method, performed by a server device, of controlling a cleaning robot, according to an embodiment of the disclosure.

FIG. 3 is a flowchart illustrating a method, performed by the server device 2000, of controlling the cleaning robot 1000, according to an embodiment of the disclosure.

In operation S301, the server device 2000 according to an embodiment of the disclosure may store the scenario list in the memory. The scenario list may include information of at least one scenario. The scenario list may include information in which an idle button of at least one home appliance is matched to at least one operation of the cleaning robot 1000. The server device 2000 may provide the scenario list to the user through the display device 3000.

Figure 4:
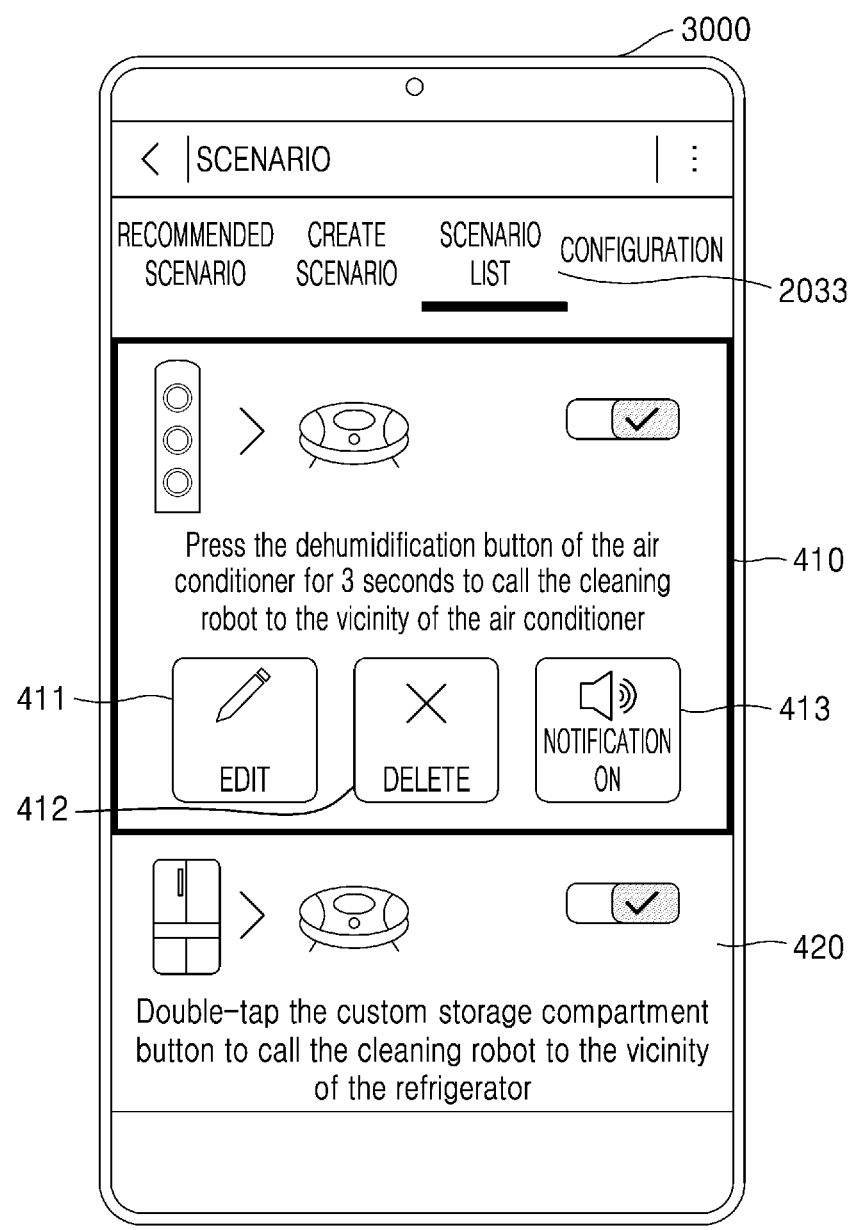
FIG. 4 is a diagram illustrating a scenario list, according to an embodiment of the disclosure.

Referring to FIG. 4, the user may check a scenario list 2033 through the display device 3000. For example, the scenario list 2033 may include scenario A 410 and scenario B 420. Each of scenario A 410 and scenario B 420 included in the scenario list 2033 may include identification information of a home appliance, user input information related to an idle button of the home appliance, and an operation of the cleaning robot 1000. For example, scenario A 410 may include an operation of, when a dehumidification button of an air conditioner (i.e., the identification information of the home appliance) is pressed for 3 seconds (i.e., the user input information related to the idle button), calling the cleaning robot 1000 to the vicinity of the air conditioner (i.e., the operation of the cleaning robot 1000). Scenario B 420 may include an operation of, when a custom storage compartment button of a refrigerator (i.e., the identification information of the home appliance) is touched twice (i.e., the user input information related to the idle button), calling the cleaning robot 1000 to the vicinity of the refrigerator (i.e., the operation of the cleaning robot 1000).

According to an embodiment of the disclosure, the scenario list 2033 may be edited by the user. For example, referring to FIG. 4, the user may select an edit icon 411 to modify the type of home appliance, the type of user input, and the operation of the cleaning robot 1000 in scenario A 410. The user may also select a delete icon 412 to delete scenario A 410 from the scenario list 2033. The user may also select a notification icon 413 to receive a notification related to the execution of scenario A 410. For example, the cleaning robot 1000 or the display device 3000 (e.g., a mobile terminal of the user) may be set to output a voice guide of 'The cleaning robot 1000 is moving to the vicinity of the air conditioner', when scenario A 410 is performed. According to an embodiment of the disclosure, the server device 2000 may update the scenario list 2033 according to an edit input from the user.

In operation S302, a first home appliance 4001 according to an embodiment of the disclosure may receive, from the user, a first user input related to the cleaning robot 1000. Here, the first home appliance 4001 may be a home appliance connected to the server device 2000. The first user input may be an input which is predefined in relation to an operation of the cleaning robot 1000. The first user input may be an input related to an idle button of the first home appliance 4001, which is not matched to at least one function provided by the first home appliance 4001.

For example, referring to FIG. 4, in the case where the first home appliance 4001 is an air conditioner, the first user input may be an input of pressing the dehumidification button of the air conditioner for 3 seconds in scenario A 410. The input of pressing the dehumidification button of the air conditioner for 3 seconds may be irrelevant to the dehumidification function of the air conditioner, and may be also irrelevant to any other functions provided by the air conditioner.

In operation S303, the server device 2000 according to an embodiment of the disclosure may receive information about the first user input from the first home appliance 4001. For example, when the first home appliance 4001 receives the first user input from the user, the first home appliance 4001 may transmit, to the server device 2000, information notifying that an event of the first user input has occurred. For example, when the user has pressed the dehumidification button of the air conditioner for 3 seconds, the air conditioner may transmit, to the server device 2000, information indicating that an input event of pressing the dehumidification button for 3 seconds has occurred.

According to an embodiment of the disclosure, the first home appliance 4001 may transmit, to the server device 2000, information about the first user input together with identification information of the first home appliance 4001.

In operation S304, the server device 2000 according to an embodiment of the disclosure may identify a first scenario corresponding to the first user input received through the first home appliance 4001. For example, the server device 2000 may select the first scenario including the first user input from the scenario list 2033. According to an embodiment of the disclosure, the first scenario may include at least one operation of the cleaning robot 1000 corresponding to an input (i.e., the first user input) related to the idle button of the first home appliance 4001.

For example, referring to FIG. 4, in the case where the first user input is the input of pressing the dehumidification button of the air conditioner for 3 seconds, the server device 2000 may select, from the scenario list 2033, scenario A 410 related to the input of pressing the dehumidification button of the air conditioner for 3 seconds (i.e., 'Press the dehumidification button of the air conditioner for 3 seconds to call the cleaning robot to the vicinity of the air conditioner').

In operation S305, the server device 2000 according to an embodiment of the disclosure may extract a control command including movement position information of the cleaning robot 1000 from the first scenario. The movement position information of the cleaning robot 1000 may be information about a destination to which the cleaning robot 1000 is required to move. For example, the movement position information of the cleaning robot 1000 may include, but is not limited to, the identification information of the first home appliance 4001, position information of the first home appliance 4001, the position information of the charging station, route information (e.g., navigation information) for moving to the first home appliance 4001, etc.

According to an embodiment of the disclosure, in the case where the first scenario includes an operation of calling the cleaning robot 1000 to the vicinity of the first home appliance 4001, the server device 2000 may extract a control command including the position information of the first home appliance 4001. In the case where the cleaning robot 1000 has the indoor space map in which the positions of the home appliances are indicated, because the cleaning robot 1000 is able to move to the vicinity of the first home appliance 4001 even when only the identification information of the first home appliance 4001 is notified to the cleaning robot 1000, the server device 2000 may transmit, to the cleaning robot 1000, the identification information of the first home appliance 4001 as the position information of the first home appliance 4001.

According to an embodiment of the disclosure, in the case where the first scenario includes an operation, performed by the cleaning robot 1000, of cleaning the vicinity of the first home appliance 4001 in the intensive mode, the server device 2000 may extract a control command including the position information of the first home appliance 4001 and operation mode information of the cleaning robot 1000 (e.g., operation in the intensive mode). Meanwhile, in the case where the control command is to return to the charging station, the movement position information of the cleaning robot 1000 may be information about the position of the charging station.

Referring to FIG. 4, when scenario A 410 is selected from the scenario list 2033, the server device 2000 may extract a control command to 'clean the vicinity of the air conditioner' from scenario A 410.

In operation S306, the server device 2000 according to an embodiment of the disclosure may transmit the extracted control command to the cleaning robot 1000.

According to an embodiment of the disclosure, the server device 2000 may transmit the extracted control command to the cleaning robot 1000 through a wireless communication interface (e.g., Wi-Fi).

In operation S307, the cleaning robot 1000 according to an embodiment of the disclosure may perform an operation according to the control command received from the server device 2000.

For example, in the case where the control command is to clean the vicinity of the first home appliance 4001, the cleaning robot 1000 may move to the vicinity of the first home appliance 4001 based on the indoor space map. The cleaning robot 1000 may generate an indoor space map including position information of the home appliances. The positions of the home appliances may be estimated based on communication strength information. For example, because the cleaning robot 1000 may perform short-distance wireless communication with the home appliances, the cleaning robot 1000 may estimate the positions of the home appliances based on received signal strength indications (RSSIs) from the home appliances. According to another embodiment of the disclosure, the cleaning robot 1000 may analyze image information obtained through a camera to estimate the positions of the home appliances. In this case, the cleaning robot 1000 may estimate the positions of the home appliances by applying the image information to an artificial intelligence model trained to recognize an object. For example, in the case where the cleaning robot 1000 inputs a living room image obtained through the camera to the artificial intelligence model, the cleaning robot 1000 may receive, as result values from the artificial intelligence model, information indicating that an air conditioner is on the left side of the living room, a TV is in the center of the living room, and an air purifier on the right side of the living room. The cleaning robot 1000 may generate an indoor space map in which the positions of the home appliances are indicated, based on the result values from the artificial intelligence model.

Figure 5:
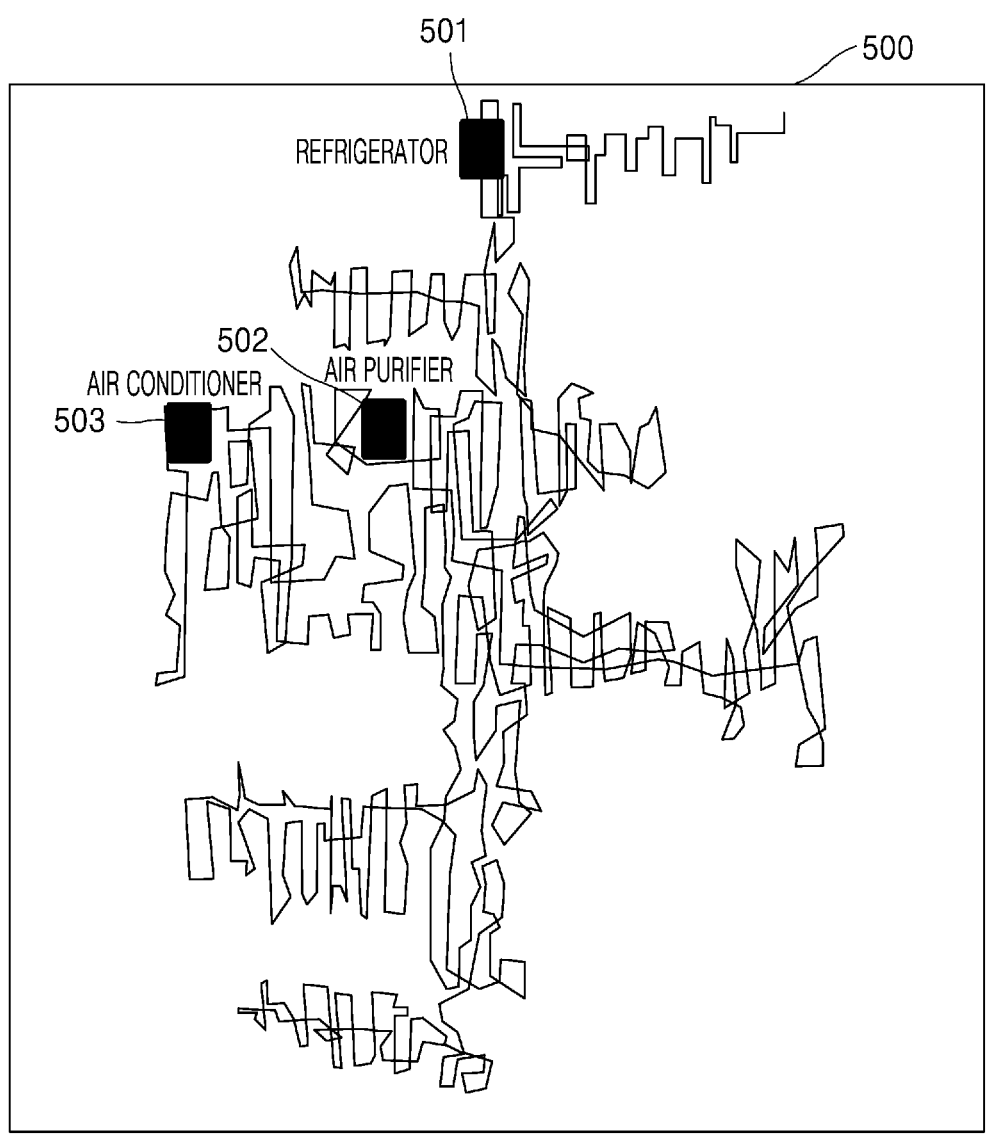
FIG. 5 is a diagram illustrating an indoor space map generated by a cleaning robot, according to an embodiment of the disclosure.

Referring to FIG. 5, the cleaning robot 1000 may generate an indoor space map 500 including positions of a refrigerator 501, an air purifier 502, and an air conditioner 503. In addition, the cleaning robot 1000 may update the indoor space map 500 every time it moves. For example, in the case where the air purifier 502 was at a first point when the cleaning robot 1000 was performing a cleaning operation yesterday but the user thereafter moved the position of the air purifier 502 from the first point to a second point, the cleaning robot 1000 may update the indoor space map 500 to indicate that the air purifier 502 is at the second point while performing a cleaning operation today.

In the case where the control command is to clean the vicinity of the first home appliance 4001, the cleaning robot 1000 plans a cleaning route for the vicinity of the first home appliance 4001, and complete a cleaning operation along the planned cleaning route. When the cleaning robot 1000 recognizes an obstacle around the first home appliance 4001 while cleaning, the cleaning robot 1000 may modify the planned cleaning route, or may stop the cleaning of the vicinity of the first home appliance 4001. For example, when the obstacle is not large, the cleaning robot 1000 may modify the cleaning route to bypass the obstacle and complete the cleaning, whereas, when the obstacle is too large to continue the cleaning, the cleaning robot 1000 may stop the cleaning and return to the charging station.

In operation S308, the cleaning robot 1000 according to an embodiment of the disclosure may upload an operation execution result to the server device 2000. According to an embodiment of the disclosure, the operation execution result may include information such as 'Cleaning completed', 'Cleaning stopped, 'Cleaning partially completed', etc., but is not limited thereto. In addition, the operation execution result may include information about a cleaning history (e.g., a map image in which a route through which the cleaning robot 1000 has traveled is indicated).

In operation S309, the server device 2000 according to an embodiment of the disclosure may transmit the operation execution result of the cleaning robot 1000 to the first home appliance 4001. In this case, the first home appliance 4001 may obtain information such as whether the cleaning of the vicinity of the first home appliance 4001 is completed or whether the cleaning is stopped due to an obstacle or the like.

In operation S310, the first home appliance 4001 according to an embodiment of the disclosure may store the operation execution result of the cleaning robot 1000. According to an embodiment of the disclosure, the first home appliance 4001 may store the operation execution result of the cleaning robot 1000 in a secure area (e.g., a trust zone) of a memory. The secure area (e.g., the trust zone) may be an area accessible only by authorized devices (e.g., the cleaning robot 1000).

According to an embodiment of the disclosure, in the case where the cleaning robot 1000 did not complete the cleaning of the vicinity of the first home appliance 4001, the first home appliance 4001 may later call the cleaning robot 1000 to the vicinity of the first home appliance 4001 again, based on the operation execution result of the cleaning robot 1000. An operation, performed by the first home appliance 4001, of calling the cleaning robot 1000 again when the cleaning of the vicinity of the first home appliance 4001 is stopped will be described in detail below with reference to FIG. 22.

In operation S311, the cleaning robot 1000 according to an embodiment of the disclosure may return to a previous cleaning route when the operation according to the control command is completed.

According to an embodiment of the disclosure, when the cleaning robot 1000 is called to the vicinity of the first home appliance 4001 while performing a cleaning operation, the cleaning robot 1000 may complete cleaning of the vicinity of the first home appliance 4001, and then return to the previous cleaning route. In this case, according to an embodiment of the disclosure, the cleaning robot 4001 may return to a point closest to the first home appliance 4001 in the previous cleaning route, or may return to a point where the cleaning was stopped in the previous cleaning route.

According to an embodiment of the disclosure, when the cleaning robot 1000 is called to the vicinity of the first home appliance 4001 while being charged at the charging station, the cleaning robot 1000 may complete cleaning of the vicinity of the first home appliance 4001, and then return to the charging station.

Hereinafter, a scenario of controlling the cleaning robot by using an idle button of a home appliance will be described in more detail with reference to FIGS. 6 and 7.

Figure 6:
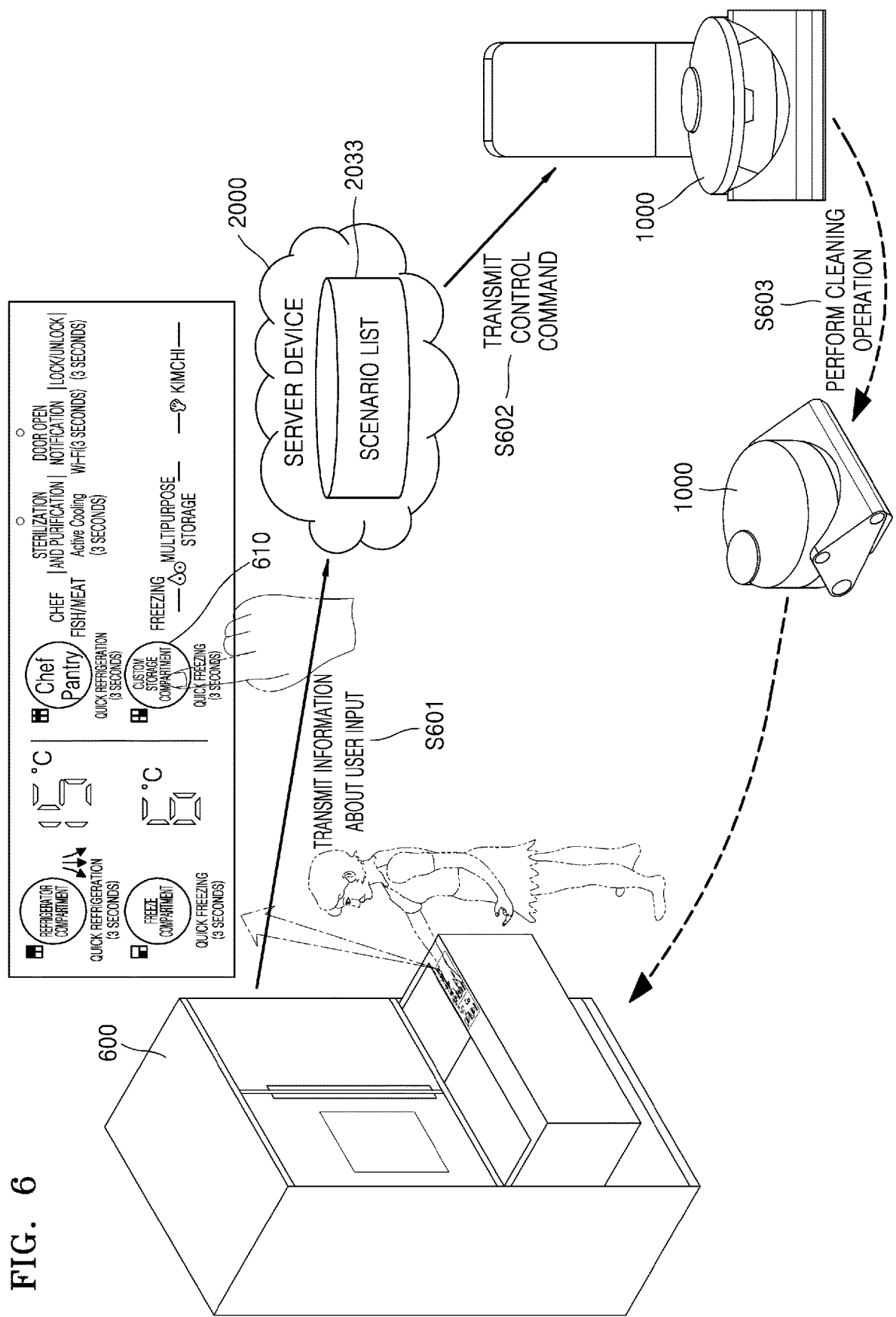
FIG. 6 is a diagram illustrating an operation of controlling a cleaning robot by using an idle button of a refrigerator, according to an embodiment of the disclosure.

FIG. 6 is a diagram illustrating an operation of controlling the cleaning robot 1000 by using an idle button of a refrigerator 600, according to an embodiment of the disclosure. The case where scenario B 420 of, when a custom storage compartment button 610 of the refrigerator 600 is touched twice, calling the cleaning robot 1000 to the vicinity of the refrigerator 600 is stored in the scenario list 2033 will be described as an example with reference to FIG. 6.

Referring to FIG. 6, in the case where food or the like is on the floor of the kitchen in which the refrigerator 600 is located, the user may touch the custom storage compartment button 610 of the refrigerator 600 twice to call the cleaning robot 1000, which is being charged in the living room, to the kitchen. In this case, the refrigerator 600 may detect that an input event of touching the custom storage compartment button 610 twice has occurred. Then, the refrigerator 600 may transmit, to the server device 2000, information indicating that the refrigerator 600 has received the user input of touching the custom storage compartment button 610 twice (e.g., information about the user input) (S601).

When the server device 2000 receives, from the refrigerator 600, information indicating that the user input of touching the custom storage compartment button 610 twice has been received, the server device 2000 may select, from the scenario list 2033, scenario B 420 corresponding to the user input of touching the custom storage compartment button 610 twice. The server device 2000 may extract a control command to clean the vicinity of the refrigerator 600, based on scenario B 420. The server device 2000 may transmit the control command to clean the vicinity of the refrigerator 600, to the cleaning robot 1000 through a communication interface (S602). Here, the control command may include position information of the vicinity of the refrigerator 600 and identification information of the refrigerator 600.

When the cleaning robot 1000 receives the control command from the server device 2000, the cleaning robot 1000 may perform a cleaning operation according to the control command (S603). For example, the cleaning robot 1000 may move to the vicinity of the refrigerator 600 and plan a cleaning route for cleaning the vicinity of the refrigerator 600. In this case, the cleaning robot 1000 may move to the vicinity of the refrigerator 600 and plan the cleaning route by using the indoor space map 500. The cleaning robot 1000 may complete cleaning of the vicinity of the refrigerator 600 according to the planned cleaning route, and then transmit a cleaning completion message to the server device 2000.

According to an embodiment of the disclosure, the server device 2000 transmits, to the refrigerator 600, the cleaning completion message with respect to the vicinity of the refrigerator 600, so as to allow the refrigerator 600 to confirm whether the cleaning of the vicinity of the refrigerator 600 is completed.

Because the cleaning robot 1000 was called to the vicinity of the refrigerator 600 while being charged, when the cleaning of the vicinity of the refrigerator 600 is completed, the cleaning robot 1000 may return to the charging station. According to another embodiment of the disclosure, when the remaining battery level is greater than the threshold value, the cleaning robot 1000 may further perform a cleaning operation along an ordinary cleaning route without returning to the charging station.

According to an embodiment of the disclosure, the user may quickly call the cleaning robot 1000 to the kitchen by touching the custom storage compartment button of the refrigerator 600 twice according to a preset scenario, without executing a predefined application in the mobile terminal or searching for a remote control device of the cleaning robot 1000 in order to call the cleaning robot 1000 to the kitchen.

Figure 7:
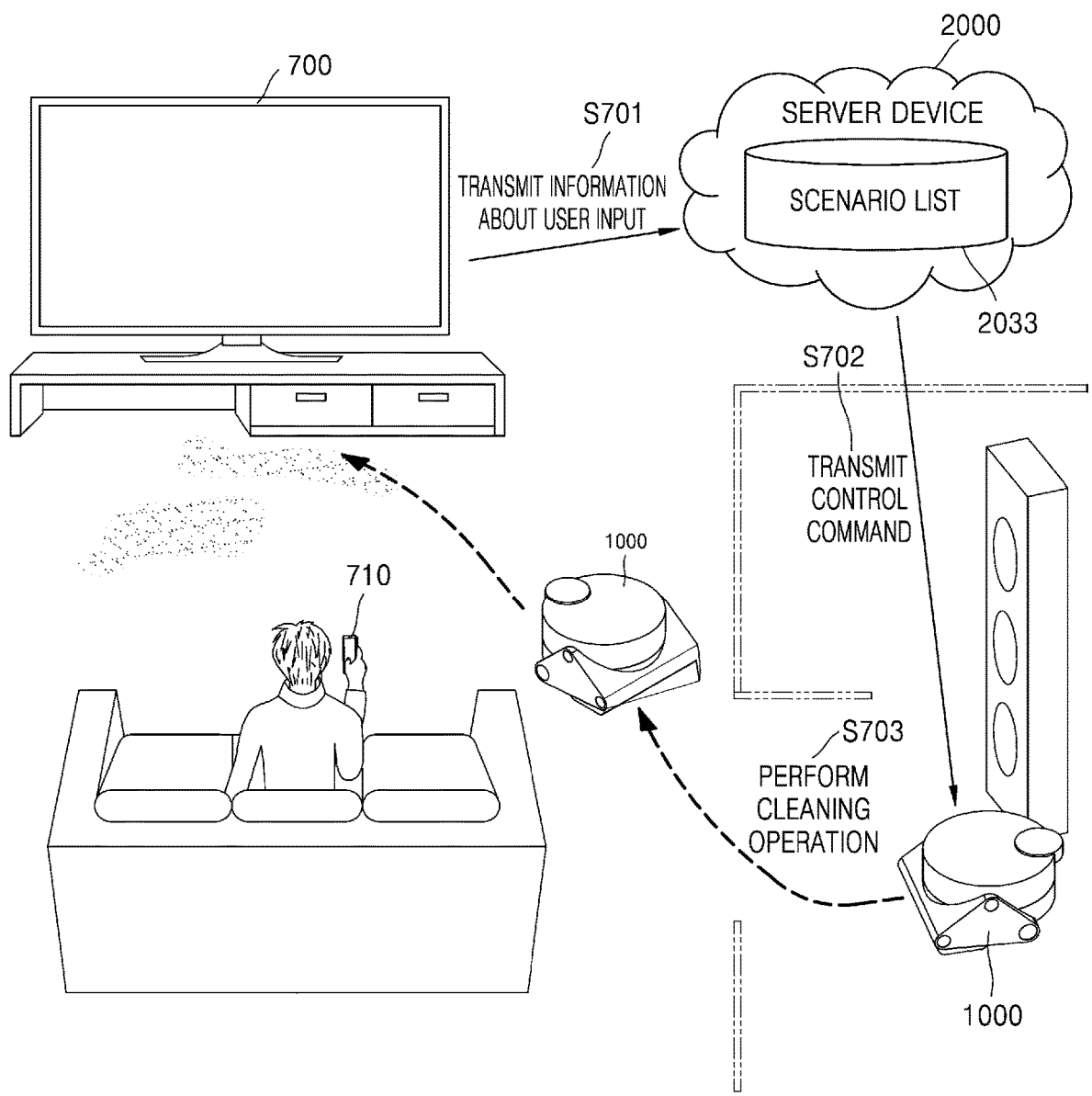
FIG. 7 is a diagram illustrating an operation of controlling a cleaning robot by using an idle button of a television (TV) remote controller, according to an embodiment of the disclosure.

FIG. 7 is a diagram illustrating an operation of controlling the cleaning robot 1000 by using an idle button of a TV remote controller 710, according to an embodiment of the disclosure. The case where scenario C in which the cleaning robot 1000 cleans the vicinity of a TV 700 when a home key of the TV remote controller 710 is pressed for a preset period of time or longer, is stored in the scenario list 2033 will be described as an example with reference to FIG. 7.

Referring to FIG. 7, when the user watching the TV 700 discovers dust on the floor of the living room, the user may press the home key of the TV remote controller 710 for 3 seconds or longer to call the cleaning robot 1000 cleaning around an air conditioner in a master bedroom to the living room. In this case, the TV 700 may receive, from the TV remote controller 710, an input of long-pressing the home key of the TV remote controller 710 (i.e., a long press input) through infrared communication. In addition, the TV 700 may transmit, to the server device 2000, information indicating that the input (i.e., the long press input) of long-pressing the home key of the TV remote controller 710 (i.e., information about the user input) has been received (S701).

When the server device 2000 receives, from the TV 700, information indicating that the input (i.e., the long press input) of long-pressing the home key of the TV remote controller 710 has been received, the server device 2000 may select, from the scenario list 2033, scenario C corresponding to the user input (i.e., the long press input) of long-pressing the home key of the TV remote controller 710. The server device 2000 may extract a control command to clean the vicinity of the TV 700 (i.e., a living room area), based on scenario C. The server device 2000 may transmit the control command to clean the vicinity of the TV 700, to the cleaning robot 1000 through the communication interface (S702). According to an embodiment of the disclosure, when the vicinity of the TV 700 is designated as the living room area in advance, the control command may include position information of the living room area. The control command may include identification information of the TV 700.

When the cleaning robot 1000 receives the control command from the server device 2000, the cleaning robot 1000 may perform a cleaning operation according to the control command (S703). For example, the cleaning robot 1000 may move to the vicinity of the TV 700 (i.e., the living room area) and plan a cleaning route for cleaning the vicinity of the TV 700 (i.e., the living room area). In this case, the cleaning robot 1000 may move to the vicinity of the TV 700 (i.e., the living room area) and plan the cleaning route, by using the indoor space map 500. The cleaning robot 1000 may complete cleaning of the vicinity of the TV 700 (i.e., the living room area) according to the planned cleaning route, and then transmit a cleaning completion message to the server device 2000.

According to an embodiment of the disclosure, the server device 2000 transmits, to the TV 700, the cleaning completion message with respect to the vicinity of the TV 700, so as to allow the TV 700 to confirm whether the cleaning of the vicinity of the TV 700 is completed.

Because the cleaning robot 1000 was called to the vicinity of the TV 700 while cleaning the vicinity of the air conditioner in the master bedroom, when the cleaning of the vicinity of the TV 700 is completed, the cleaning robot 1000 may return to the previous cleaning route. For example, in the case where the cleaning robot 1000 was called when it had planned a first cleaning route for a main bedroom area and was cleaning the vicinity of the air conditioner (i.e., point A) along the first cleaning route, the cleaning robot 1000 may return to the vicinity of the air conditioner (i.e., point A) on the first cleaning route. Then, the cleaning robot 1000 may continue to clean an area of the first cleaning route that has not been cleaned.

According to an embodiment of the disclosure, the user watching the TV 700 may quickly call the cleaning robot 1000 to the living room by long-pressing the home key of the remote controller 710 according to a preset scenario, without executing a predefined application in the mobile terminal or searching for the remote control device of the cleaning robot 1000 in order to call the cleaning robot 1000 to the living room.

Hereinafter, a method of creating a scenario related to the cleaning robot 1000 will be described in detail with reference to FIGS. 8 to 14.

Figure 8:
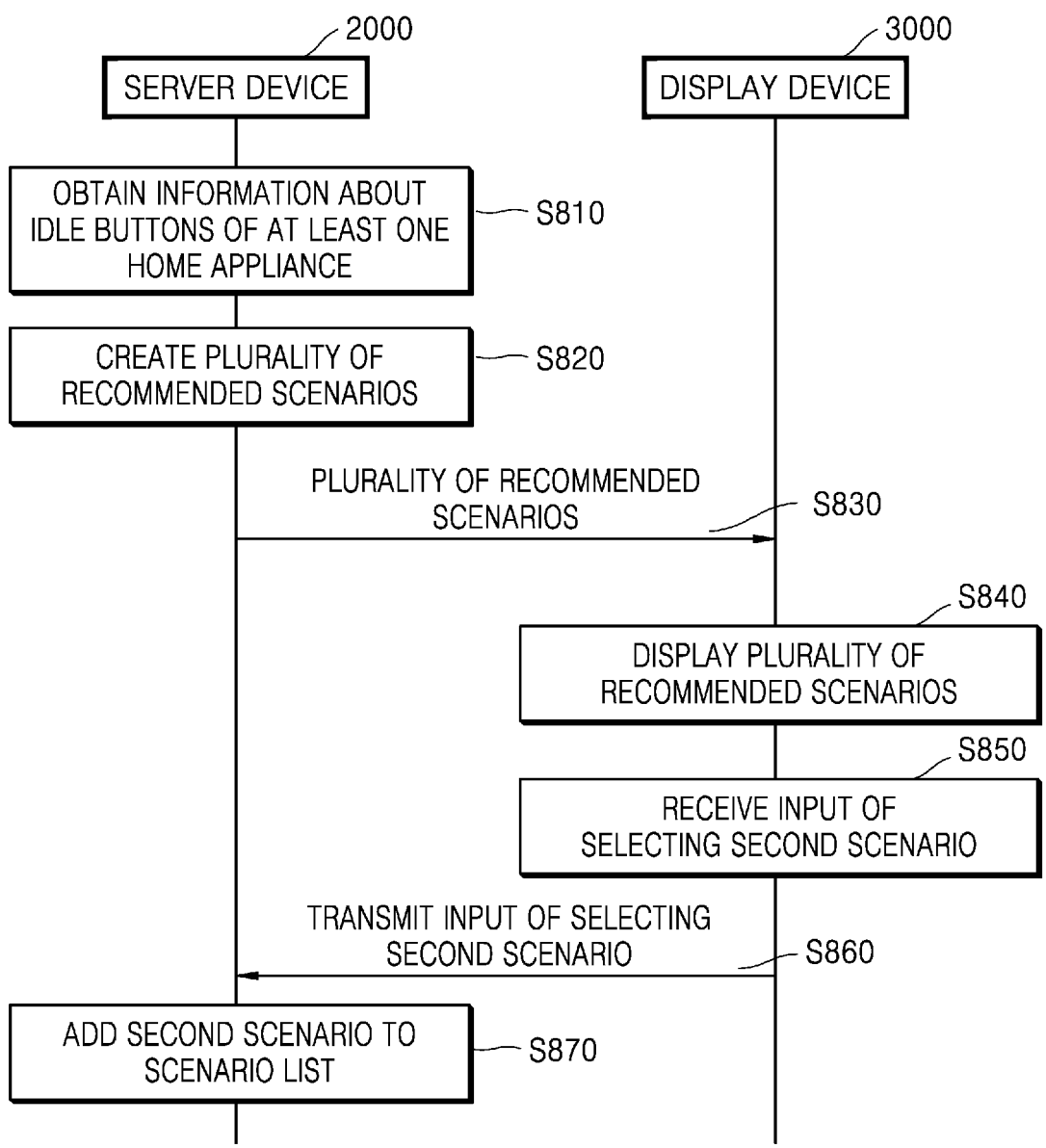
FIG. 8 is a flowchart illustrating a method, performed by a server device, of providing a plurality of recommended scenarios, according to an embodiment of the disclosure.

FIG. 8 is a flowchart illustrating a method, performed by the server device 2000, of providing a plurality of recommended scenarios, according to an embodiment of the disclosure.

In operation S810, the server device 2000 according to an embodiment of the disclosure may obtain information about idle buttons of at least one home appliance.

According to an embodiment of the disclosure, when registering each home appliance in the server device 2000, the server device 2000 may receive, from each home appliance, information about a key (hereinafter referred to as a fixed key or a fixed button) preset according to original functions of each home appliance. In this case, the server device 2000 may define an idle button of each home appliance other than the fixed key or the fixed button. For example, the server device 2000 may define the idle button by matching various manipulations (or input patterns) to a certain button of each home appliance.

According to an embodiment of the disclosure, the server device 2000 may receive manual information including information about a fixed button and information about an idle button from each home appliance. In this case, the server device 2000 may identify the idle button of each home appliance based on the manual information of each home appliance.

According to an embodiment of the disclosure, the server device 2000 may receive identification information (e.g., a model name, a shipping region, OS version information, a media access control (MAC) address, etc.) from each home appliance. In this case, the server device 2000 may search a manual of each home appliance stored in the memory for the idle button of each home appliance, based on the identification information of each home appliance. According to an embodiment of the disclosure, the manual of each home appliance may include information about an idle button together with the information about a fixed button.

In the case where the information about the idle button is not defined in the manual of each home appliance, the server device 2000 may newly define the idle button of each home appliance other than fixed keys or fixed buttons found in the manual. For example, the server device 2000 may define an idle button by matching various manipulations (or input patterns) to a certain button of each home appliance.

Meanwhile, according to an embodiment of the disclosure, in the case where the manual of the home appliance is not stored in the memory of the server device 2000, the server device 2000 may search an external server for the manual of the home appliance. For example, the server device 2000 may request a manual corresponding to the identification information of the home appliance from a service server that provides a service related to the home appliance, and receive the manual corresponding to the identification information of the home appliance from the service server.

In operation S820, the server device 2000 according to an embodiment of the disclosure may generate a plurality of recommended scenarios by using idle buttons of at least one home appliance.

For example, the server device 2000 may generate the plurality of recommended scenarios by matching the idle buttons of the at least one home appliance to at least one operation of the cleaning robot 1000. In this case, the recommended scenario may include idle button information of the home appliance and operation information of the cleaning robot 1000. For example, the server device 2000 may create a first recommended scenario of, when a time button of an induction range is touched twice, calling the cleaning robot to the vicinity of the induction range, a second recommended scenario of, when the time button of the induction range is touched three times or more, commanding the cleaning robot to clean the vicinity of the induction range in the intensive mode, and the like.

According to an embodiment of the disclosure, the server device 2000 may create a recommended scenario considering the utilization of the user. For example, the server device 2000 may create a recommended scenario based on information about the number of times the user uses a home appliance, context information of the user collected from a mobile terminal of the user (e.g., information about a time slot during which the user mainly stays in the house, information about a space where the user mainly stays in the house), information about scenarios selected by other users, and the like.

For example, in the case where the number of times the user uses home appliances in the kitchen is high, the server device 2000 may create a recommended scenario by using idle buttons of the home appliances in the kitchen. In addition, in the case where the server device 2000 has determined, by analyzing position information of the user received from the mobile terminal of the user, that the user mainly stays in the living room, the server device 2000 may create a recommended scenario by using an idle button of a remote controller of a TV in the living room. Meanwhile, in the case where other users frequently use a scenario in which an idle button of the air conditioner is matched to an operation of the cleaning robot 1000, the server device 2000 create a recommended scenario in which the idle button of the air conditioner is matched to the operation of the cleaning robot 1000.

According to an embodiment of the disclosure, the server device 2000 may create a recommended scenario by using an artificial intelligence model. The artificial intelligence model may be generated or refined by training based on scenarios used by users. The artificial intelligence model is stored in the memory of the server device 2000 and may be continuously refined.

In operation S830, the server device 2000 according to an embodiment of the disclosure may transmit the plurality of recommended scenarios to the display device 3000. For example, when the display device 3000 executes a predefined application installed in the display device 3000, the server device 2000 may provide the plurality of recommended scenarios to the display device 3000 through the predefined application. The predefined application may be an application that provides a service related to the cleaning robot 1000 or a home appliance.

In operation S840, the display device 3000 according to an embodiment of the disclosure may display the plurality of recommended scenarios.

According to an embodiment of the disclosure, when the user executes the predefined application installed in the display device 3000, the display device 3000 may display the plurality of recommended scenarios through an execution window of the predefined application.

Figure 9:
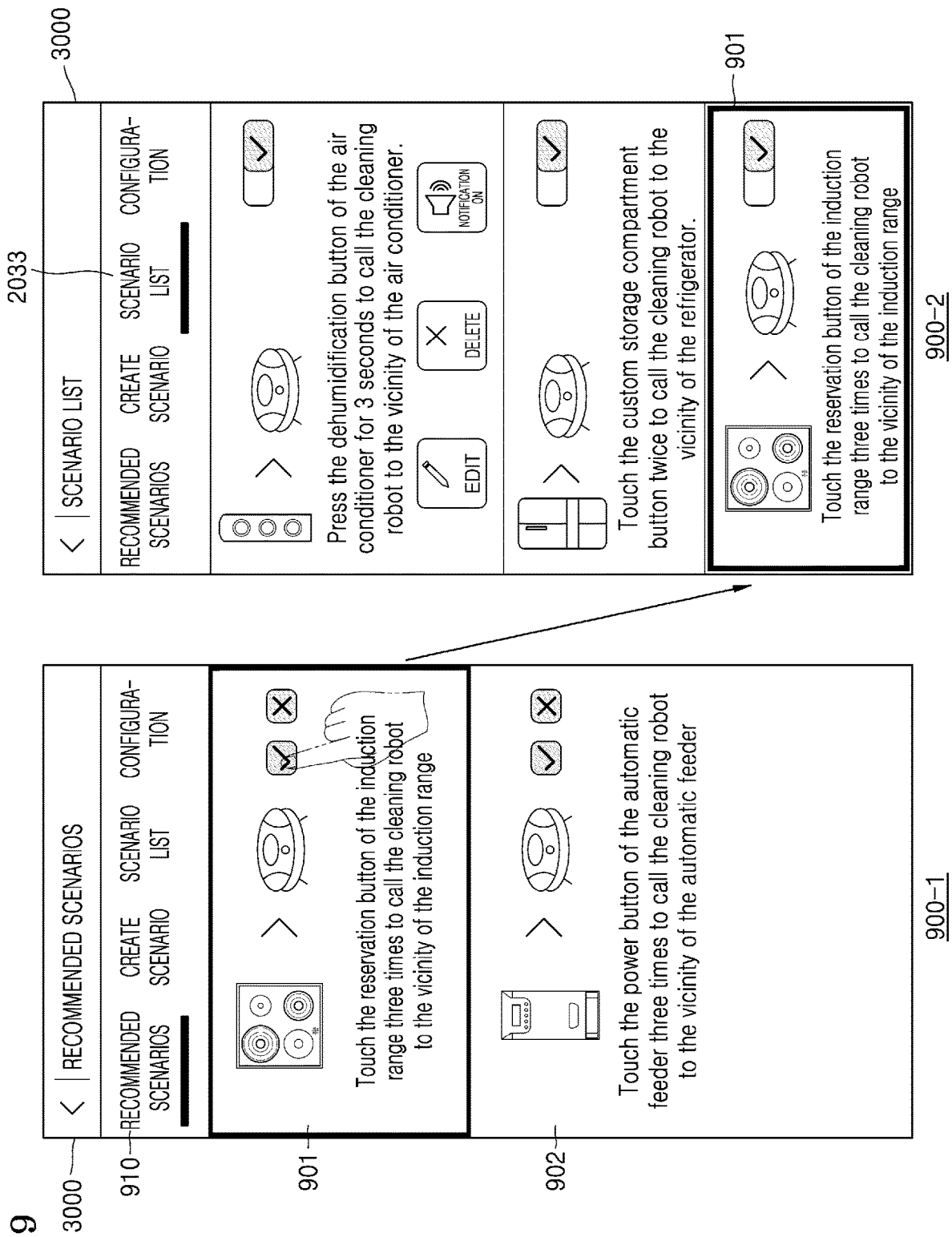
FIG. 9 is a diagram illustrating an operation, performed by a server device, of providing a plurality of recommended scenarios, according to an embodiment of the disclosure.

For example, referring to 900-1 of FIG. 9, the display device 3000 may display a recommended scenario list 910 in the execution window of the predefined application. For example, the recommended scenario list 910 may include recommended scenario A 901 of, when a reservation button of the induction range is touched three times, calling the cleaning robot 1000 to the vicinity of the induction range, recommended scenario B 902 of, when a power button of an automatic feeder is touched three times, calling the cleaning robot 1000 to the vicinity of the automatic feeder, and the like. The automatic feeder may be a device that automatically feeds a companion animal. The automatic feeder may be connected to the server device 2000 through wireless communication (e.g., Wi-Fi).

In operation S850, the display device 3000 according to an embodiment of the disclosure may receive an input of selecting a second scenario related to an idle button of a second home appliance from among the plurality of recommended scenarios.

The second home appliance may be a home appliance connected to the server device 2000 through wireless communication (e.g., Wi-Fi). The type of the second home appliance may be various. For example, the second home appliance may be, but is not limited to, an air purifier, an induction range, an automatic feeder, a TV, an air conditioner, a dishwasher, a refrigerator, a washing machine, a dryer, a medical care device, a bidet, or the like.

The second scenario may be a recommended scenario in which the idle button of the second home appliance is matched to at least one operation of the cleaning robot 1000. According to an embodiment of the disclosure, the at least one operation of the cleaning robot 1000 may include, but is not limited to, an operation of cleaning the vicinity of a home appliance (i.e., a call operation), an operation of cleaning the vicinity of a home appliance in a certain mode (e.g., the intensive mode, the normal mode, the repeat mode, etc.), an operation of returning to the charging station, an operation of changing the direction, and the like.

In operation S860, the display device 3000 according to an embodiment of the disclosure may transmit the input of selecting the second scenario to the server device 2000. The server device 2000 according to an embodiment of the disclosure may receive, through the display device 3000, the input of selecting the second scenario related to the idle button of the second home appliance from among the plurality of recommended scenarios. For example, the server device 2000 may receive the input of selecting the second scenario through the predefined application being executed on the display device 3000.

Referring to 900-1 of FIG. 9, the server device 2000 may receive a user input of selecting recommended scenario A 901 from the recommended scenario list 910 displayed on the display device 3000. For example, the user may check the recommended scenario list 910 through the display device 3000 and select recommended scenario A 901 ('Touch the reservation button of the induction range three times to call the cleaning robot to the vicinity of the induction range') that the user wants to use from the recommended scenario list 910.

In operation S870, the server device 2000 according to an embodiment of the disclosure may add the second scenario to the scenario list 2033. When a user input related to the second scenario is later received through the second home appliance, the server device 2000 may control the operation of the cleaning robot 1000 according to the second scenario.

For example, referring to 900-2 of FIG. 9, when the server device 2000 receives the user input of selecting recommended scenario A 901 from the recommended scenario list 910, the server device 2000 may add recommended scenario A 901 to the scenario list 2033. Thereafter, the user may find recommended scenario A 901 in the scenario list 2033. When the user touches the reservation button of the induction range three times, the server device 2000 may transmit a control command to clean the vicinity of the induction range to the cleaning robot 1000 according to recommended scenario A 901.

According to an embodiment of the disclosure, the server device 2000 may create and provide a recommended scenario considering the utilization of the user, to allow the user to select and use a useful scenario. Hereinafter, a method of allowing the user to directly define a scenario will be described in detail with reference to FIG. 10.

Figure 10:
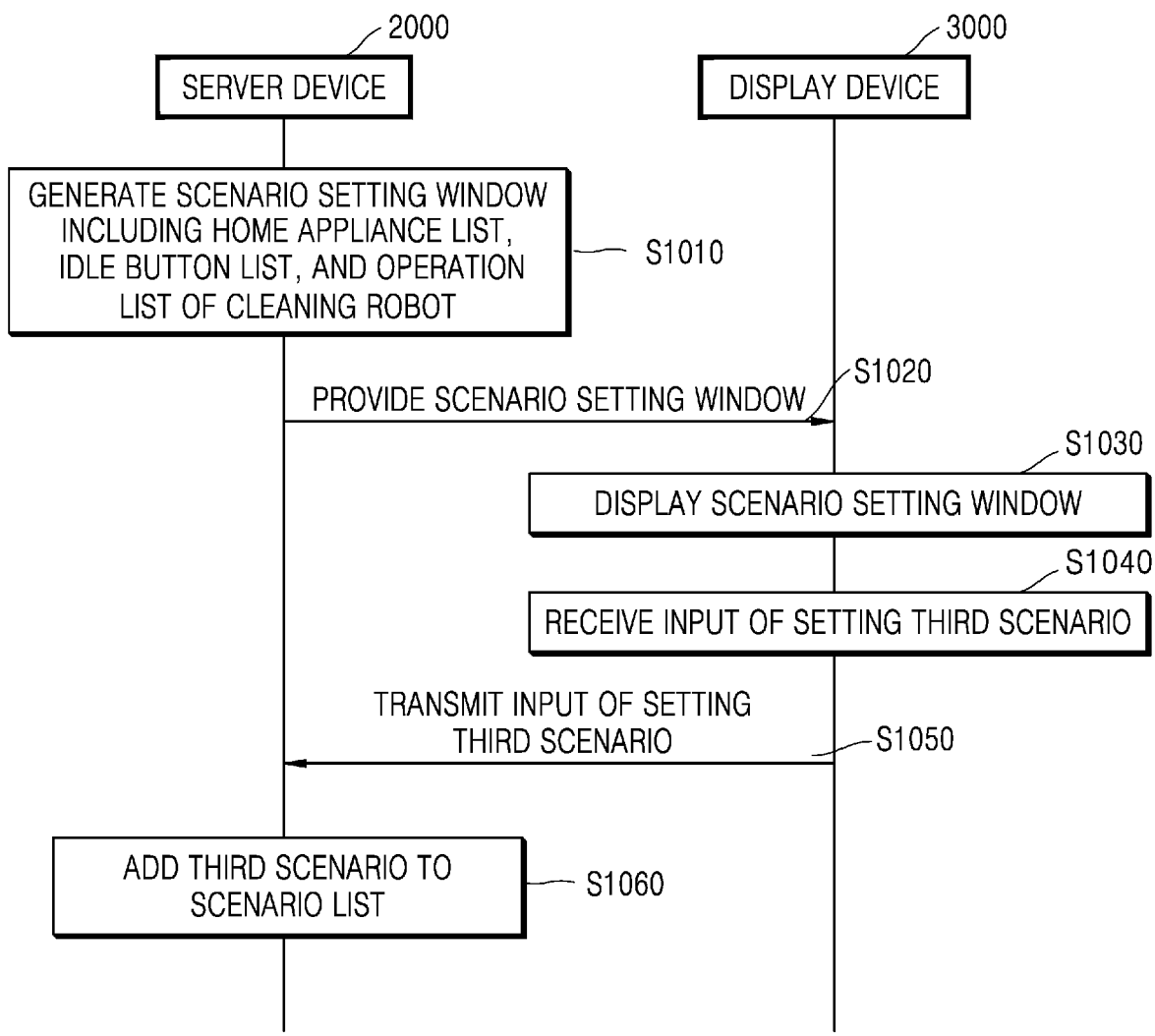
FIG. 10 is a flowchart illustrating a method, performed by a server device, of providing a scenario setting window, according to an embodiment of the disclosure.

FIG. 10 is a flowchart illustrating a method, performed by the server device 2000, of providing a scenario setting window, according to an embodiment of the disclosure.

In operation S1010, the server device 2000 according to an embodiment of the disclosure may generate the scenario setting window including a list of a plurality of home appliances (hereinafter, referred to as a home appliance list), an idle button list, and an operation list of the cleaning robot 1000.

The home appliance list may be a list of home appliances registered in the server device 2000. The home appliance list may include names, nicknames, icon images, and the like of the home appliances. According to an embodiment of the disclosure, in the case where several home appliances of the same type are registered in the server device 2000, the server device 2000 may display nicknames of the home appliances of the same type in the home appliance list. Furthermore, in the case where several home appliances of the same type are registered in the server device 2000, the server device 2000 may display positions of the home appliances of the same type in the home appliance list. For example, in the case where there are three air purifiers in the house and all of the three air purifiers are registered in the server device 2000, the server device 2000 may display, for example, 'Air purifier 1—Living room', 'Air purifier 2—Main bedroom', and 'Air purifier 3—Kitchen', in the home appliance list.

In the idle button list, idle buttons of each home appliance, which are not matched to original functions of the home appliance, may be displayed. The idle button list may be changed according to a home appliance selected from the home appliance list. In the operation list of the cleaning robot 1000, operations provided by the cleaning robot 1000 may be displayed. For example, the operation list of the cleaning robot 1000 may include, but is not limited to, calling (i.e., cleaning the vicinity of a home appliance), returning to the charging station, changing the direction, changing the operation mode, operating in a certain mode (e.g., the intensive mode, the normal mode, the repeat mode, etc.), and the like.

In operation S1020, the server device 2000 according to an embodiment of the disclosure may provide the scenario setting window to the display device 3000. For example, when the display device 3000 executes the predefined application installed in the display device 3000, the server device 2000 may provide the scenario setting window to the display device 3000 through the predefined application. The predefined application may be an application that provides a service related to the cleaning robot 1000 or a home appliance. According to an embodiment of the disclosure, the scenario setting window may be a graphical user interface (GUI) for setting a scenario.

In operation S1030, the display device 3000 according to an embodiment of the disclosure may display the scenario setting window.

According to an embodiment of the disclosure, when the user executes the predefined application installed in the display device 3000, the display device 3000 may display the scenario setting window in the execution window of the predefined application.

In operation S1040, the display device 3000 according to an embodiment of the disclosure may receive an input of setting a third scenario through the scenario setting window.

For example, the display device 3000 may receive, from the user, an input of, through the scenario setting window, selecting a third home appliance from the home appliance list, selecting a third idle button from the idle button list, and selecting a third operation of the cleaning robot 1000 from the operation list of the cleaning robot 1000. In this case, the third scenario may be defined by matching the third idle button of the third home appliance to the third operation of the cleaning robot 1000, which are selected by the user.

According to an embodiment of the disclosure, when the user selects 'call' from the operation list of the cleaning robot 1000, the destination may be automatically set to the vicinity of the third home appliance. According to another embodiment of the disclosure, when the user selects 'call' from the operation list of the cleaning robot 1000, a pop-up window for selecting the destination may be displayed in the scenario setting window. In this case, the user may select the destination from the indoor space map 500 or the floor plan generated by the cleaning robot 1000.

In operation S1050, the display device 3000 according to an embodiment of the disclosure may transmit an input of setting the third scenario to the server device 2000. The server device 2000 according to an embodiment of the disclosure may receive, through the display device 3000, the input of setting the third scenario related to the idle button of the third home appliance. For example, the server device 2000 may receive the input of setting the third scenario through the predefined application being executed on the display device 3000.

According to an embodiment of the disclosure, by selecting the third home appliance from the home appliance list, selecting the third idle button from the idle button list, and selecting the third operation from the operation list of the cleaning robot 1000, the user may define the third scenario in which the third idle button of the third home appliance is matched to the third operation of the cleaning robot 1000, which are selected by the user.

In operation S1060, the server device 2000 according to an embodiment of the disclosure may add the third scenario to the scenario list 2033.

When a user input related to the third scenario is later received through the third home appliance, the server device 2000 may control the operation of the cleaning robot 1000 according to the third scenario.

According to an embodiment of the disclosure, the server device 2000 may provide the scenario setting window to the user, to allow the user to define a necessary scenario by himself or herself. Hereinafter, an operation, performed by the server device 2000, of providing the scenario setting window will be described in more detail with reference to FIG. 11.

Figure 11:
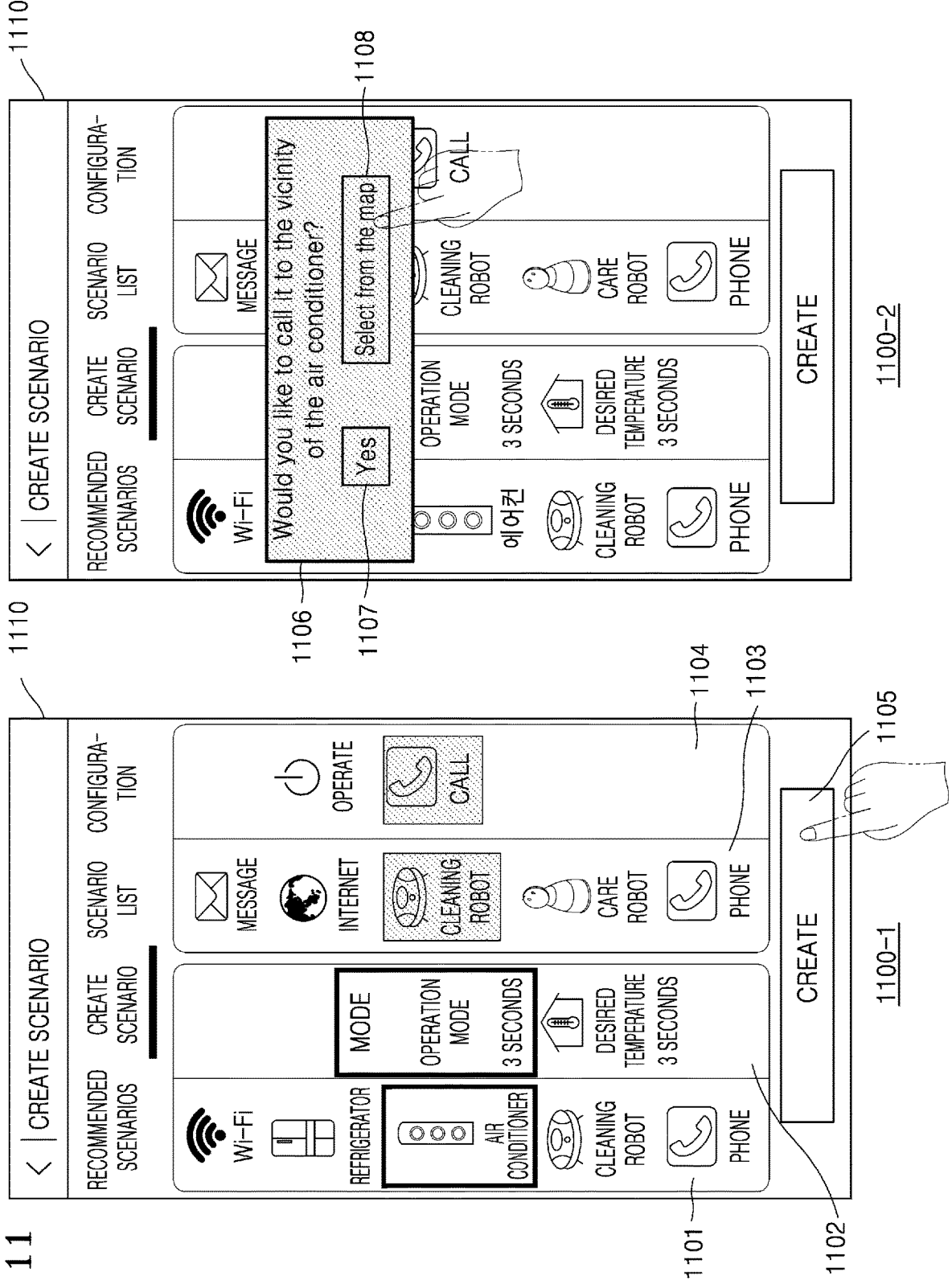
FIG. 11 is a diagram illustrating an operation, performed by a server device, of receiving a scenario setting from a user through a scenario setting window, according to an embodiment of the disclosure.

FIG. 11 is a diagram illustrating an operation, performed by the server device, of receiving a scenario setting from the user through a scenario setting window 1110, according to an embodiment of the disclosure.

Referring to 1100-1 of FIG. 11, the scenario setting window 1110 may include a home appliance list 1101, an idle button list 1102, a control target device list 1103, and an operation list 1104. The user may check the scenario setting window 1110, and, in order to set a scenario by himself or herself, select the air conditioner from the home appliance list 1101, select an input of pressing an operation mode button for 3 seconds from the idle button list 1102, select the cleaning robot 1000 from the control target device list 1103, and select a call icon from the operation list 1104. In addition, when the user presses a create icon 1105, a new scenario, which is "Press the operation mode button of the air conditioner for 3 seconds to call the cleaning robot 1000 to the vicinity of the air conditioner", may be created.

Referring to 1100-2 of FIG. 11, when the user selects the call icon from the operation list 1104, a pop-up window 1106 for confirming the destination may be displayed on the scenario setting window 1110. For example, the pop-up window 1106 with the text 'Would you like to call it to the vicinity of the air conditioner?' may be displayed on the scenario setting window 1110.

When the user selects 'Yes' 1107 in the pop-up window 1106, the server device 2000 may automatically set the destination to the vicinity of the air conditioner. When the user selects 'Select the destination from the map' 1108 in the pop-up window 1106, the server device 2000 may provide a map image to the display device 3000. In this case, the map image may be the indoor space map 500 generated by the cleaning robot 1000 or a pre-stored floor plan image.

Figure 12:
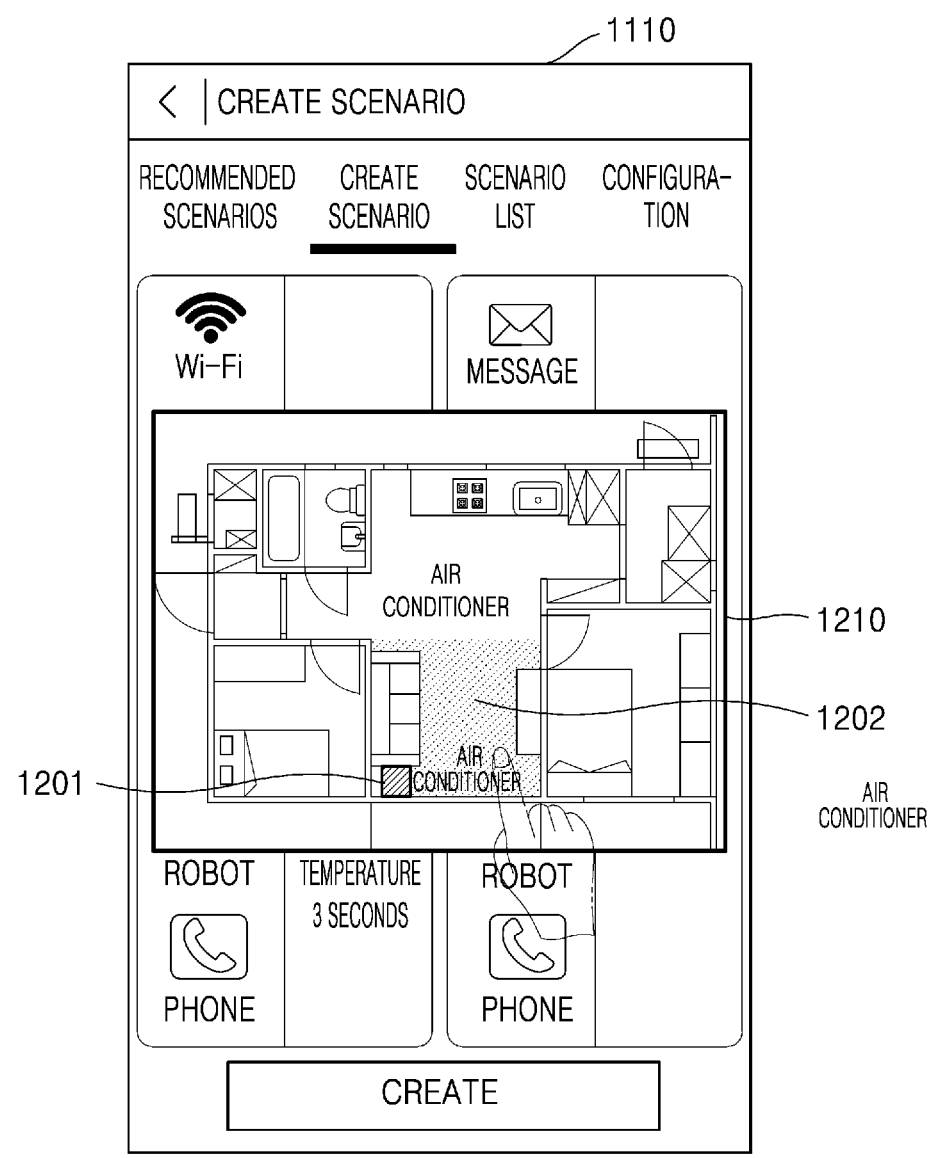
FIG. 12 is a diagram illustrating an operation, performed by a server device, of receiving an input of setting a destination in a map image of a cleaning robot, according to an embodiment of the disclosure.

Referring to FIG. 12, the server device 2000 may provide a map image 1210 on the scenario setting window 1110 on the display device 3000. In this case, the positions of home appliances may be indicated in the map image 1210. The user may check the map image 1210 and designate, as the destination, a living room area 1202 in which an air conditioner 1201 is located.

In this case, when the server device 2000 may newly create a scenario of, when the operation mode button of the air conditioner 1201 is pressed for 3 seconds, calling the cleaning robot 1000 to the vicinity of the air conditioner 1201 (i.e., the living room area 1202), and add the newly created scenario to the scenario list 2033.

Thereafter, when the user presses the operation mode button of the air conditioner 1201 for 3 seconds, the server device 2000 may transmit, to the cleaning robot 1000, a control command to clean the vicinity of the air conditioner 1201 (i.e., the living room area 1202) according to the newly created scenario.

Figure 13:
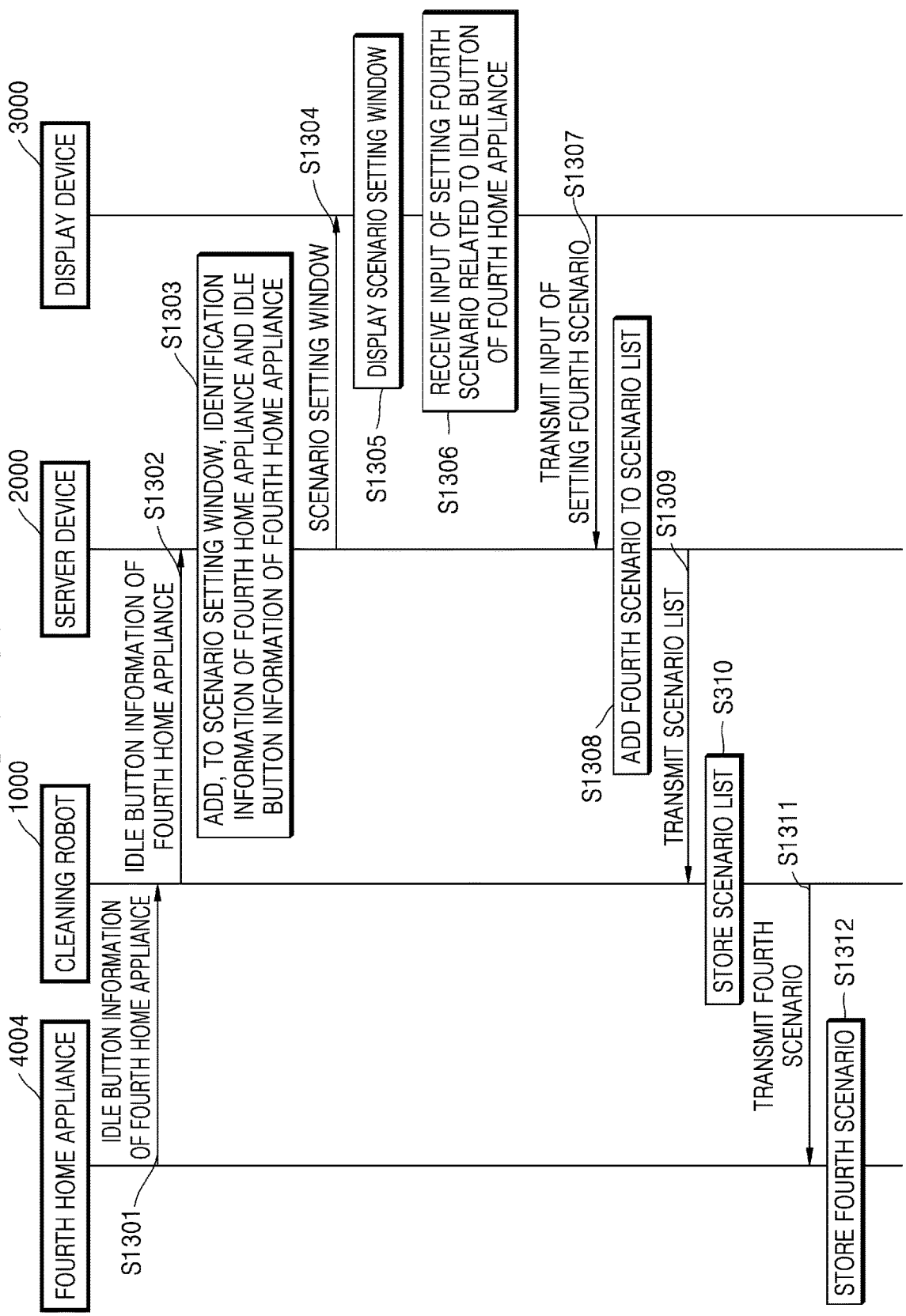
FIG. 13 is a flowchart illustrating a method of setting a scenario by using an idle button of a home appliance which is not connected to a server device, according to an embodiment of the disclosure.

FIG. 13 is a flowchart illustrating a method of setting a scenario by using an idle button of a home appliance which is not connected to the server device 2000, according to an embodiment of the disclosure. The case where a fourth home appliance 4004 is the home appliance which is not connected to the server device 2000 will be described as an example with reference to FIG. 13.

In operation S1301, the cleaning robot 1000 may obtain, from the fourth home appliance 4004 which is not connected to the server device 2000, idle button information of the fourth home appliance 4004.

Here, the idle button information may refer to information about an idle button that is not matched to a function provided by the fourth home appliance 4004. Meanwhile, when information about fixed buttons is provided to the server device 2000, the server device 2000 may newly define the idle button other than the fixed buttons, and thus the idle button information may include the information about the fixed buttons.

According to an embodiment of the disclosure, the cleaning robot 1000 may also receive the information about the fixed buttons of the fourth home appliance 4000 and manual information including the information about the idle button of the fourth home appliance 4000, through short-range wireless communication (e.g., Wi-Fi Direct or Bluetooth, etc.).

In operation S1302, the cleaning robot 1000 may transmit the idle button information of the fourth home appliance 4004 to the server device 2000. In this case, according to an embodiment of the disclosure, the cleaning robot 1000 may request the server device 2000 to register information of the fourth home appliance 4004 in the server device 2000.

In operation S1303, the server device 2000 may add, to the scenario setting window, identification information of the fourth home appliance 4004 and the idle button information of the fourth home appliance 4004.

According to an embodiment of the disclosure, the identification information and the idle button information of the fourth home appliance 4004 may be added to the scenario setting window in the form of an icon.

According to an embodiment of the disclosure, in the case where the idle button information of the fourth home appliance 4004 includes only the information about the fixed buttons, the server device 2000 may newly define the idle button of the fourth home appliance 4004. According to another embodiment of the disclosure, the server device 2000 may obtain manual information of the fourth home appliance 4004 from an external server based on the identification information of the fourth home appliance 4004. In this case, the server device 2000 may search the manual information for the idle button of the fourth home appliance 4004.

In operation S1304, the server device 2000 may provide the scenario setting window to the display device 3000. In operation S1305, the display device 3000 may display the scenario setting window. In this case, the identification information of the fourth home appliance 4004 and the idle button of the fourth home appliance 4004 may be added to the scenario setting window.

According to an embodiment of the disclosure, when the user executes the predefined application installed in the display device 3000, the display device 3000 may display the scenario setting window through the execution window of the predefined application.

In operation S1306, the display device 3000 may receive an input of setting a fourth scenario related to the idle button of the fourth home appliance.

For example, the display device 3000 may receive, from the user through the scenario setting window, an input of selecting the fourth home appliance 4004 from the home appliance list, selecting a fourth idle button from the idle button list, and selecting a fourth operation from the operation list of the cleaning robot 1000. In this case, the fourth scenario may be defined by matching the fourth idle button of the fourth home appliance 4004 to the fourth operation of the cleaning robot 1000, which are selected by the user.

According to an embodiment of the disclosure, when the user selects 'call' from the operation list of the cleaning robot 1000, the destination may be automatically set to the vicinity of the fourth home appliance 4004. According to another embodiment of the disclosure, when the user selects 'call' from the operation list of the cleaning robot 1000, a pop-up window for selecting the destination may be displayed on the scenario setting window. In this case, the user may select the destination from the indoor space map 500 or the floor plan generated by the cleaning robot 1000.

In operation S1307, the display device 3000 according to an embodiment of the disclosure may transmit the input of setting the fourth scenario to the server device 2000. That is, the server device 2000 according to an embodiment of the disclosure may receive, through the display device 3000, the input of setting the fourth scenario related to the idle button of the fourth home appliance 4004. For example, the server device 2000 may receive the input of setting the fourth scenario, through the predefined application being executed on the display device 3000.

According to an embodiment of the disclosure, by selecting the fourth home appliance 4004 from the home appliance list, selecting the fourth idle button from the idle button list, and selecting the fourth operation from the operation list of the cleaning robot 1000, the user may define the fourth scenario in which the fourth idle button of the fourth home appliance 4004 is matched to the fourth operation of the cleaning robot 1000, which are selected by the user.

In operation S1308, the server device 2000 according to an embodiment of the disclosure may add the fourth scenario to the scenario list 2033. In addition, in operation S1309, the server device 2000 according to an embodiment of the disclosure may transmit the scenario list 2033 to the cleaning robot 1000 through wireless communication. According to an embodiment of the disclosure, the server device 2000 may periodically transmit the scenario list 2033 to the cleaning robot 1000, or may transmit, only when an event of updating the scenario list 2033 occurs, the updated scenario list 2033 to the cleaning robot 1000.

According to an embodiment of the disclosure, in the case where the cleaning robot 1000 has the scenario list 2033 pre-stored therein, the server device 2000 may transmit only information about the newly created fourth scenario to the cleaning robot 1000.

In operation S1310, the cleaning robot 1000 according to an embodiment of the disclosure may store the scenario list 2033 in a memory.

According to an embodiment of the disclosure, in the case where the server device 2000 transmits only the information about the newly created fourth scenario to the cleaning robot 1000, the cleaning robot 1000 may update the pre-stored scenario list 2033 by adding the fourth scenario thereto.

In operation S1311, the cleaning robot 1000 according to an embodiment of the disclosure may transmit the fourth scenario from the scenario list 2033 to the fourth home appliance 4004. According to an embodiment of the disclosure, the cleaning robot 1000 may transmit the information about the fourth scenario to the fourth home appliance 4004 through short-range wireless communication (e.g., Wi-Fi Direct or Bluetooth, etc.).

In operation S1312, the fourth home appliance 4004 according to an embodiment of the disclosure may store the fourth scenario received from the cleaning robot 1000 in a memory. According to an embodiment of the disclosure, the fourth home appliance 4004 may store the fourth scenario in a secure area (e.g., a trust zone). The secure area (e.g., the trust zone) may be an area accessible only by authorized devices (e.g., the cleaning robot 1000).

According to various embodiments of the disclosure, some of operations S1301 to S1312 of FIG. 13 may be omitted, and the order of some of operations S1301 to S1312 may be changed.

Figure 14:
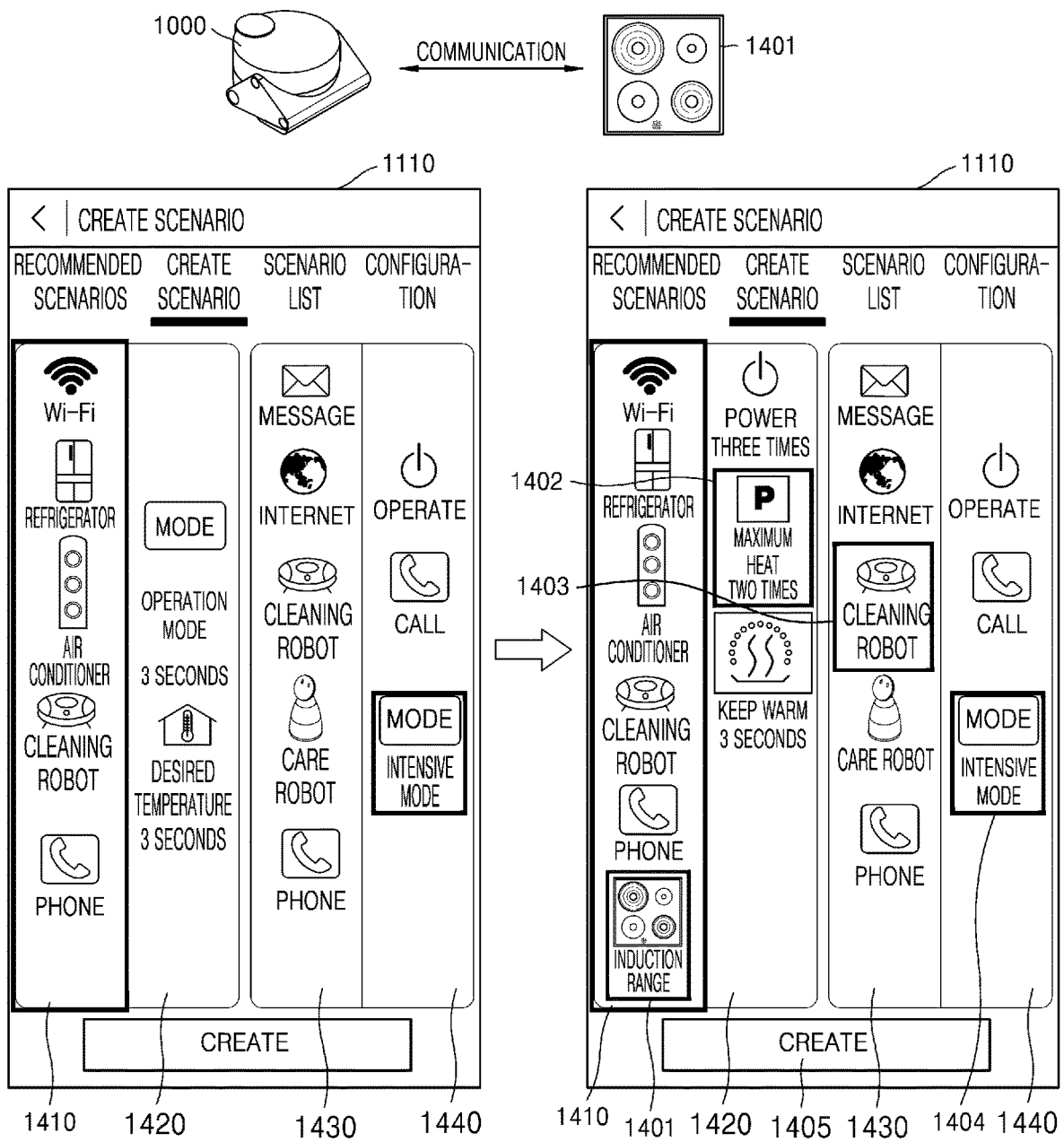
FIG. 14 is a diagram illustrating an operation of setting a scenario by using an idle button of a home appliance which is not connected to a server device, according to an embodiment of the disclosure.

FIG. 14 is a diagram illustrating an operation of setting a scenario by using an idle button of a home appliance which is not connected to the server device, according to an embodiment of the disclosure. The case where an induction range 1401 is the fourth home appliance 4004 which is not connected to the server device 2000 will be described as an example with reference to FIG. 14.

Referring to FIG. 14, the cleaning robot 1000 may perform short-range wireless communication (e.g., Wi-Fi Direct or Bluetooth) with the induction range 1401. In this case, the cleaning robot 1000 may receive, from the induction range 1401, idle button information of the induction range 1401.

Because the induction range 1401 is unable to communicate with the server device 2000, the cleaning robot 1000 may transmit, to the server device 2000, identification information of the induction range 1401 (e.g., a model name, a shipping region, OS information, a MAC address, etc.) and the idle button information of the induction range 1401. When the server device 2000 receives the identification information and the idle button information of the induction range 1401, an identification item of the induction range 1401 and an idle button item of the induction range 1401 may be added to the scenario setting window 1110. For example, the server device 2000 may add an icon of the induction range 1401 to a home appliance list 1410 in the scenario setting window 1110, and add, to an idle button list 1420, an input pattern of touching a power button three times, an input pattern of touching a maximum heat button twice, and an input pattern of pressing a keep warm button for 3 seconds.

The user may check the scenario setting window 1110, and, in order to set a scenario by himself or herself, select the icon of the induction range 1401 from the home appliance list 1410, select an input pattern 1402 of touching the maximum heat button twice from the idle button list 1420, select an icon 1403 of the cleaning robot 1000 from a control target device list 1430, and select an intensive mode icon 1404 from an operation list 1440. In addition, when the user presses a create icon 1405, the fourth scenario, which is "Touch the maximum heat button of the induction range 1401 twice to command the cleaning robot 1000 to clean the vicinity of the induction range 1401 in the intensive mode", may be newly created.

The server device 2000 may add the newly created fourth scenario to the scenario list 2033. In addition, the server device 2000 may transmit information about the newly created fourth scenario to the cleaning robot 1000. Because the new fourth scenario received from the server device 2000 is related to the induction range 1401, the cleaning robot 1000 may transmit the information about the fourth scenario to the induction range 1401. The induction range 1401 may store the fourth scenario in a secure zone (e.g., a trust zone).

Hereinafter, an operation, performed by the fourth home appliance 4004, of controlling the cleaning robot 1000 directly rather than through the server device 2000 by using the fourth scenario will be described with reference to FIG. 15.

Figure 15:
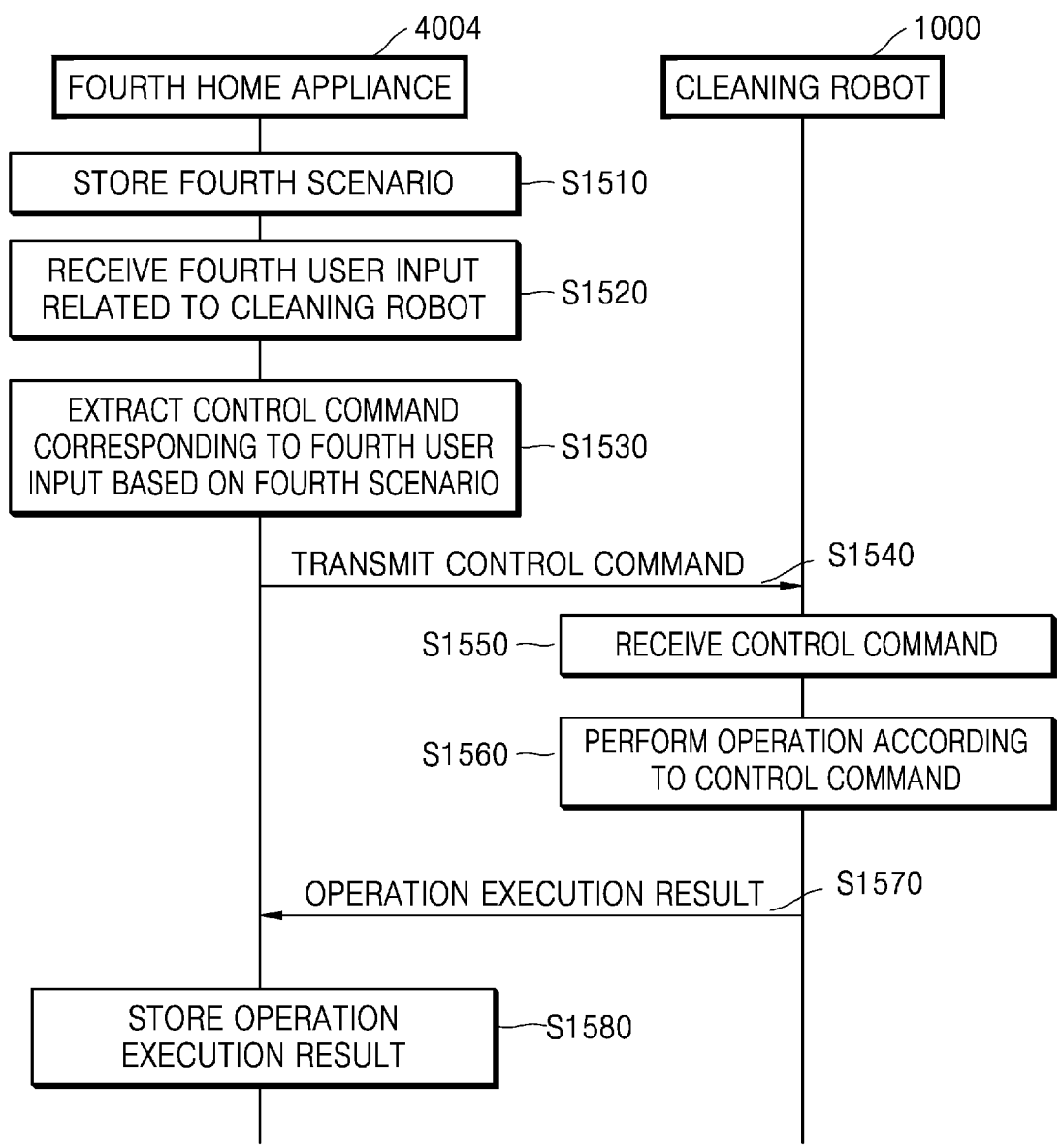
FIG. 15 is a flowchart illustrating an operation, performed by a home appliance, of controlling a cleaning robot through short-range wireless communication, according to an embodiment of the disclosure.

FIG. 15 is a flowchart illustrating an operation, performed by a home appliance, of controlling the cleaning robot 1000 through short-range wireless communication, according to an embodiment of the disclosure.

In operation S1510, the fourth home appliance 4004 according to an embodiment of the disclosure may store the fourth scenario in a memory. For example, the fourth home appliance 4004 may receive the fourth scenario created by the server device 2000, through the cleaning robot 1000. In this case, the fourth home appliance 4004 may store the fourth scenario in a secure area (e.g., a trust zone) of the memory. The fourth scenario may be a scenario in which the idle button of the fourth home appliance 4004 is matched to at least one operation of the cleaning robot 1000. For example, referring to FIG. 14, in the case where the fourth home appliance 4004 is the induction range 1401, in the fourth scenario, an input of touching the maximum heat button twice may be defined as the idle button of the fourth home appliance 4004, and an operation of cleaning the vicinity of the induction range 1401 in the intensive mode may be defined as an operation of the cleaning robot 1000.

In operation S1520, the fourth home appliance 4004 according to an embodiment of the disclosure may receive a fourth user input related to the cleaning robot 1000. In this case, the fourth user input may be an input predefined in the fourth scenario in relation to the operation of the cleaning robot 1000. Also, the fourth user input may be an input related to an idle button which is not matched to an original function of the fourth home appliance 4004.

For example, referring to FIG. 14, in the case where the fourth home appliance 4004 is the induction range 1401, the fourth user input may be an input of touching the maximum heat button of the induction range 1401 for 2 seconds in the fourth scenario. The input of touching the maximum heat button of the induction range 1401 for 2 seconds may be irrelevant to the heating functions of the induction range 1401 and other functions provided by the induction range 1401. The input of touching the maximum heat button of the induction range 1401 for 2 seconds may be matched only to an operation of calling the cleaning robot 1000.

In operation S1530, the fourth home appliance 4004 according to an embodiment of the disclosure may extract a control command corresponding to the fourth user input based on the fourth scenario stored in the memory. For example, the fourth home appliance 4004 may select the fourth scenario including the fourth user input from the scenario list 2033. The fourth home appliance 4004 according to an embodiment of the disclosure may extract, from the fourth scenario, the control command including movement position information of the cleaning robot 1000. The movement position information of the cleaning robot 1000 may be information about a destination to which the cleaning robot 1000 is required to move. For example, the movement position information of the cleaning robot 1000 may include, but is not limited to, the identification information of the fourth home appliance 4004, position information of the fourth home appliance 4004, the position information of the charging station, route information (e.g., navigation information) for moving to the fourth home appliance 4004, etc.

For example, referring to FIG. 14, in the case where the fourth user input is an input of touching the maximum heat button of the induction range 1401 twice, the induction range 1401 may select, from the scenario list 2033, the fourth scenario related to the input of touching the maximum heat button of the induction range 1401 twice (e.g., 'Touch the maximum heat button of the induction range 1401 twice to command the cleaning robot 1000 to clean the vicinity of the induction range 1401 in the intensive mode'). In addition, the induction range 1401 may extract, as the control command, the operation of cleaning the vicinity of the induction range 1401 in the intensive mode, based on the fourth scenario.

In operation S1540, the fourth home appliance 4004 according to an embodiment of the disclosure may transmit the control command to the cleaning robot 1000. In this case, the fourth home appliance 4000 may transmit the control command to the cleaning robot 1000 by using short-range wireless communication (e.g., Wi-Fi Direct or Bluetooth).

According to an embodiment of the disclosure, in the case where the fourth scenario includes an operation of calling the cleaning robot 1000 to the vicinity of the fourth home appliance 4004, the fourth home appliance 4004 may extract the control command including the position information of the fourth home appliance 4004. In the case where the cleaning robot 1000 has the indoor space map 500 in which the positions of the home appliances are indicated, because the cleaning robot 1000 is able to move to the vicinity of the fourth home appliance 4004 even when only the identification information of the fourth home appliance 4004 is notified to the cleaning robot 1000, the fourth home appliance 4004 may transmit, to the cleaning robot 1000, the identification information of the fourth home appliance 4004 as the position information of the fourth home appliance 4004.

According to an embodiment of the disclosure, in the case where the fourth scenario includes an operation, performed by the cleaning robot 1000, of cleaning the vicinity of the fourth home appliance 4004 in the intensive mode, the fourth home appliance 4004 may extract a control command including the position information of the fourth home appliance 4004 and operation mode information of the cleaning robot 1000. In the case where the control command is to return to the charging station, the movement position information of the cleaning robot 1000 may be the information about the position of the charging station.

Referring to FIG. 14, in the case where the fourth scenario (i.e., 'Touch the maximum heat button of the induction range 1401 twice to command the cleaning robot 1000 to clean the vicinity of the induction range 1401 in the intensive mode') is selected from the scenario list 2033, the fourth home appliance 4004 (i.e., the induction range 1401) may extract, from the fourth scenario, a control command to 'clean the vicinity of the induction range 1401 in the intensive mode'. In addition, the fourth home appliance 4004 (i.e., the induction range 1401) may transmit the extracted control command to the cleaning robot 1000.

In operation S1550, the cleaning robot 1000 according to an embodiment of the disclosure may receive the control command from the fourth home appliance 4004. For example, the cleaning robot 1000 may receive the control command from the fourth home appliance 4004 through short-range wireless communication (e.g., Wi-Fi Direct or Bluetooth).

In operation S1560, the cleaning robot 1000 according to an embodiment of the disclosure may perform an operation according to the control command.

For example, in the case where the control command is to clean the vicinity of the fourth home appliance 4004, the cleaning robot 1000 may move to the vicinity of the fourth home appliance 4004 based on the indoor space map 500. Then, the cleaning robot 1000 may plan a cleaning route for the vicinity of the fourth home appliance 4004 and complete a cleaning operation along the planned cleaning route. When the cleaning robot 1000 recognizes an obstacle around the fourth home appliance 4004 while cleaning, the cleaning robot 1000 may modify the planned cleaning route, or may stop the cleaning of the vicinity of the fourth home appliance 4004. For example, when the obstacle is not large, the cleaning robot 1000 may modify the cleaning route to bypass the obstacle and complete the cleaning, whereas, when the obstacle is too large to continue the cleaning, the cleaning robot 1000 may stop the cleaning and return to the charging station.

In operation S1570, the cleaning robot 1000 according to an embodiment of the disclosure may transmit an operation execution result to the fourth home appliance 4004 through short-range wireless communication (e.g., Wi-Fi Direct or Bluetooth).

According to an embodiment of the disclosure, the operation execution result may include information such as 'Cleaning completed', 'Cleaning stopped, 'Cleaning partially completed', etc., but is not limited thereto. In addition, the operation execution result may include information about a cleaning history (e.g., a map image in which a route through which the cleaning robot 1000 has traveled is indicated).

In operation S1580, the fourth home appliance 4004 according to an embodiment of the disclosure may store the operation execution result of the cleaning robot 1000. For example, the fourth home appliance 4004 may have information such as whether the cleaning of the vicinity of the fourth home appliance 4004 is completed or whether the cleaning is stopped due to an obstacle or the like.

In the case where the cleaning robot 1000 did not complete the cleaning of the vicinity of the fourth home appliance 4004, the fourth home appliance 4004 may later call the cleaning robot 1000 to the vicinity of the fourth home appliance 4004 again, based on the operation execution result of the cleaning robot 1000.

According to an embodiment of the disclosure, the cleaning robot 1000 may be called by using an idle button of a home appliance, which is not connected to the server device 2000, among the home appliances in the house.

Figure 16:
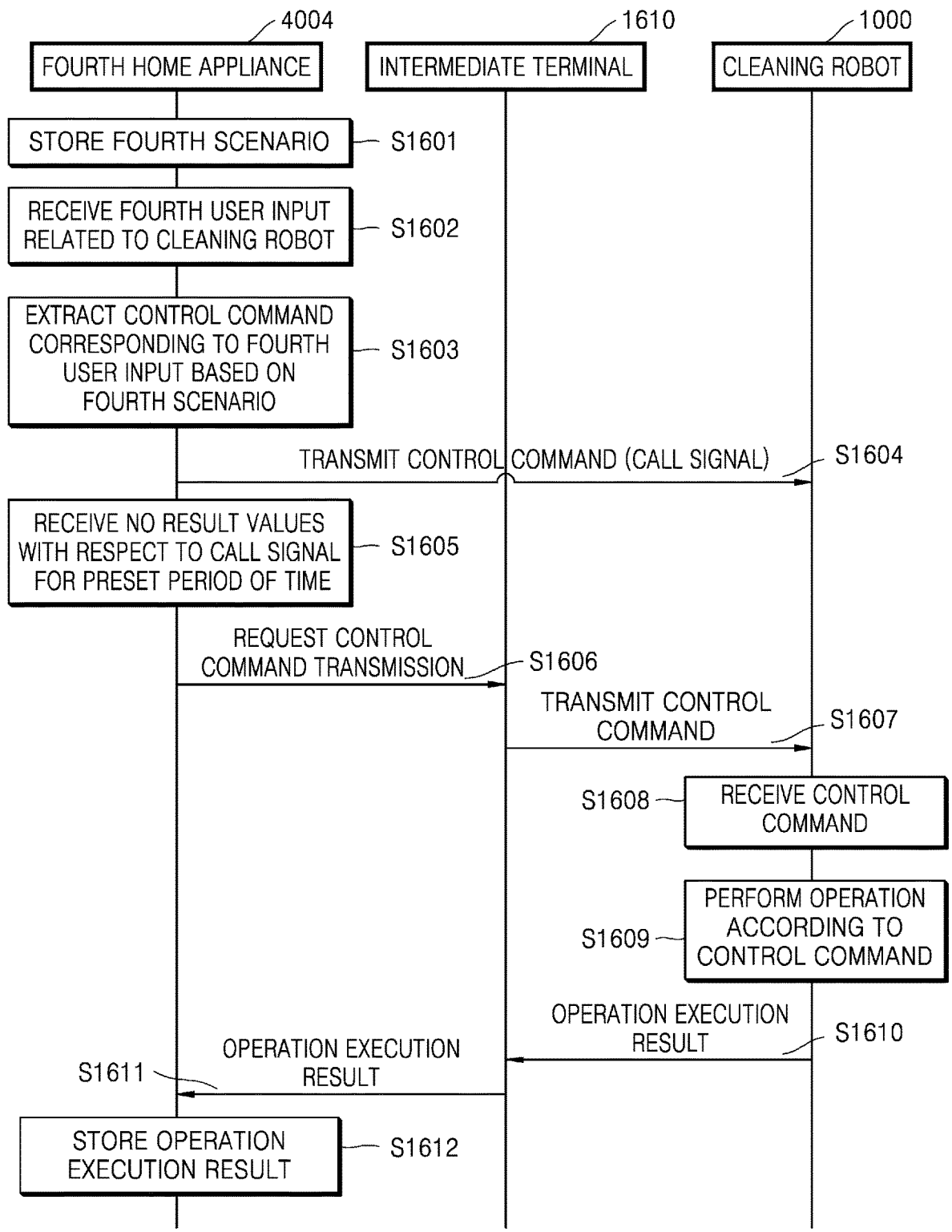
FIG. 16 is a flowchart illustrating an operation, performed by a home appliance, of controlling a cleaning robot through an intermediate terminal in a house, according to an embodiment of the disclosure.

FIG. 16 is a flowchart illustrating an operation, performed by a home appliance, of controlling the cleaning robot 1000 through an intermediate terminal 1610 in the house, according to an embodiment of the disclosure.

In operation S1601, the fourth home appliance 4004 according to an embodiment of the disclosure may store the fourth scenario in the memory. For example, the fourth home appliance 4004 may receive, through the cleaning robot 1000, the fourth scenario created by the server device 2000. In this case, the fourth home appliance 4004 may store the fourth scenario in the secure area (e.g., the trust zone) of the memory. The fourth scenario may be a scenario in which a user input related to the idle button of the fourth home appliance 4004 is matched to at least one operation of the cleaning robot 1000.

In operation S1602, the fourth home appliance 4004 according to an embodiment of the disclosure may receive the fourth user input related to the cleaning robot 1000. In this case, the fourth user input may be an input predefined in the fourth scenario in relation to an operation of the cleaning robot 1000. Also, the fourth user input may be an input related to the idle button which is not matched to an original function of the fourth home appliance 4004.

In operation S1603, the fourth home appliance 4004 according to an embodiment of the disclosure may extract a control command corresponding to the fourth user input based on the fourth scenario stored in the memory. For example, the fourth home appliance 4004 may select the fourth scenario including the fourth user input from the scenario list 2033. In addition, the fourth home appliance 4004 may extract, from the fourth scenario, the control command including movement position information of the cleaning robot 1000. The movement position information of the cleaning robot 1000 may be information about a destination to which the cleaning robot 1000 is required to move.

In operation S1604, the fourth home appliance 4004 according to an embodiment of the disclosure may transmit the control command to the cleaning robot 1000. In this case, the fourth home appliance 4004 may transmit the control command to the cleaning robot 1000 by using short-range wireless communication (e.g., Wi-Fi Direct or Bluetooth).

For example, in the case where the control command is to call the cleaning robot 1000 to the vicinity of the fourth home appliance 4004, the fourth home appliance 4004 may transmit a call signal to the cleaning robot 1000.

Operations S1601 to S1604 correspond to operations S1510 to S1540 of FIG. 15, and thus a detailed description thereof will be omitted.

In operation S1605, the fourth home appliance 4004 according to an embodiment of the disclosure may not receive a result value with respect to the call signal for a preset period of time. For example, when the cleaning robot 1000 is far away from the fourth home appliance 4004, a short-range wireless communication signal may not be transmitted well to the cleaning robot 1000. In this case, because the cleaning robot 1000 is unable to receive the control command from the fourth home appliance 4004, the cleaning robot 1000 is unable to perform the control command and transmit a message indicating that a cleaning operation is complete to the fourth home appliance 4004.

In operation S1606, when the fourth home appliance 4004 according to an embodiment of the disclosure did not receive the result value with respect to the call signal for the preset period of time, the fourth home appliance 4004 may transmit, to the intermediate terminal 1610, a request to transmit the control command to the cleaning robot 1000. The fourth home appliance 4004 may transmit, to the intermediate terminal 1610, the request to transmit the control command to the cleaning robot 1000 by using short-range wireless communication (e.g., Wi-Fi, Wi-Fi Direct, Bluetooth, etc.).

According to an embodiment of the disclosure, the intermediate terminal 1610 may be a terminal serving as a hub of home appliances. The intermediate terminal may be a home appliance such as a refrigerator, a TV, or an air conditioner, or may be a router or a gateway device, but is not limited thereto.

In operation S1607, the intermediate terminal 1610 may transmit the control command to the cleaning robot 1000. The intermediate terminal 1610 may transmit the control command to the cleaning robot 1000 through short-range wireless communication (e.g., Wi-Fi, Wi-Fi Direct, Bluetooth, etc.).

In operation S1608, the cleaning robot 1000 according to an embodiment of the disclosure may receive the control command from the intermediate terminal 1610.

In operation S1609, the cleaning robot 1000 according to an embodiment of the disclosure may perform an operation according to the control command.

For example, in the case where the control command is to clean the vicinity of the fourth home appliance 4004, the cleaning robot 1000 may move to the vicinity of the fourth home appliance 4004 based on the indoor space map 500. Then, the cleaning robot 1000 may plan a cleaning route for the vicinity of the fourth home appliance 4004, and complete a cleaning operation along the planned cleaning route. When the cleaning robot 1000 recognizes an obstacle around the fourth home appliance 4004 while cleaning, the cleaning robot 1000 may modify the planned cleaning route, or may stop the cleaning of the vicinity of the fourth home appliance 4004. For example, when the obstacle is not large, the cleaning robot 1000 may modify the cleaning route to bypass the obstacle and complete the cleaning, whereas, when the obstacle is too large to continue the cleaning, the cleaning robot 1000 may stop the cleaning and return to the charging station.

In operation S1610, the cleaning robot 1000 according to an embodiment of the disclosure may transmit an operation execution result to the intermediate terminal 1610. According to an embodiment of the disclosure, the cleaning robot 1000 may transmit the operation execution result to the intermediate terminal 1610 through short-range wireless communication (e.g., Wi-Fi, Wi-Fi Direct, or Bluetooth).

According to an embodiment of the disclosure, the operation execution result may include information such as 'Cleaning completed', 'Cleaning stopped, 'Cleaning partially completed', etc., but is not limited thereto. In addition, the operation execution result may include information about a cleaning history (e.g., a map image in which a route through which the cleaning robot 1000 has traveled is indicated).

In operation S1611, the intermediate terminal 1610 according to an embodiment of the disclosure may transmit the operation execution result of the cleaning robot 1000 to the fourth home appliance 4004. According to an embodiment of the disclosure, the intermediate terminal 1610 may transmit the operation execution result of the cleaning robot 1000 to the fourth home appliance 4004 through short-range wireless communication (e.g., Wi-Fi, Wi-Fi Direct, or Bluetooth).

According to an embodiment of the disclosure, the cleaning robot 1000 may transmit the operation execution result to the fourth home appliance 4004 directly rather than through the intermediate terminal 1610. For example, when the cleaning robot 1000 completes the cleaning of the vicinity of the fourth home appliance 4004, the fourth home appliance 4004 may directly transmit the operation execution result to the home appliance 4004 through short-range wireless communication (e.g., Wi-Fi Direct or Bluetooth).

In operation S1612, the fourth home appliance 4004 according to an embodiment of the disclosure may store the operation execution result of the cleaning robot 1000. For example, the fourth home appliance 4004 may have information such as whether the cleaning of the vicinity of the fourth home appliance 4004 is completed or whether the cleaning is stopped due to an obstacle or the like.

In the case where the cleaning robot 1000 did not complete the cleaning of the vicinity of the fourth home appliance 4004, the fourth home appliance 4004 may later call the cleaning robot 1000 to the vicinity of the fourth home appliance 4004 again, based on the operation execution result of the cleaning robot 1000.

Figure 17:
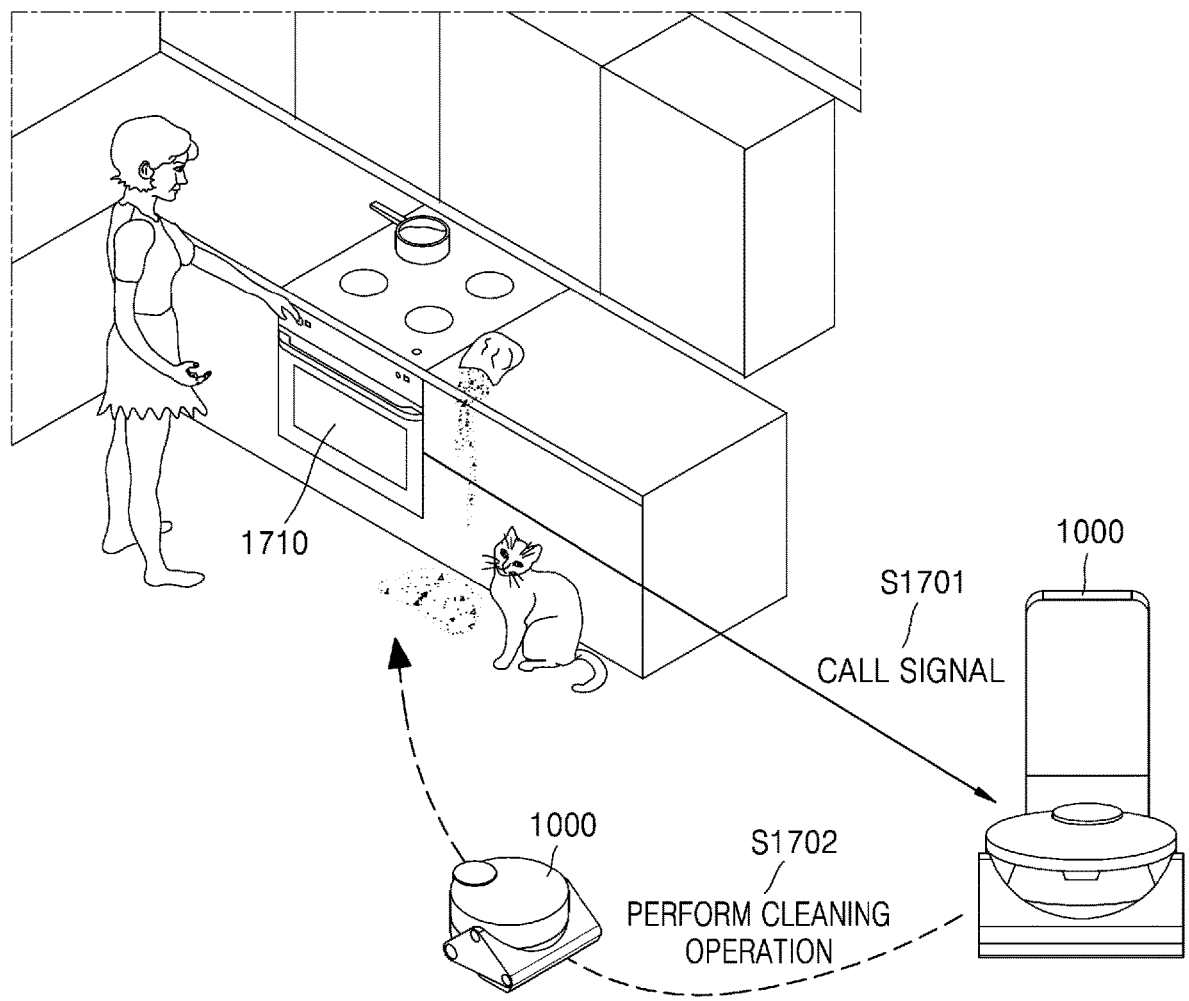
FIG. 17 is a diagram illustrating an operation, performed by an oven, of controlling a cleaning robot based on a user input, according to an embodiment of the disclosure.

FIG. 17 is a diagram illustrating an operation, performed by an oven 1710, of controlling the cleaning robot 1000 based on a user input, according to an embodiment of the disclosure. The case where scenario D of, when a start button of the oven 1710 is touched twice, calling the cleaning robot 1000 to the vicinity of the oven 1710, is stored in the oven 1710 will be described as an example with reference to FIG. 17.

Referring to FIG. 17, in the case where flour on a countertop is spilled onto the floor while the user is cooking in the kitchen, the user may touch the start button of the oven 1710 twice to call the cleaning robot 1000. In this case, the oven 1710 may extract a control command corresponding to an input of touching the start button twice based on scenario D stored in the memory. For example, the oven 1710 may extract, from scenario D, the control command to clean the vicinity of the oven 1710 (i.e., a kitchen area).

The oven 1710 may transmit the control command (i.e., a call signal) to the cleaning robot 1000 through short-range wireless communication (e.g., Wi-Fi Direct or Bluetooth) (S1701). According to an embodiment of the disclosure, in the case where the vicinity of the oven 1710 is designated as the kitchen area in advance, the control command may include position information of the kitchen area. The control command may include identification information of the oven 1710.

When the cleaning robot 1000 receives the control command from the oven 1710, the cleaning robot 1000 may perform a cleaning operation according to the control command (S1702). For example, the cleaning robot 1000 may move to the vicinity of the oven 1710 (i.e., the kitchen area) and plan a cleaning route for cleaning the vicinity of the oven 1710 (i.e., the kitchen area). In this case, the cleaning robot 1000 may move to the vicinity of the oven 1710 (i.e., the kitchen area) and plan the cleaning route by using the indoor space map 500. The cleaning robot 1000 may complete cleaning of the vicinity of the oven 1710 (i.e., the kitchen area) according to the planned cleaning route, and then transmit a cleaning completion message to the oven 1710 through short-range wireless communication (e.g., Wi-Fi Direct or Bluetooth).

According to an embodiment of the disclosure, the server device 2000 transmits, to the oven 1710, the cleaning completion message with respect to the vicinity of the oven 1710, so as to allow the oven 1710 to confirm whether the cleaning of the vicinity of the oven 1710 is completed.

Because the cleaning robot 1000 was called to the vicinity of the oven 1710 while being charged, when the cleaning of the vicinity of the oven 1710 is completed, the cleaning robot 1000 may return to the charging station. According to another embodiment of the disclosure, when the remaining battery level is greater than the threshold value, the cleaning robot 1000 may further perform a cleaning operation along the ordinary cleaning route without returning to the charging station.

Meanwhile, according to an embodiment of the disclosure, when the cleaning robot 1000 did not respond to the control command of the oven 1710 for a preset period of time, the oven 1710 may again transmit the control command to the cleaning robot 1000 through the intermediate terminal 1610.

According to an embodiment of the disclosure, the user may quickly call the cleaning robot 1000 to the kitchen by touching the start button of the oven 1710 twice according to a preset scenario, without searching for a mobile terminal or a remote control device in order to call the cleaning robot 1000 to the kitchen.

Figure 18:
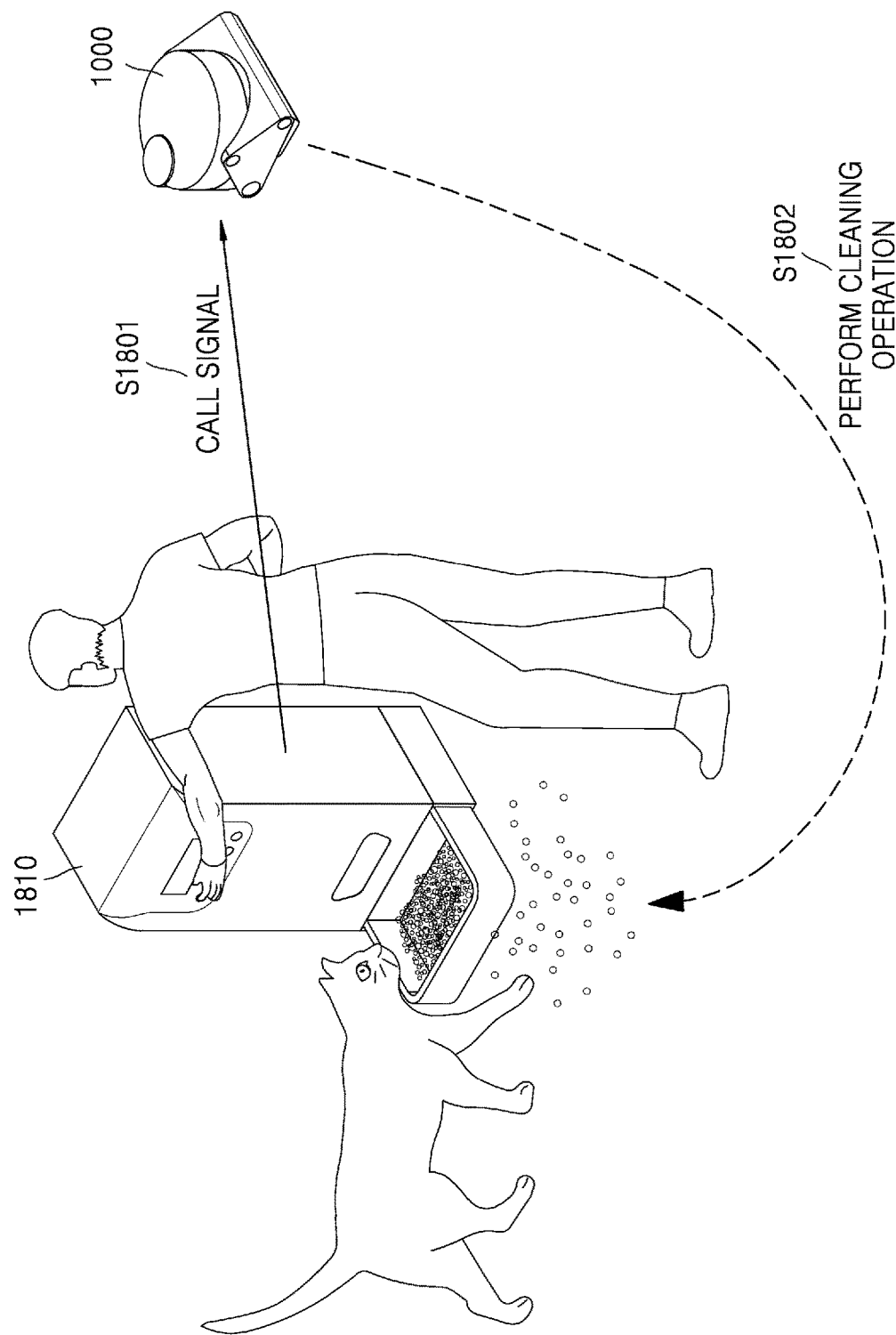
FIG. 18 is a diagram illustrating an operation, performed by an automatic feeder, of controlling a cleaning robot based on a user input, according to an embodiment of the disclosure.

FIG. 18 is a diagram illustrating an operation, performed by an automatic feeder 1810, of controlling the cleaning robot 1000 based on a user input, according to an embodiment of the disclosure. The case where scenario E of, when a power button of the automatic feeder 1810 is touched three times, calling the cleaning robot 1000 to the vicinity of the automatic feeder 1810 is stored in the automatic feeder 1810 will be described as an example with reference to FIG. 18.

Referring to FIG. 18, when a companion animal spills feed distributed by the automatic feeder 1810 onto the floor, the user may touch the power button of the automatic feeder 1810 three times to call the cleaning robot 1000. In this case, the automatic feeder 1810 may extract a control command corresponding to an input of touching the power button three times based on scenario E stored in a memory. For example, the automatic feeder 1810 may extract, from scenario E, the control command to clean the vicinity of the automatic feeder 1810.

The automatic feeder 1810 may transmit the control command (i.e., a call signal) to the cleaning robot 1000 through short-range wireless communication (e.g., Wi-Fi Direct or Bluetooth) (S1801). According to an embodiment of the disclosure, in the case where the vicinity of the automatic feeder 1810 is designated as the main bedroom area in advance, the control command may include position information of the main bedroom area. The control command may include identification information of the automatic feeder 1810.

When the cleaning robot 1000 receives the control command from the automatic feeder 1810, the cleaning robot 1000 may perform a cleaning operation according to the control command (S1802). For example, the cleaning robot 1000 may move to the vicinity of the automatic feeder 1810 (i.e., the main bedroom area) and plan a cleaning route for cleaning the vicinity of the automatic feeder 1810 (i.e., the main bedroom area). In this case, the cleaning robot 1000 may move to the vicinity of the automatic feeder 1810 (i.e., the main bedroom area) and plan the cleaning route by using the indoor space map 500. The cleaning robot 1000 may complete cleaning of the vicinity of the automatic feeder 1810 (i.e., the main bedroom area) according to the planned cleaning route, and then transmit a cleaning completion message to the automatic feeder 1810 through short-range wireless communication (e.g., Wi-Fi Direct or Bluetooth).

According to an embodiment of the disclosure, the server device 2000 transmits, to the automatic feeder 1810, the cleaning completion message with respect to the vicinity of the automatic feeder 1810, so as to allow the automatic feeder 1810 to confirm whether the cleaning of the vicinity of the automatic feeder 1810 is completed.

In the case where the cleaning robot 1000 was called while cleaning the living room, the cleaning robot 1000 may return to the previous cleaning route after completion of the cleaning of the vicinity of the automatic feeder 1810 (i.e., the main bedroom area). For example, in the case where the cleaning robot 1000 was called when it had planned a first cleaning route for the living room area and was cleaning the vicinity of the air conditioner (i.e., point A) along the first cleaning route, the cleaning robot 1000 may return to the vicinity of the air conditioner (i.e., point A) on the first cleaning route. Then, the cleaning robot 1000 may continue to clean an area of the first cleaning route that has not been cleaned.

Meanwhile, according to an embodiment of the disclosure, when the cleaning robot 1000 did not respond to the control command of the automatic feeder 1810 for a preset period of time, the automatic feeder 1810 may again transmit the control command to the cleaning robot 1000 through the intermediate terminal 1610.

According to an embodiment of the disclosure, the user being with the companion animal may quickly call the cleaning robot 1000 to the main bedroom by touching the power button of the automatic feeder 1810 three times according to a preset scenario, without executing a cleaning application of a mobile terminal or searching for a remote control device of the cleaning robot 1000 in order to call the cleaning robot 1000 to the main bedroom.

Hereinafter, a method of performing distributed processing for image information (or sensing information) of the cleaning robot 1000 with home appliances in the house by using idle resources of the home appliances will be described with reference to FIG. 19.

Figure 19:
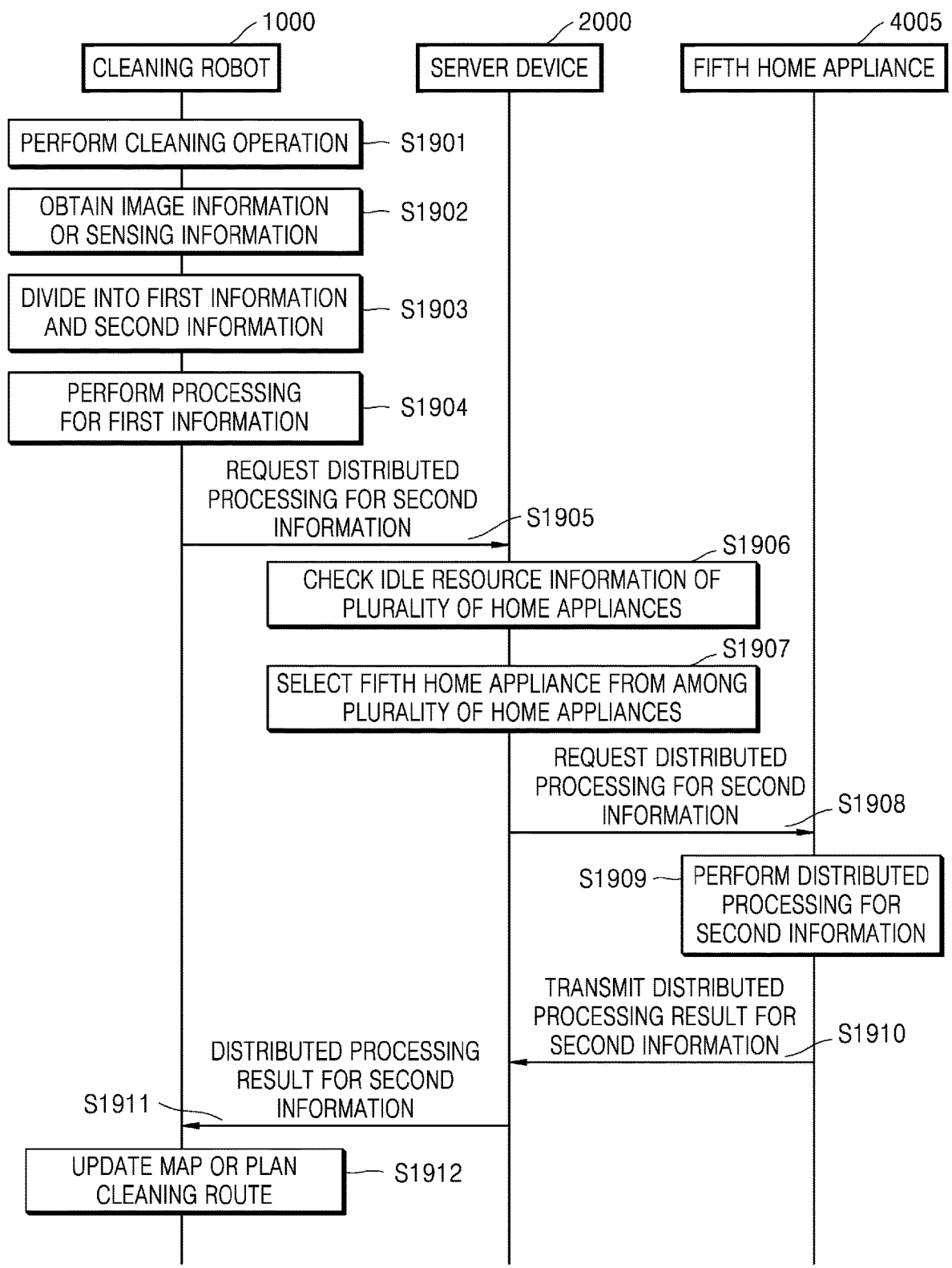
FIG. 19 is a flowchart illustrating a method of performing distributed processing of information of a cleaning robot, according to an embodiment of the disclosure.

FIG. 19 is a flowchart illustrating a method of performing distributed processing for image information of the cleaning robot 1000, according to an embodiment of the disclosure.

In operation S1901, the cleaning robot 1000 according to an embodiment of the disclosure may perform a cleaning operation. For example, the cleaning robot 1000 according to an embodiment of the disclosure may plan a cleaning route and perform a cleaning operation along the planned cleaning route.

In operation S1902, the cleaning robot 1000 according to an embodiment of the disclosure may obtain at least one of image information or sensing information while performing the cleaning operation. The image information may be information about a surrounding image or a ceiling image obtained through a camera in the cleaning robot 1000. The sensing information may refer to information obtained through various sensors in the cleaning robot 1000. For example, the sensing information may include, but is not limited to, a 3D sensor value obtained by a 3D sensor for recognizing an obstacle, a lidar sensor value obtained by a lidar sensor, an ultrasonic sensor value obtained by an ultrasonic sensor, etc.

In operation S1903, the cleaning robot 1000 according to an embodiment of the disclosure may divide at least one of the image information or the sensing information into first information and second information.

According to an embodiment of the disclosure, the cleaning robot 1000 may analyze various pieces of information to modify a cleaning route or recognize an obstacle. In this case, because there is a lot of information to be processed by the cleaning robot 1000, the cleaning robot 1000 may divide the information for performing distributed processing with other home appliances. For example, the cleaning robot 1000 may divide at least one of the image information or the sensing information into the first information and the second information.

In operation S1904, the cleaning robot 1000 according to an embodiment of the disclosure may perform processing for the first information. Then, in operation S1905, the cleaning robot 1000 according to an embodiment of the disclosure may request the server device 2000 to perform distributed processing for the second information.

According to an embodiment of the disclosure, the cleaning robot 1000 may perform task scheduling before processing information obtained through a camera or a sensor. Task scheduling refers to causing an operating system to allocate a CPU to a process or thread in order for the CPU to execute a program stored in a memory. A scheduler allocates a CPU with various policies such that multiple processes efficiently use limited resources. Here, the policy is a method of determining which process or thread to allocate the CPU in what order or on what basis.

According to an embodiment of the disclosure, in the case where the cleaning robot 1000 provides a multi-threaded environment (i.e., an environment allowing for multiple threads in one process), the cleaning robot 1000 may divide information into several pieces, and match the pieces of information to different threads, respectively. In addition, the cleaning robot 1000 may perform scheduling in threads. A thread may refer to one or more task units that are executed within one process. For example, referring to FIG. 21, among information #1 to information #10, the cleaning robot 1000 may match information #1 to information #3 to a first thread, information #4 to information #7 to a second thread, and information #8 to #10 to a third thread.

Also, the cleaning robot 1000 may request other home appliances to perform distributed processing for information #8 to #10 (i.e., the second information), while allocating the CPU to the first thread.

In operation S1906, the server device 2000 according to an embodiment of the disclosure may check the idle resource information of the plurality of home appliances. Resources may include, but are not limited to, a CPU, a memory, power, a storage, network resources, and like. When the available resource capacity is greater than an amount required by a resource consumer, the remaining resources may be referred to as idle resources.

According to an embodiment of the disclosure, the server device 2000 may monitor resources of the plurality of home appliances connected to the server device 2000. For example, the plurality of home appliances may upload a currently used CPU state or RAM state to the server device 2000.

The server device 2000 may identify the idle resources of the plurality of home appliances based on resources currently used by the plurality of home appliances. For example, for a first home appliance, because the amount of currently used resources is 40% with respect to the total available resources, the server device 2000 may confirm that the idle resources are 60% of the total available resources.

In operation S1907, the server device 2000 according to an embodiment of the disclosure may select a fifth home appliance 4005 from among the plurality of home appliances. According to an embodiment of the disclosure, the server device 2000 may select the fifth home appliance 4005 as a device capable of performing distributed processing based on the idle resource information of the plurality of home appliances. According to an embodiment of the disclosure, idle resources of the fifth home appliance 40005 may be greater than a threshold value (e.g., 50%).

In operation S1908, the server device 2000 according to an embodiment of the disclosure may request the fifth home appliance 4005 to perform distributed processing for the second information. For example, the server device 2000 may request a processing result for the second information while transmitting the second information to the fifth home appliance 4005. According to an embodiment of the disclosure, the server device 2000 may transmit, to the fifth home appliance 4005, information indicating that a distributed processing request has been received from the cleaning robot 1000.

In operation S1909, the fifth home appliance 4005 according to an embodiment of the disclosure may perform distributed processing for the second information. For example, the fifth home appliance 4005 may perform distributed processing for the second information by utilizing the idle resources. Because the fifth home appliance 4005 performs distributed processing for the second information by using the idle resources, no issue may occur in performing the basic functions provided by the fifth home appliance 4005.

In operation S1910, the fifth home appliance 4005 according to an embodiment of the disclosure may transmit, to the server device 2000, a distributed processing result for the second information.

In operation S1911, the server device 2000 according to an embodiment of the disclosure receives, from the fifth home appliance 4005, the distributed processing result for the second information, and transmit, to the cleaning robot 1000, the distributed processing result for the second information.

In operation S1912, the cleaning robot 1000 according to an embodiment of the disclosure may update a map (e.g., the indoor space map 500), recognize an obstacle, or plan (or modify) a cleaning route, by using a processing result for the first information and the distributed processing result for the second information.

According to an embodiment of the disclosure, in the case where the distributed processing result for the second information is not received when image processing for the first information is completed, the cleaning robot 1000 may additionally perform processing for the second information.

In addition, according to an embodiment of the disclosure, in the case where the distributed processing result for the second information received from the server device 2000 is incorrect, the cleaning robot 1000 may ignore the distributed processing result for the second information, and perform processing for the second information again.

According to an embodiment of the disclosure, the cleaning robot 1000 may use idle resources of a nearby home appliance to perform distributed processing for the image information or the sensing information, so as to improve the image processing speed and increase the map update speed. Hereinafter, a method, performed by the cleaning robot

1000, of communicating with a home appliance directly rather than through the server device 2000 to distribute information will be described with reference to FIG. 20.

Figure 20:
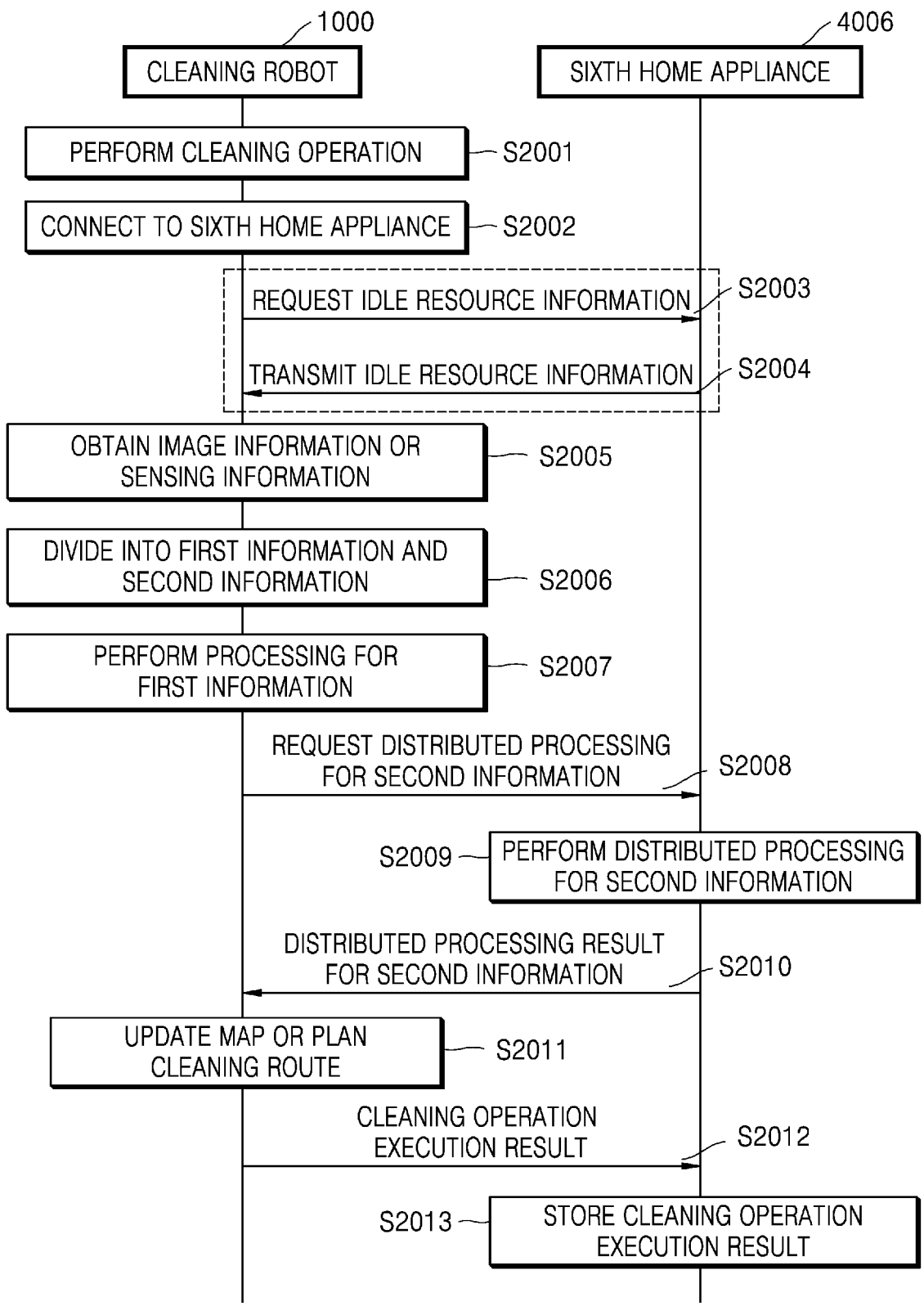
FIG. 20 is a flowchart illustrating a method of performing distributed processing of information of a cleaning robot with a home appliance through short-range wireless communication, according to an embodiment of the disclosure.

FIG. 20 is a flowchart illustrating a method of performing distributed processing for information of the cleaning robot 1000 with a home appliance through short-range wireless communication, according to an embodiment of the disclosure.

In operation S2001, the cleaning robot 1000 according to an embodiment of the disclosure may perform a cleaning operation. For example, the cleaning robot 1000 according to an embodiment of the disclosure may plan a cleaning route and perform the cleaning operation along the planned cleaning route.

In operation S2002, the cleaning robot 1000 according to an embodiment of the disclosure may be connected to a sixth home appliance 4006 in the vicinity thereof. For example, the cleaning robot 1000 may establish a communication link with the sixth home appliance 4006 in the vicinity through short-range wireless communication (e.g., Wi-Fi Direct or Bluetooth).

According to an embodiment of the disclosure, in the case where the cleaning robot 1000 was previously connected to the sixth home appliance 4006 in the past, the cleaning robot 1000 may establish the communication link with the sixth home appliance 4006 based on the MAC address of the sixth home appliance 4006. According to an embodiment of the disclosure, the cleaning robot 1000 may establish communication links with various nearby home appliances while moving along the cleaning route.

In operation S2003, the cleaning robot 1000 may request idle resource information from the sixth home appliance 4006. For example, the cleaning robot 1000 may request the idle resource information from the sixth home appliance 4006 through a short-range wireless communication link.

According to an embodiment of the disclosure, the cleaning robot 1000 may request information about idle resources from the sixth home appliance 4006 or may request confirmation of whether the idle resources exist. Resources may include, but are not limited to, a CPU, a memory, power, a storage, network resources, and like. When the available resource capacity is greater than an amount required by a resource consumer, the remaining resources may be referred to as idle resources.

In operation S2004, the cleaning robot 1000 may receive the idle resource information from the sixth home appliance 4006. For example, when the sixth home appliance 4006 is using only 40% of available resources, the sixth home appliance 4006 may transmit, to the cleaning robot 1000, information indicating that 60% of the available resources are idle among the available resources.

In operation S2005, the cleaning robot 1000 may obtain at least one of image information or sensing information while performing the cleaning operation. The image information may be information about a surrounding image or a ceiling image obtained through a camera in the cleaning robot 1000. The sensing information may refer to information obtained through various sensors in the cleaning robot 1000. For example, the sensing information may include, but is not limited to, a 3D sensor value obtained by a 3D sensor for recognizing an obstacle, a lidar sensor value obtained by a lidar sensor, an ultrasonic sensor value obtained by an ultrasonic sensor, etc.

In operation S2006, the cleaning robot 1000 may divide at least one of the image information or the sensing information into first information and second information.

According to an embodiment of the disclosure, the cleaning robot 1000 may analyze various pieces of information to modify a cleaning route or recognize an obstacle. In this case, because there is a lot of information to be processed by the cleaning robot 1000, when idle resources exist in the sixth home appliance 4006, the cleaning robot 1000 may divide the information to request the sixth home appliance 4006 to perform distributed processing. For example, the cleaning robot 1000 may divide at least one of the image information or the sensing information into the first information and the second information.

In operation S2007, the cleaning robot 1000 may perform processing for the first information. Then, in operation S2008, the cleaning robot 1000 according to an embodiment of the disclosure may request the sixth home appliance 4006 to perform distributed processing for the second information.

According to an embodiment of the disclosure, the cleaning robot 1000 may perform task scheduling before processing information obtained through a camera or a sensor. According to an embodiment of the disclosure, in the case where the cleaning robot 1000 provides a multi-threaded environment (i.e., an environment allowing for multiple threads in one process), the cleaning robot 1000 may divide information into several pieces, and match the pieces of information to different threads, respectively. In addition, the cleaning robot 1000 may perform scheduling in threads. A thread may refer to one or more task units that are executed within one process.

According to an embodiment of the disclosure, in the case where the cleaning robot 1000 generates two threads for processing image information or sensing information, the cleaning robot 1000 may allocate the CPU to a first thread (i.e., processing for the first information) while requesting the sixth home appliance 4006 to perform distributed processing for a task matched to a second thread (i.e., processing for the second information).

According to an embodiment of the disclosure, operations S2003 and S2004 may be omitted. That is, the cleaning robot 1000 may directly request the sixth home appliance 4006 to perform distributed processing for the second information without checking the idle resource information of the sixth home appliance 4006.

In operation S2009, the sixth home appliance 4006 may perform distributed processing for the second information. For example, the sixth home appliance 4006 may perform distributed processing for the second information by utilizing the idle resources. Because the sixth home appliance 4006 performs distributed processing for the second information by using the idle resources, no issue may occur in performing the basic functions provided by the sixth home appliance 4006.

In operation S2010, the sixth home appliance 4006 may transmit, to the cleaning robot 1000, a distributed processing result for the second information.

According to an embodiment of the disclosure, the sixth home appliance 4006 may perform processing for the second information in parallel while the cleaning robot 1000 performs processing for the first information, and thus the information processing speed may be increased In addition, the resources of the cleaning robot 1000 may be efficiently allocated.

In operation S2011, the cleaning robot 1000 according to an embodiment of the disclosure may update a map (e.g., the indoor space map 500), or plan (or modify) a cleaning route, by using a processing result for the first information and the distributed processing result for the second information.

According to an embodiment of the disclosure, in the case where the distributed processing result for the second information is not received from the sixth home appliance 4006 when image processing for the first information is completed, the cleaning robot 1000 may perform processing for the second information.

In addition, according to an embodiment of the disclosure, in the case where the distributed processing result for the second information received from the sixth home appliance 4006 is incorrect, the cleaning robot 1000 may ignore the distributed processing result for the second information, and perform processing for the second information again.

According to an embodiment of the disclosure, the cleaning robot 1000 may use the idle resources of the nearby sixth home appliance 4006 to perform distributed processing for the image information or the sensing information, so as to improve the image processing speed and increase the map update speed.

In operation S2012, the cleaning robot 1000 may transmit a cleaning operation execution result to the sixth home appliance 4006 through short-range wireless communication (e.g., Wi-Fi Direct or Bluetooth).

According to an embodiment of the disclosure, the cleaning operation execution result may include information such as 'Cleaning completed', 'Cleaning stopped, 'Cleaning partially completed', etc., but is not limited thereto. In addition, the operation execution result may include information about a cleaning history (e.g., a map image in which a route through which the cleaning robot 1000 has traveled is indicated).

In operation S2013, the sixth home appliance 4006 according to an embodiment of the disclosure may store the cleaning operation execution result of the cleaning robot 1000. For example, the sixth home appliance 4006 may have information such as whether the cleaning of the vicinity of the sixth home appliance 4006 is completed or whether the cleaning is stopped due to an obstacle or the like. According to an embodiment of the disclosure, the sixth home appliance 4006 may store the cleaning operation execution result of the cleaning robot 1000 in a secure area (e.g., a trust zone) of a memory.

In the case where the cleaning robot 1000 did not complete the cleaning of the vicinity of the sixth home appliance 4006, the sixth home appliance 4006 may later call the cleaning robot 1000 to the vicinity of the sixth home appliance 4006 again, based on the cleaning operation execution result of the cleaning robot 1000. An operation, performed by the sixth home appliance 4006, of calling the cleaning robot 1000 to the vicinity of the sixth home appliance 4006 later will be described below in detail with reference to FIG. 22.

Figure 21:
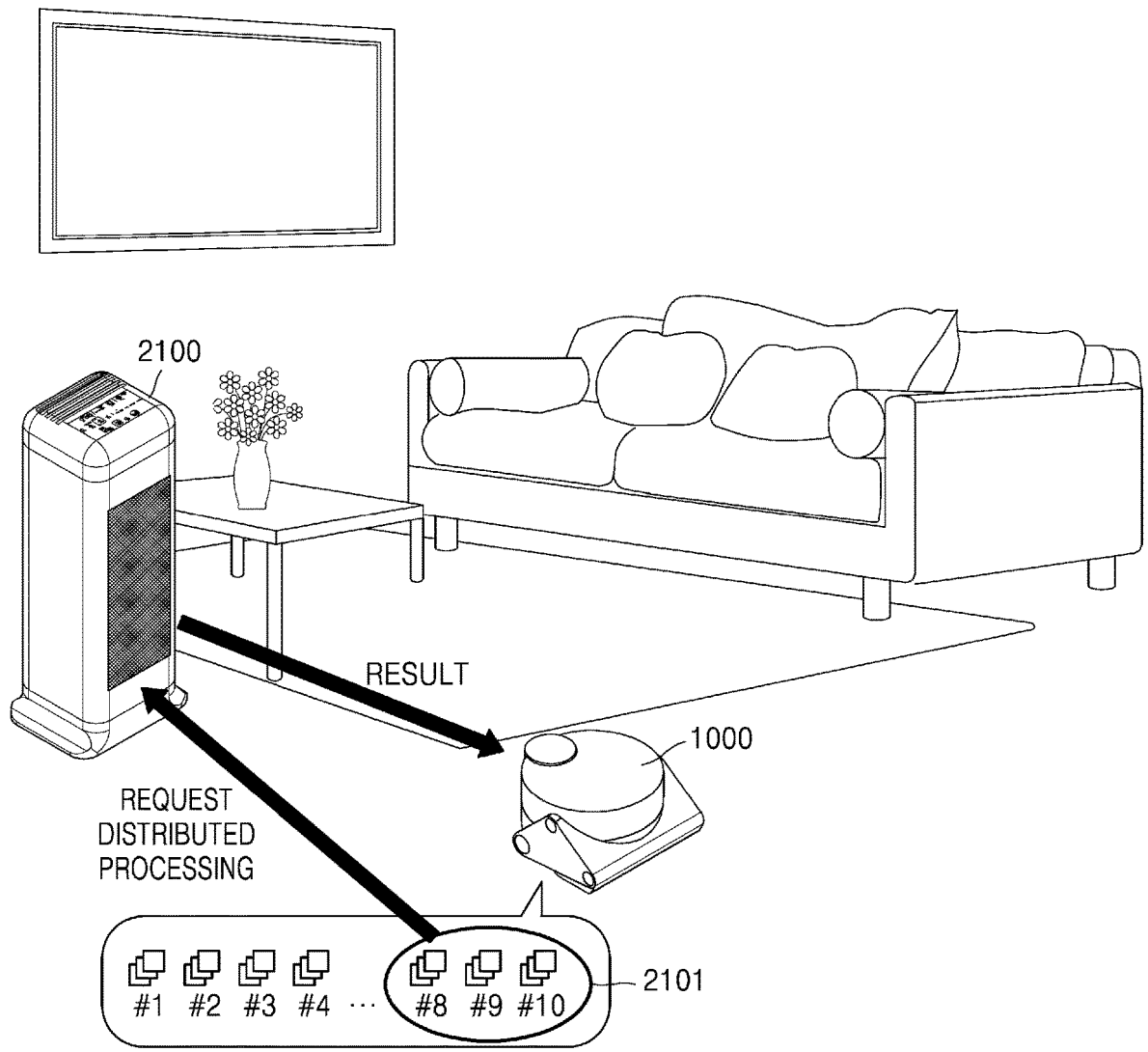
FIG. 21 is a diagram illustrating an operation of performing distributed processing of information of a cleaning robot 1000 with an air purifier, according to an embodiment of the disclosure.

FIG. 21 is a diagram illustrating an operation of performing distributed processing for information of the cleaning robot 1000 with an air purifier 2100, according to an embodiment of the disclosure.

Referring to FIG. 21, the cleaning robot 1000 may communicate with a nearby home appliance while performing a cleaning operation. For example, the cleaning robot 1000 may perform short-range wireless communication (e.g., Wi-Fi Direct or Bluetooth) with the nearby air purifier 2100 while cleaning the living room.

In this case, the cleaning robot 1000 needs to perform processing for image information (or sensing information) in order to plan a cleaning route and detect an obstacle. According to an embodiment of the disclosure, in the case where the cleaning robot 1000 provides a multi-threaded environment, the cleaning robot 1000 may divide information into several pieces, and match the pieces of information to different threads, respectively. In addition, the cleaning robot 1000 may perform scheduling in threads. For example, among information #1 to information #10, the cleaning robot 1000 may match information #1 to information #3 to a first thread, information #4 to information #7 to a second thread, and information #8 to #10 to a third thread.

Also, the cleaning robot 1000 may request the nearby air purifier 2100 to perform distributed processing for information matched to the third thread (e.g., information #8 to information #10), while allocating the CPU to the first thread. According to an embodiment of the disclosure, the cleaning robot 1000 may check idle resource information of the air purifier 2100 before requesting the air purifier 2100 to perform distributed processing. According to another embodiment of the disclosure, the cleaning robot 1000 may also request distributed processing without checking the idle resource information of the air purifier 2100.

According to an embodiment of the disclosure, the cleaning robot 1000 may request distributed processing while transmitting, to the server device 2000, information 2101 matched to the third thread. In this case, because the server device 2000 is monitoring the idle resource information of the home appliances, the server device 2000 may select the air purifier 2100 from among the home appliances based on the idle resource information of the home appliances, and request the air purifier 2100 to perform distributed processing while transmitting the information 2101 matched to the third thread. In this case, the server device 2000 may receive, from the air purifier 2100, a distributed processing result for the information 2101 matched to the third thread, and transmit the distributed processing result to the cleaning robot 1000.

According to an embodiment of the disclosure, the cleaning robot 1000 may update a map (e.g., the indoor space map 500), recognize an obstacle, or plan (or modify) a cleaning route, based on a processing result for information matched to the first thread, a processing result for information matched to the second thread, and the distributed processing result for the information 2101 matched to the third thread.

According to an embodiment of the disclosure, when the distributed processing result for the information 2101 matched to the third thread has not been received from the air purifier 2100 when the first thread and the second thread are completed, the cleaning robot 1000 may proceed with the third thread by allocating the CPU to the third thread.

Also, according to an embodiment of the disclosure, when the distributed processing result for the information 2101 matched to the third thread received from the air purifier 2100 is incorrect, the cleaning robot 1000 may ignore the distributed processing result and, may proceed with the third thread by allocating the CPU to the third thread again.

According to an embodiment of the disclosure, several threads may be simultaneously processed by utilizing idle resources of a home appliance (e.g., the air purifier 2100), and thus the processing speed of the cleaning robot 1000 may be increased, and resources may be efficiently allocated.

Figure 22:
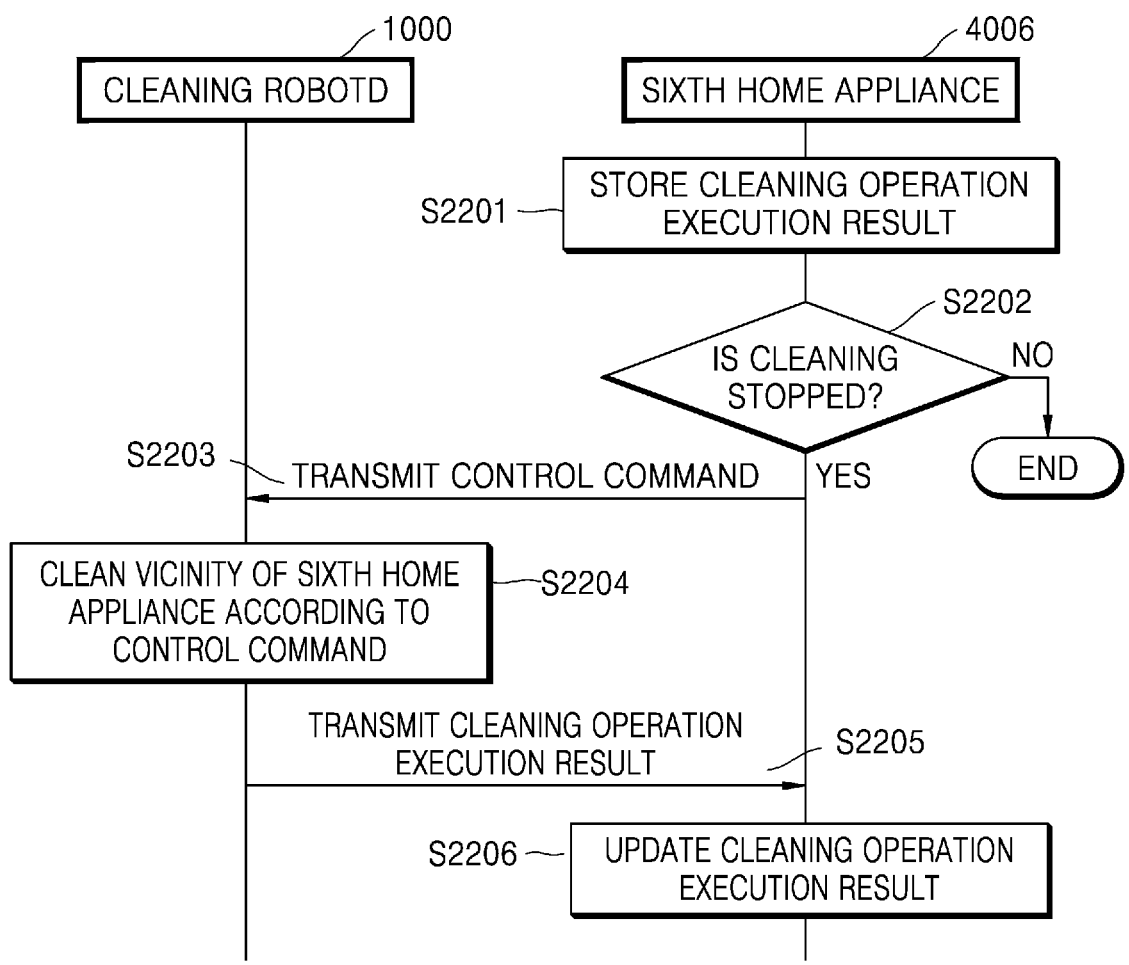
FIG. 22 is a flowchart illustrating a method, performed by a home appliance, of calling a cleaning robot when cleaning in the vicinity of the home appliance is stopped, according to an embodiment of the disclosure.

FIG. 22 is a flowchart illustrating a method, performed by a home appliance, of calling the cleaning robot 1000 when cleaning of the vicinity of the home appliance is stopped, according to an embodiment of the disclosure.

In operation S2201, the sixth home appliance 4006 according to an embodiment of the disclosure may store a cleaning operation execution result of the cleaning robot 1000. For example, the sixth home appliance 4006 may have information such as whether the cleaning of the vicinity of the sixth home appliance 4006 is completed or whether the cleaning is stopped due to an obstacle or the like.

In operation S2202, the sixth home appliance 4006 according to an embodiment of the disclosure may determine whether a cleaning stop state is maintained for a preset period of time or longer, based on the cleaning operation execution result. For example, the sixth home appliance 4006 may receive a cleaning stop message from the cleaning robot 1000. In addition, when a cleaning completion message has not been received from the cleaning robot 1000 even after a preset period of time (e.g., one hour) elapses, the sixth home appliance 4006 may determine that the cleaning stop state is maintained for a preset period of time (e.g., one hour) or longer.

In operation S2203, the sixth home appliance 4006 according to an embodiment of the disclosure may transmit a control command to the cleaning robot 1000 when the cleaning stop state is maintained for the preset period of time or longer. For example, the sixth home appliance 4006 may transmit, to the cleaning robot 1000, a control command to clean the vicinity of the sixth home appliance 4006 through short-range wireless communication (e.g., Wi-Fi Direct or Bluetooth).

In operation S2204, the cleaning robot 1000 may clean the vicinity of the sixth home appliance 4006 according to the control command. For example, the cleaning robot 1000 may plan a cleaning route for the vicinity of the sixth home appliance 4006 and perform a cleaning operation along the planned cleaning route. In the case where the cleaning was stopped in the past due to an obstacle but the obstacle then disappeared, the cleaning robot 1000 may complete the cleaning of the vicinity of the sixth home appliance 4006. When the obstacle still exists, the cleaning robot 1000 may not be able to complete the cleaning of the vicinity of the sixth home appliance 4006 again.

In operation S2205, the cleaning robot 1000 may transmit a cleaning operation execution result to the sixth home appliance 4006 through short-range wireless communication (e.g., Wi-Fi Direct or Bluetooth).

According to an embodiment of the disclosure, the cleaning operation execution result may include information such as 'Cleaning completed', 'Cleaning stopped, 'Cleaning partially completed', etc., but is not limited thereto. In addition, the operation execution result may include information about a cleaning history (e.g., a map image in which a route through which the cleaning robot 1000 has traveled is indicated).

In operation S2206, the sixth home appliance 4006 according to an embodiment of the disclosure may update the cleaning operation execution result of the cleaning robot 1000. For example, when the sixth home appliance 4006 receives, from the cleaning robot 1000, a message indicating that the cleaning of the vicinity of the sixth home appliance 4006 is completed, the sixth home appliance 4006 may change the cleaning operation execution result from 'Cleaning stopped' to 'Cleaning completed'.

Figure 23:
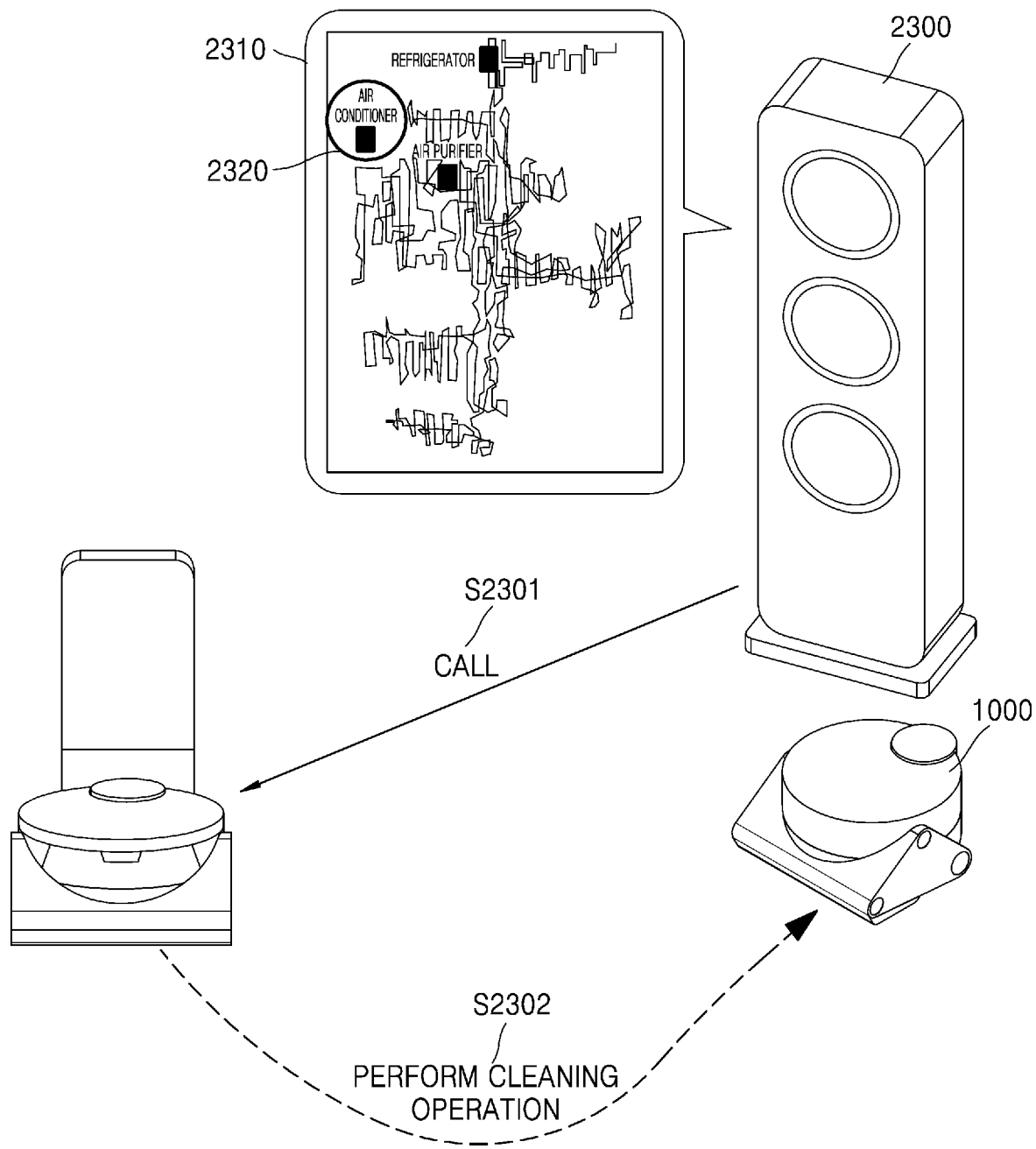
FIG. 23 is a diagram illustrating an operation, performed by an air conditioner, of calling a cleaning robot when cleaning in the vicinity of the air conditioner is stopped, according to an embodiment of the disclosure.

FIG. 23 is a diagram illustrating an operation, performed by an air conditioner 2300, of calling the cleaning robot 1000 when cleaning of the vicinity of the air conditioner 2300 is stopped, according to an embodiment of the disclosure.

Referring to FIG. 23, the air conditioner 2300 may store cleaning operation result information of the cleaning robot 1000. For example, the air conditioner 2300 may receive, from the cleaning robot 1000, information indicating that cleaning of the vicinity of the air conditioner 2300 is stopped, and store the information in a memory (e.g., a trust zone). The cleaning robot 1000 coming to clean the vicinity of the air conditioner 2300 may move to the vicinity of another home appliance according to a call command from the other home appliance to perform cleaning. In this case, the cleaning robot 1000 may transmit information indicating that the cleaning of the vicinity of the air conditioner 2300 has not been completed, to the air conditioner 2300 through short-range wireless communication (e.g., Wi-Fi Direct or Bluetooth).

According to an embodiment of the disclosure, the air conditioner 2300 may store a map image 2310 in which a route through which the cleaning robot 1000 has traveled is indicated, as a cleaning history of the cleaning robot 1000. In the map image 2310, it may be found that a vicinity 2320 of the air conditioner 2300 is not cleaned.

According to an embodiment of the disclosure, the air conditioner 2300 may call the cleaning robot 1000 based on a cleaning operation execution result of the cleaning robot 1000 (S2301). For example, the air conditioner 2300 may transmit a control command to perform cleaning of the vicinity 2320 of the air conditioner 2300, to the cleaning robot 1000 through short-range wireless communication (e.g., Wi-Fi Direct or Bluetooth).

The cleaning robot 1000 may perform a cleaning operation according to a call by the air conditioner 2300 (S2302). For example, the cleaning robot 1000 may move to the vicinity 2320 of the air conditioner 2300, and may plan a cleaning route for the vicinity 2320 of the air conditioner 2300. The cleaning robot 1000 may complete the cleaning of the vicinity 2320 of the air conditioner 2300 along the planned cleaning route. When the cleaning robot 1000 completes the cleaning of the vicinity 2320 of the air conditioner 2300, the cleaning robot 1000 may transmit a cleaning completion message to the air conditioner 2300.

When the air conditioner 2300 receives, from the cleaning robot 1000, a message indicating that the cleaning of the vicinity 2320 of the air conditioner 2300 is completed, the air conditioner 2300 may change the cleaning operation execution result from 'Cleaning stopped' to 'Cleaning completed'.

Meanwhile, according to an embodiment of the disclosure, when the cleaning robot 1000 does not respond to a call command of the air conditioner 2300 for a preset period of time, the air conditioner 2300 may transmit the call command to the cleaning robot 1000 through the intermediate terminal 1610. For example, in the case where the cleaning robot 1000 is far away from the air conditioner 2300, resulting in poor short-range wireless communication therebetween, the air conditioner 2300 may transmit the call command to the intermediate terminal 1610, and then the intermediate terminal 1610 may transmit the call command to the cleaning robot 1000.

According to an embodiment of the disclosure, even when cleaning of the vicinity of a home appliance is stopped due to an obstacle, or the like, the home appliance may call the cleaning robot 1000 after a preset period of time elapses so as to complete the stopped cleaning of the vicinity of the home appliance.

Figure 24:
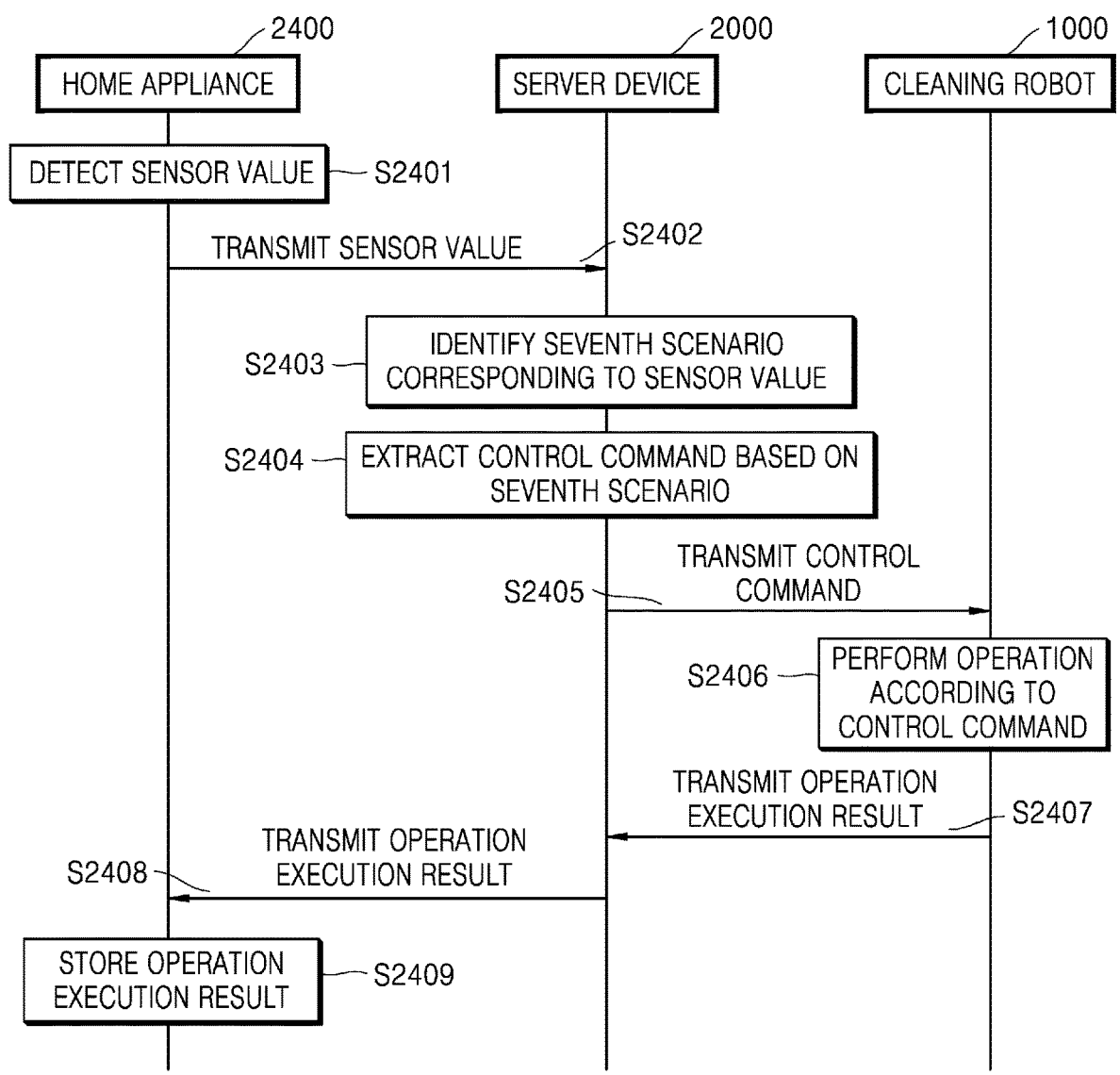
FIG. 24 is a flowchart illustrating a method, performed by a server device, of controlling a cleaning robot based on a scenario set in response to a sensor value of a home appliance, according to an embodiment of the disclosure.

FIG. 24 is a flowchart illustrating a method, performed by the server device 2000, of controlling the cleaning robot 1000 based on a scenario set in response to a sensor value of a home appliance 2400, according to an embodiment of the disclosure.

In operation S2401, the home appliance 2400 according to an embodiment of the disclosure may detect a sensor value.

According to an embodiment of the disclosure, the home appliance 2400 may be a home appliance connected to the server device 2000, and may be one of various home appliances. For example, the home appliance 2400 may be, but is not limited to, an oven, an induction range, an air purifier, a TV, a washing machine, a refrigerator, or the like. The home appliance 2400 may include various types of sensors. For example, in the case where the home appliance 2400 is an air conditioner, the home appliance 2400 may include a humidity sensor, a temperature sensor, etc., in the case where the home appliance 2400 is an air purifier, the home appliance 2400 may include a dust sensor, a gas sensor, etc., in the case where the home appliance 2400 is a lighting device, the home appliance 2400 may include an illuminance sensor, in the case where the home appliance 2400 is an induction range, an oven, or the like, the home appliance 2400 may include a temperature sensor, and in the case where the home appliance 2400 is an artificial intelligence speaker, the home appliance 2400 may include a noise sensor etc.

According to an embodiment of the disclosure, the home appliance 2400 may obtain sensor values through various sensors. The sensor value may be, but is not limited to, a fine dust sensor value, a temperature value, a humidity value, a noise value, an illuminance value, etc.

In operation S2402, the home appliance 2400 according to an embodiment of the disclosure may transmit the sensor value to the server device 2000.

According to an embodiment of the disclosure, the server device 2000 may monitor information collected by the home appliance 2400. According to an embodiment of the disclosure, the home appliance 2400 may periodically upload, to the server device 2000, the sensor value obtained through the sensor. According to another embodiment of the disclosure, the home appliance 2400 may upload the sensor value to the server device 2000 when a predefined event to be notified to the server device 2000 occurs. For example, in the case where the home appliance 2400 is an air purifier, a fine dust value may be uploaded to the server device 2000 when the fine dust value increases to be greater than a threshold value.

In operation S2403, the server device 2000 may identify a seventh scenario corresponding to the sensor value.

The server device 2000 according to an embodiment of the disclosure may identify, from the scenario list 2033, the seventh scenario corresponding to the sensor value received from the home appliance 2400. According to an embodiment of the disclosure, at least one scenario in which a certain sensor value is matched to at least one operation of the cleaning robot 1000 may be included in the scenario list 2033.

For example, when a fine dust sensor value greater than the threshold value is received, the server device 2000 may identify the seventh scenario corresponding to the fine dust sensor value greater than the threshold value.

In operation S2404, the server device 2000 may extract a control command based on the seventh scenario. According to an embodiment of the disclosure, the server device 2000 may extract, from the seventh scenario, the control command including movement position information of the cleaning robot 1000. The movement position information of the cleaning robot 1000 may be information about a destination to which the cleaning robot 1000 is required to move. For example, the movement position information of the cleaning robot 1000 may include, but is not limited to, identification information of the home appliance 2400, position information of the home appliance 2400, position information of the charging station, route information (e.g., navigation information) for moving to the home appliance 2400, etc.

According to an embodiment of the disclosure, in the case where the seventh scenario includes an operation of calling the cleaning robot 1000 to the vicinity of the home appliance 2400, the server device 2000 may extract the control command including the position information of the home appliance 2400. In the case where the cleaning robot 1000 has the indoor space map 500 in which the positions of the home appliances are indicated, because the cleaning robot 1000 is able to move to the vicinity of the home appliance 2400 even when only the identification information of the home appliance 2400 is notified to the cleaning robot 1000, the server device 2000 may transmit, to the cleaning robot 1000, the identification information of the home appliance 2400 as the position information of the home appliance 2400.

According to an embodiment of the disclosure, in the case where the seventh scenario includes an operation, performed by the cleaning robot 1000, of cleaning the vicinity of the home appliance 2400 in the intensive mode, the server device 2000 may extract a control command including the position information of the home appliance 2400 and operation mode information of the cleaning robot 1000. In the case where the control command is to return to the charging station, the movement position information of the cleaning robot 1000 may be the information about the position of the charging station.

In operation S2405, the server device 2000 may transmit the control command to the cleaning robot 1000. According to an embodiment of the disclosure, the server device 2000 may transmit the detected control command to the cleaning robot 1000 through a wireless communication interface (e.g., Wi-Fi).

In operation S2406, the cleaning robot 1000 may perform an operation according to the control command. For example, in the case where the control command is to clean the vicinity of the home appliance 2400, the cleaning robot 1000 may move to the vicinity of the home appliance 2400 based on the indoor space map 500.

In the case where the control command is to clean the vicinity of the home appliance 2400, the cleaning robot 1000 may plan a cleaning route for the vicinity of the home appliance 2400, and complete the cleaning operation along the planned cleaning route. When the cleaning robot 1000 recognizes an obstacle around the home appliance 2400 while cleaning, the cleaning robot 1000 may modify the planned cleaning route, or may stop the cleaning of the vicinity of the home appliance 2400. For example, when the obstacle is not large, the cleaning robot 1000 may modify the cleaning route to bypass the obstacle and complete the cleaning, whereas, when the obstacle is too large to continue the cleaning, the cleaning robot 1000 may stop the cleaning and return to the charging station.

In operation S2407, the cleaning robot 1000 may transmit an operation execution result to the server device 2000. According to an embodiment of the disclosure, the operation execution result may include information such as 'Cleaning completed', 'Cleaning stopped, 'Cleaning partially completed', etc., but is not limited thereto. In addition, the operation execution result may include information about a cleaning history (e.g., a map image in which a route through which the cleaning robot 1000 has traveled is indicated).

In operation S2408, the server device 2000 may transmit the operation execution result of the cleaning robot 1000 to the home appliance 2400. In this case, the home appliance 2400 may obtain information such as whether the cleaning of the vicinity of the home appliance 2400 is completed or whether the cleaning is stopped due to an obstacle or the like.

In operation S2409, the home appliance 2400 may store the operation execution result of the cleaning robot 1000. According to an embodiment of the disclosure, the home appliance 2400 may store the operation execution result of the cleaning robot 1000 in a secure area (e.g., a trust zone) of a memory. The secure area (e.g., the trust zone) may be an area accessible only by authorized devices (e.g., the cleaning robot 1000).

According to an embodiment of the disclosure, in the case where the cleaning robot 1000 did not complete the cleaning of the vicinity of the home appliance 2400, the home appliance 2400 may later call the cleaning robot 1000 to the vicinity of the home appliance 2400 again, based on the operation execution result of the cleaning robot 1000.

According to an embodiment of the disclosure, based on a scenario in which a sensor value of the home appliance 2400 is matched to a cleaning operation, the cleaning robot 1000 may perform cleaning without a user input.

Figure 25:
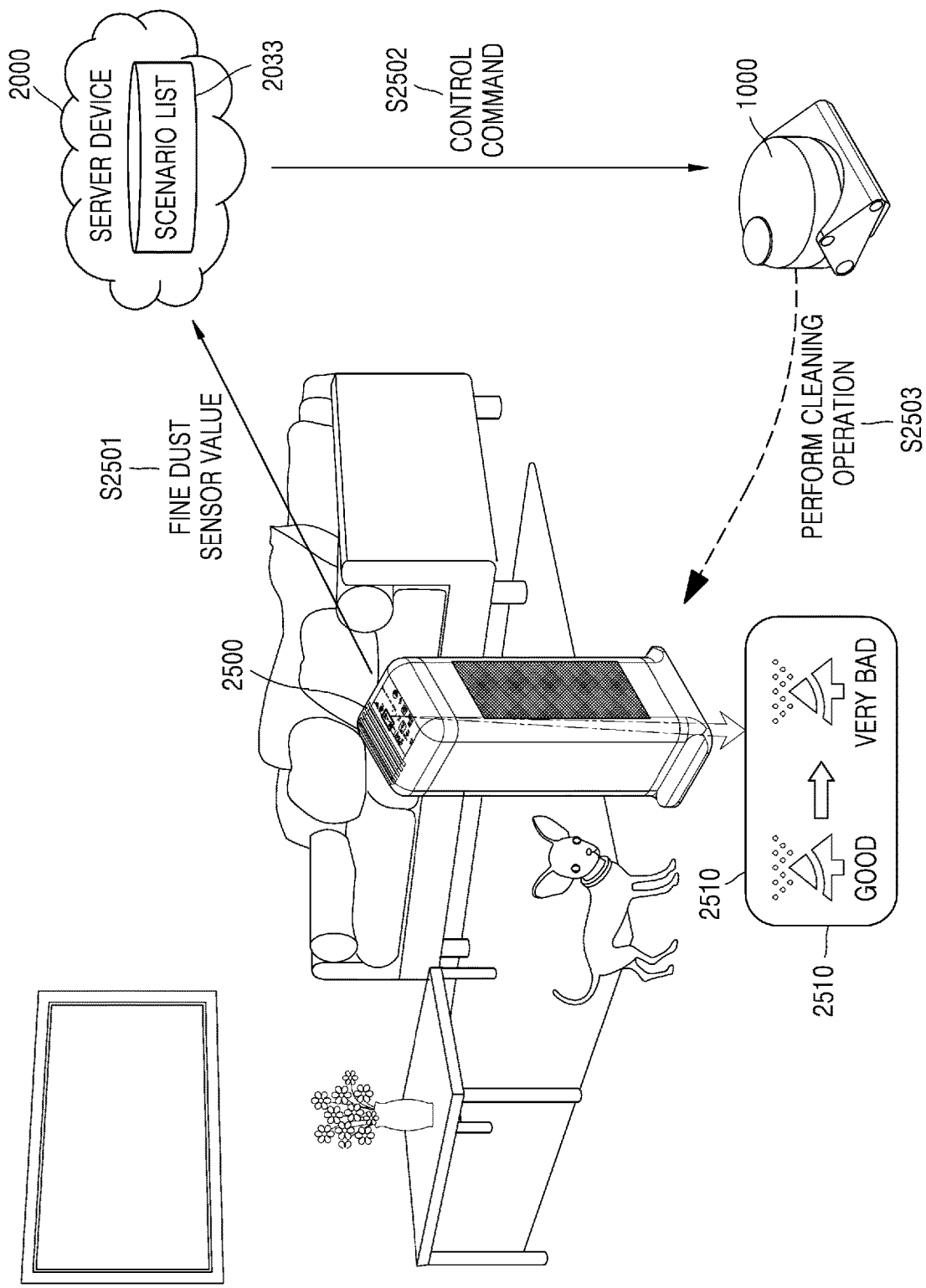
FIG. 25 is a flowchart illustrating an operation, performed by a server device, of controlling a cleaning robot based on a scenario corresponding to a fine dust sensor value, according to an embodiment of the disclosure.

FIG. 25 is a flowchart illustrating an operation, performed by the server device 2000, of controlling the cleaning robot 1000 based on a scenario corresponding to a fine dust sensor value, according to an embodiment of the disclosure. The case where a scenario of, when a fine dust sensor value of an air purifier 2500 increases to be greater than a threshold value, commanding the cleaning robot 1000 to clean the vicinity of the air purifier 2500 in the intensive mode is stored in the scenario list 2033 will be described as an example with reference to FIG. 25.

Referring to FIG. 25, the air purifier 2500 may continuously measure the fine dust sensor value through a dust sensor. The air purifier 2500 may transmit, to the server device 2000, the fine dust sensor value measured through the dust sensor (S2501). According to an embodiment of the disclosure, when a companion dog is running around the air purifier 2500, the fine dust sensor value measured by the air purifier 2500 may suddenly increase. For example, the fine dust sensor value displayed on a display 2510 of the air purifier 2500 may be changed from 'Good' to 'Very bad'. In this case, the amount of dust on the floor around the air purifier 2500 may also increase.

When the fine dust sensor value collected by the air purifier 2500 increases to be greater than the threshold value, the server device 2000 monitoring the fine dust sensor value may identify a scenario corresponding to the fine dust sensor value greater than the threshold value.

The server device 2000 may extract a control command to clean the vicinity of the air purifier 2500 in the intensive mode, based on the identified scenario. The server device 2000 may transmit the control command to clean the vicinity of the air purifier 2500 in the intensive mode, to the cleaning robot 1000 through a communication interface (S2502). Here, the control command may include position information of the vicinity of the air purifier 2500 (e.g., the living room area), identification information of the air purifier 2500, information about an operation mode (e.g., the intensive mode), and the like.

When the cleaning robot 1000 receives the control command from the server device 2000, the cleaning robot 1000 may perform a cleaning operation according to the control command (S2503). For example, the cleaning robot 1000 may move to the vicinity of the air purifier 2500 (e.g., the living room area) and plan a cleaning route for cleaning the vicinity of the air purifier 2500. In this case, the cleaning robot 1000 may move to the vicinity of the air purifier 2500 and plan the cleaning route by using the indoor space map 500. The cleaning robot 1000 may complete cleaning of the vicinity of the air purifier 2500 in the intensive mode according to the planned cleaning route, and then transmit a cleaning completion message to the server device 2000.

According to an embodiment of the disclosure, the server device 2000 transmits, to the air purifier 2500, the cleaning completion message with respect to the vicinity of the air purifier 2500, so as to allow the air purifier 2500 to confirm whether the cleaning of the vicinity of the air purifier 2500 is completed.

In the case where the cleaning robot 1000 was called while cleaning another area, the cleaning robot 1000 may return to the previous cleaning route after completion of the cleaning of the vicinity of the air purifier 2500. For example, in the case where the cleaning robot 1000 was called when it had planned a first cleaning route for the main bedroom area and was cleaning along the first cleaning route, the cleaning robot 1000 may return to the first cleaning route. Then, the cleaning robot 1000 may continue to clean an area of the first cleaning route that has not been cleaned.

According to an embodiment of the disclosure, when a lot of dust is on the floor around the air cleaner 2500, the server device 2000 may call the cleaning robot 1000 to the vicinity of the air cleaner 2500, such that the floor around the air cleaner 2500 may be kept clean.

Figure 26:
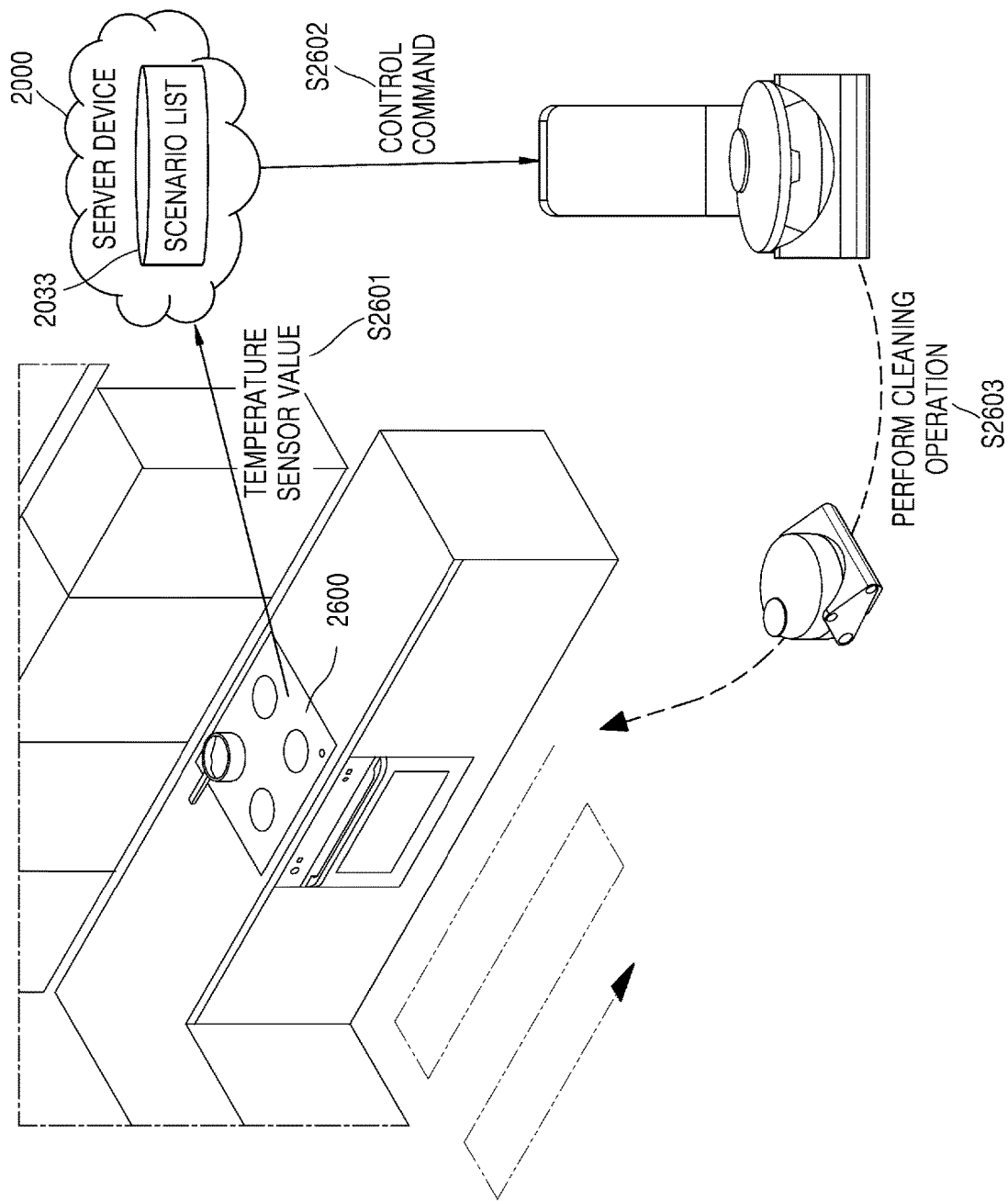
FIG. 26 is a flowchart illustrating an operation, performed by a server device, of controlling a cleaning robot based on a scenario corresponding to a temperature sensor value of an induction range, according to an embodiment of the disclosure.

FIG. 26 is a flowchart illustrating an operation, performed by the server device 2000, of controlling the cleaning robot 1000 based on a scenario corresponding to a temperature sensor value of an induction range 2600, according to an embodiment of the disclosure. The case where a scenario of, when use of the induction range 2600 is ended, calling the cleaning robot 1000 to the vicinity of the induction range 2600 (i.e., the kitchen area) is stored in the scenario list 2033 will be described as an example with reference to FIG. 26.

Referring to FIG. 26, the induction range 2600 may continuously measure the temperature sensor value through a temperature sensor. The induction range 2600 may transmit, to the server device 2000, the temperature sensor value measured through the temperature sensor (S2601). According to an embodiment of the disclosure, a pattern may occur in which the temperature sensor value increases when the use of the induction range 2600 is started, and then the temperature sensor value decreases when the use of the induction range 2600 is ended.

When the server device 2000 monitoring the temperature sensor value measured by the induction range 2600 identifies a pattern in which the use of the induction range 2600 is ended (e.g., a pattern in which the temperature sensor value increases to be 100° C. or greater and then decreases to approach 0° C.) is identified, the server device 2000 may identify a scenario corresponding to the end of the use of the induction range 2600.

According to another embodiment of the disclosure, when the server device 2000 receives, from the induction range 2600, user input information indicating that a button for terminating power of the induction range 2600 is selected, the server device 2000 may identify the scenario corresponding to the end of the use of the induction range 2600.

The server device 2000 may extract a control command to clean the vicinity of the induction range 2600 (i.e., the kitchen area), based on the identified scenario. The server device 2000 may transmit the control command to clean the vicinity of the induction range 2600 (i.e., the kitchen area), to the cleaning robot 1000 through a communication interface (S2602). Here, the control command may include position information of the vicinity of the induction range

2600 (e.g., the kitchen area), identification information of the induction range 2600, and the like.

When the cleaning robot 1000 receives the control command from the server device 2000, the cleaning robot 1000 may perform a cleaning operation according to the control command (S2603). For example, the cleaning robot 1000 may move to the vicinity of the induction range 2600 (i.e., the kitchen area) and plan a cleaning route for cleaning the vicinity of the induction range 2600 (i.e., the kitchen area). In this case, the cleaning robot 1000 may move to the vicinity of the induction range 2600 (i.e., the kitchen area) and plan the cleaning route by using the indoor space map 500. The cleaning robot 1000 may complete cleaning of the vicinity of the induction range 2600 (i.e., the kitchen area) according to the planned cleaning route, and then transmit a cleaning completion message to the server device 2000.

According to an embodiment of the disclosure, the server device 2000 transmits, to the induction range 2600, the cleaning completion message with respect to the vicinity of the induction range 2600 (i.e., the kitchen area), so as to allow the induction range 2600 to confirm whether the cleaning of the vicinity of the induction range 2600 (i.e., the kitchen area) is completed.

Because the cleaning robot 1000 was called to the vicinity of the induction range 2600 while being charged, the cleaning robot 1000 may return to the charging station after completion of the cleaning of the vicinity of the induction range 2600 (i.e., the kitchen area). According to another embodiment of the disclosure, when the remaining battery level is greater than the threshold value, the cleaning robot 1000 may further perform a cleaning operation along the ordinary cleaning route without returning to the charging station.

According to an embodiment of the disclosure, when the use of the induction range 2600 is ended, the server device 2000 may call the cleaning robot 1000 to the kitchen, such that the kitchen floor may be kept clean.

Figure 27:
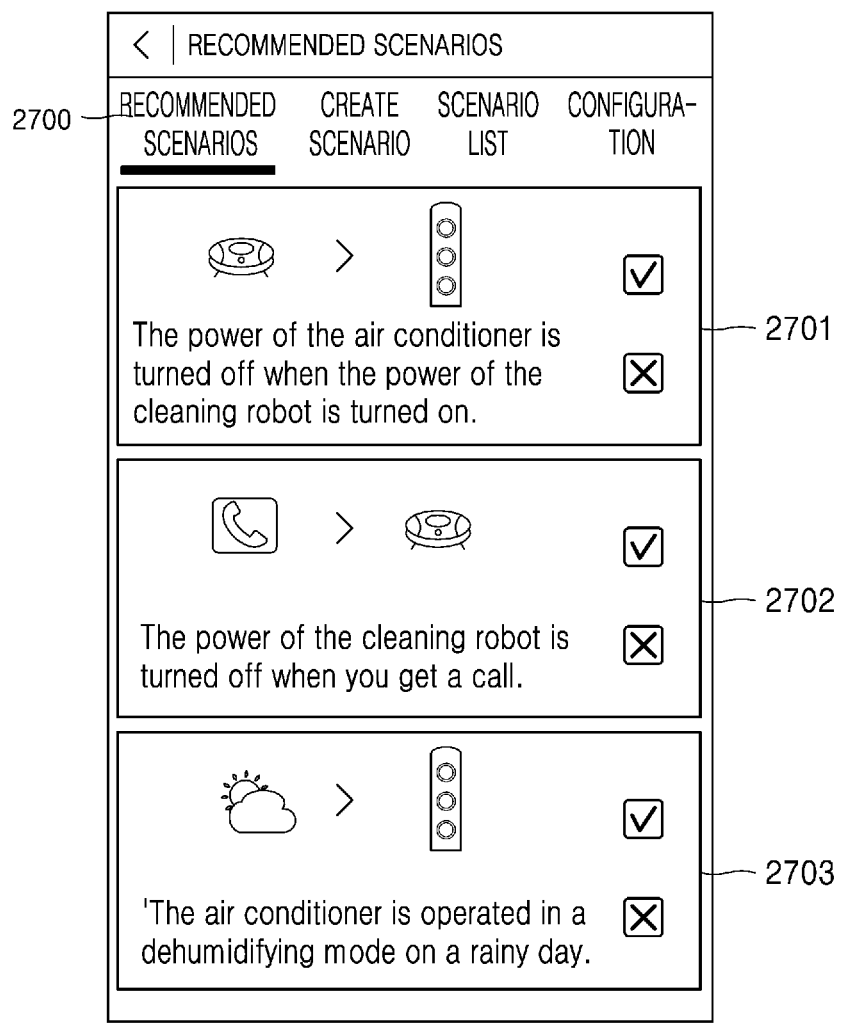
FIG. 27 is a diagram illustrating an operation, performed by a server device, of providing recommended scenarios related to operations of home appliances, according to an embodiment of the disclosure.

FIG. 27 is a diagram illustrating an operation, performed by the server device, of providing recommended scenarios related to operations of the home appliances, according to an embodiment of the disclosure.

According to an embodiment of the disclosure, the server device 2000 may create a recommended scenario list 2700 including various recommended scenarios related to the home appliances in the house. According to an embodiment of the disclosure, the server device 2000 may create various recommended scenarios by using IF This Then That (IF-TTT).

According to an embodiment of the disclosure, the server device 2000 may create various recommended scenarios considering the utilization of the user. For example, the server device 2000 may create a recommended scenario based on information about the number of times the user uses a home appliance, context information of the user collected from a mobile terminal of the user (e.g., information about a time slot during which the user mainly stays in the house, information about a space where the user mainly stays in the house), family information (e.g., the number of family members, whether the user has a baby or a companion animal, etc.), information about scenarios selected by other users, and the like.

Referring to FIG. 27, the server device 2000 matches the power of the cleaning robot 1000 to the power of an air conditioner, to create a first recommended scenario 2701, which is 'The power of the air conditioner is turned off when the power of the cleaning robot 1000 is turned on'. In addition, the server device 2000 matches a call function of a mobile terminal to the power of the cleaning robot 1000, to create a second recommended scenario 2702, which is 'The power of the cleaning robot 1000 is turned off when you get a call'. The server device 2000 may match weather information to the operation mode of the air conditioner, to create a third recommended scenario 2703, which is 'The air conditioner is operated in a dehumidifying mode on a rainy day'.

Figure 28:
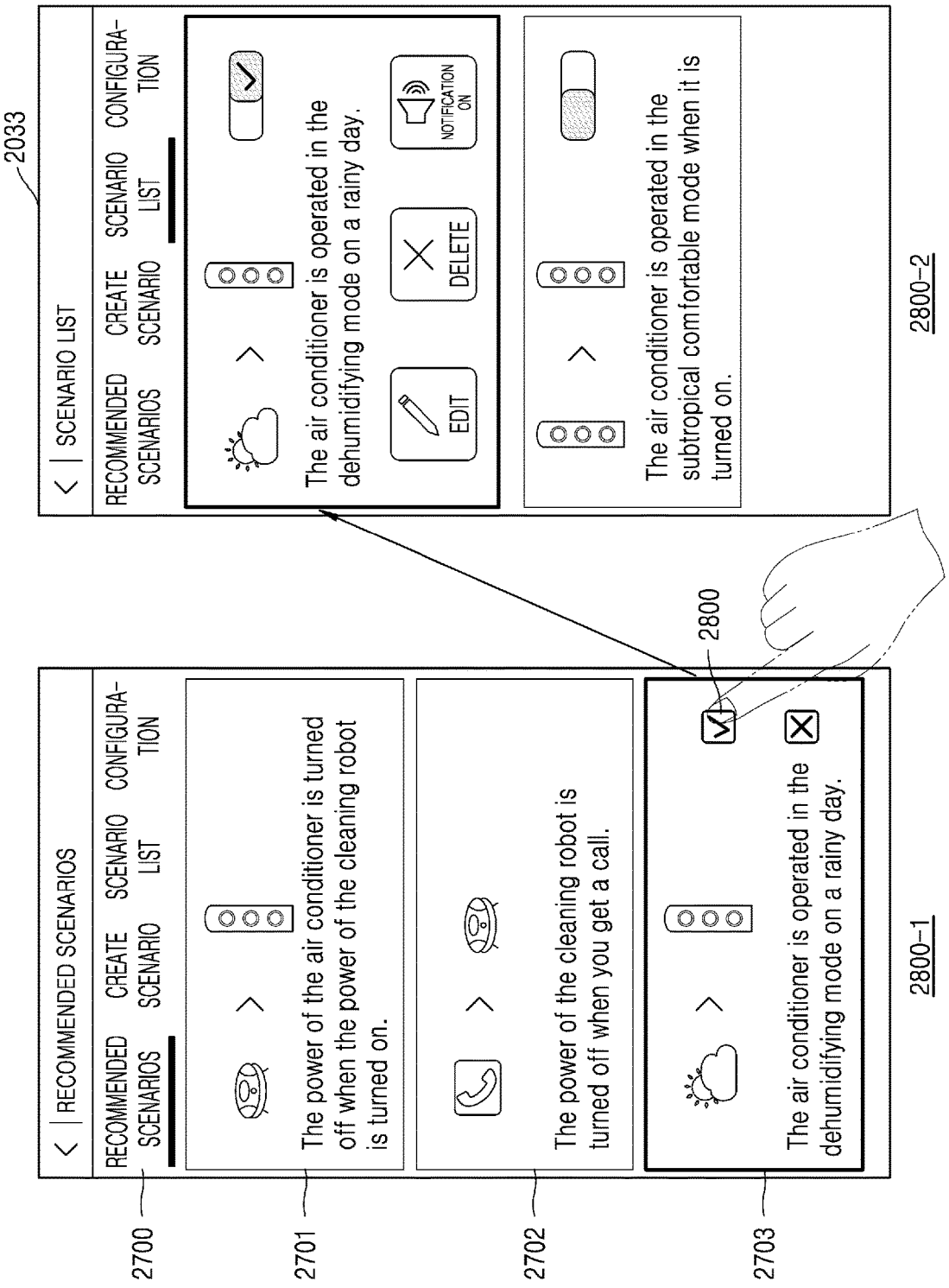
FIG. 28 is a diagram illustrating an operation, performed by a server device, of adding a recommended scenario to a scenario list, according to an embodiment of the disclosure.

FIG. 28 is a diagram illustrating an operation, performed by the server device, of adding a recommended scenario to a scenario list, according to an embodiment of the disclosure.

Referring to 2800-1 of FIG. 28, according to an embodiment of the disclosure, the server device 2000 may provide the recommended scenario list 2700 to the user through the execution window of the predefined application installed in the display device 3000. The server device 2000 may receive a user input 2800 of selecting the third recommended scenario 2703 from the recommended scenario list 2700, through the execution window of the predefined application installed in the display device 3000.

Referring to 2800-2 of FIG. 28, when the server device 2000 receives the user input 2800 of selecting the third recommended scenario 2703 from the recommended scenario list 2700, the server device 2000 may add the third recommended scenario 2703 to the scenario list 2033. Thereafter, the user may find the third recommended scenario 2703 in the scenario list 2033. Through the execution window of the predefined application, the user may modify the third recommended scenario 2703, delete the third recommended scenario 2703 from the scenario list 2033, or receive a notification when the third recommended scenario 2703 is executed.

According to an embodiment of the disclosure, when the server device 2000 creates recommended scenarios considering the utilization of the user and provides the recommended scenarios to the user, the user may select and use a useful scenario. Hereinafter, the scenario setting window through which the user directly sets a scenario in which a certain condition is matched to an operation of a home appliance will be described with reference to FIG. 29.

Figure 29:
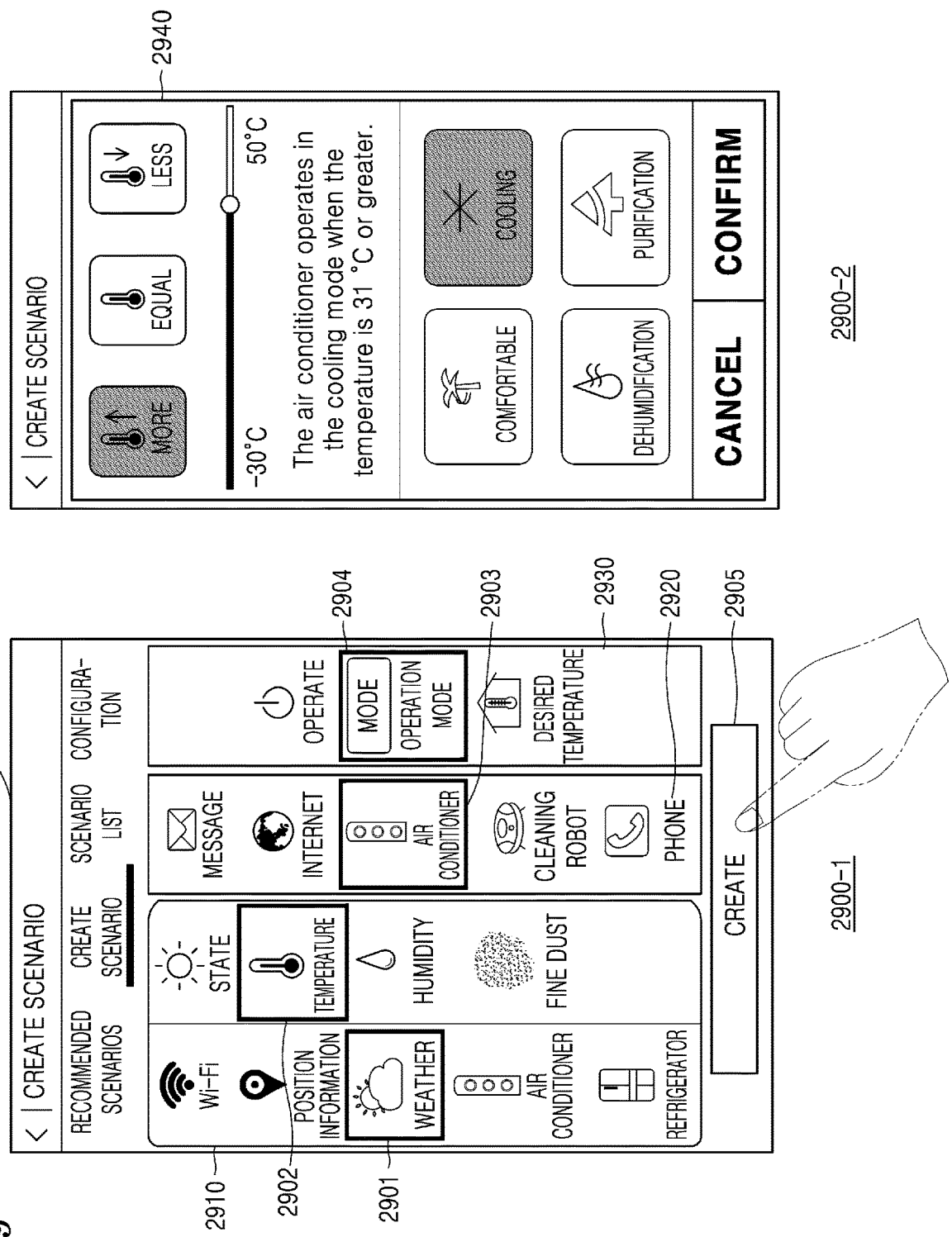
FIG. 29 is a diagram illustrating an operation, performed by a server device, of receiving an input of setting a scenario in which a certain condition is matched to an operation of a home appliance, through a scenario setting window, according to an embodiment of the disclosure.

FIG. 29 is a diagram illustrating an operation, performed by the server device 2000, of receiving an input of setting a scenario in which a certain condition is matched to an operation of a home appliance, through a scenario setting window 2900, according to an embodiment of the disclosure.

Referring to 2900-1 of FIG. 29, the scenario setting window 2900 may include a condition list 2910, a control target device list 2920, and an operation list 2930. The user may check the scenario setting window 2900, and make an input of selecting a weather item 2901 and a temperature item 2902 from the condition list 2910, selecting an air conditioner item 2903 from the control target device list 2920, and selecting an operation mode item 2904 from the operation list 2930, so as to directly set a scenario. In addition, when the user presses a create icon 2905, a pop-up window 2940 for setting a scenario in detail may be displayed on the scenario setting window 2900.

Referring to FIG. 2900-2, the user may set the temperature to 31° C. and select the operation mode of the air conditioner as 'cooling mode', in the pop-up window 2940. In this case, a scenario, which is 'The air conditioner operates in the cooling mode when the temperature is 31° C. or greater', may be newly created. The server device 2000 may add the newly created scenario (i.e., 'The air conditioner operates in the cooling mode when the temperature is 31° C. or greater') to the scenario list 2033.

Thereafter, when the indoor temperature is 31° C. or greater, the server device 2000 monitoring the indoor temperature based on sensor values collected from the home appliances may extract a control command to 'operate in the cooling mode' based on the scenario. In addition, the server device 2000 may transmit the extracted control command (i.e., 'operate in the cooling mode') to the air conditioner. In this case, the air conditioner may operate in the cooling mode according to the control command.

According to an embodiment of the disclosure, by creating a scenario in which an operation of a home appliance is matched to a predefined condition, the home appliance may automatically operate when the predefined condition is satisfied.

Figure 30:
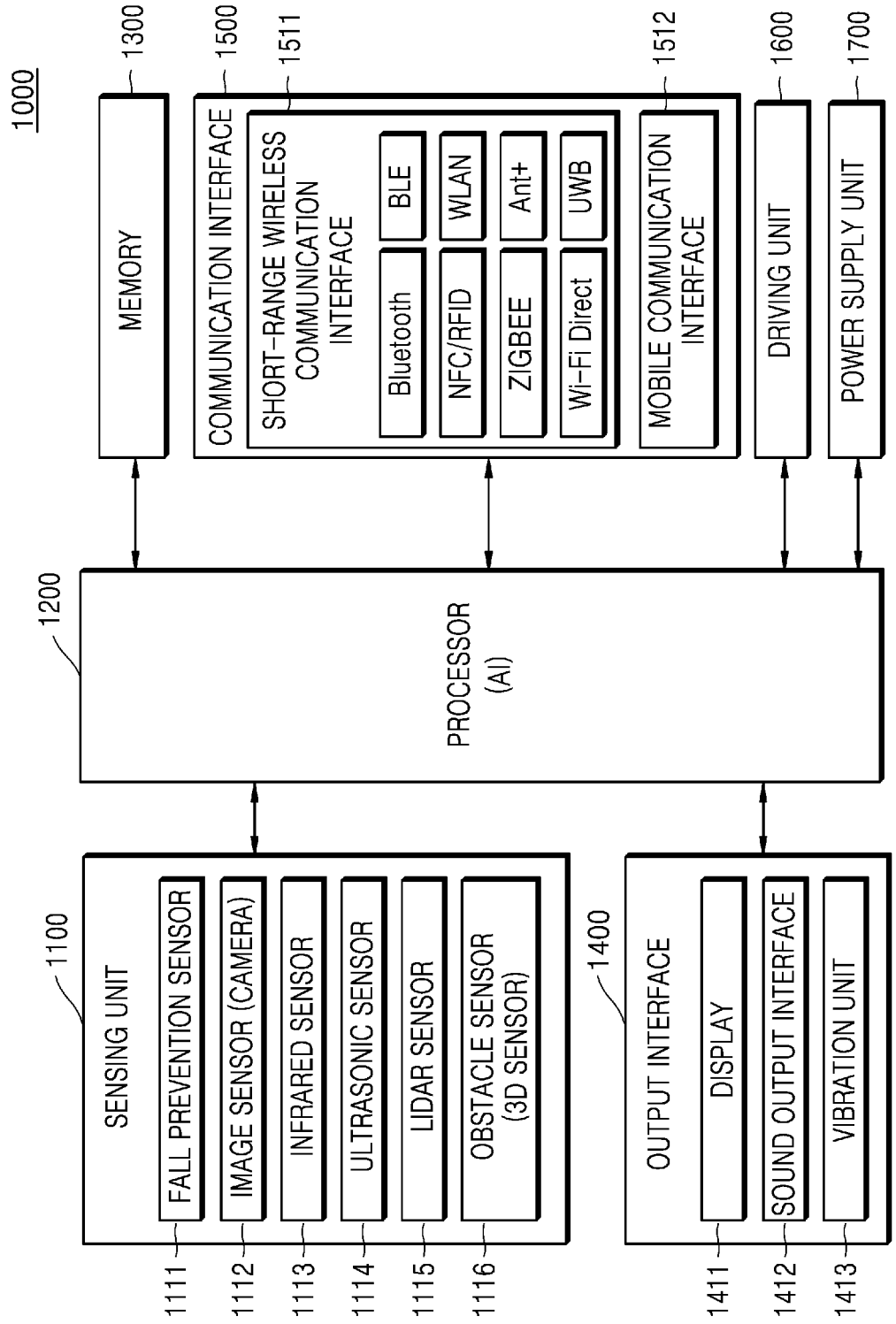
FIG. 30 is a block diagram illustrating a function of a cleaning robot, according to an embodiment of the disclosure.

FIG. 30 is a block diagram illustrating a function of the cleaning robot 1000, according to an embodiment of the disclosure.

Referring to FIG. 23, the cleaning robot 1000 may include a sensing unit 1100, a processor 1200, a memory 1300, an output interface 1400, a communication interface 1500, a driving unit 1600, and a power supply unit 1700. However, all components shown in FIG. 30 are not indispensable components of the cleaning robot 1000. The cleaning robot 1000 may be implemented by more components than the components shown in FIG. 30, or by fewer components than the components shown in FIG. 30. The respective components will be described below.

The sensing unit 1100 may include a plurality of sensors configured to detect information about an environment around the cleaning robot 1000. For example, the sensing unit 1100 may include, but is not limited to, a fall prevention sensor 1111, an image sensor (e.g., a camera) 1112 (for example, a stereo camera, a mono camera, a wide-angle camera, an around-view camera, a 3D vision sensor, etc.), an infrared sensor 1113, an ultrasonic sensor 1114, a lidar sensor 1115, an obstacle sensor (e.g., a 3D sensor) 1116, a mileage sensor (not shown), and the like. The mileage sensor may include a rotation detection sensor configured to calculate a rotation speed of a wheel. For example, the rotation detection sensor may be an encoder installed to detect a rotation speed of a motor. According to an embodiment, a plurality of image sensors (e.g., cameras) 1112 may be arranged in the cleaning robot 1000. Because the functions of the respective sensors may be intuitively inferred from their names, detailed descriptions thereof are omitted.

According to an embodiment of the disclosure, the sensing unit 1100 may be used to generate the indoor space map 500. For example, the cleaning robot 1000 may generate the indoor space map 500 by using at least one of the camera 1112, the ultrasonic sensor 1114, the lidar sensor 1115, or the obstacle sensor (e.g., a 3D sensor) 1116.

The processor 1200 may generally control the overall operation of the cleaning robot 1000. The processor 1200 may control the sensing unit 1100, the output interface 1400, the communication interface 1500, the driving unit 1600, and the power supply unit 1700 by executing programs stored in a storage unit 160.

According to an embodiment of the disclosure, the processor 1200 may include an artificial intelligence (AI) processor. In this case, the AI processor may divide at least one cleanable area into a plurality of partial areas according to a cleaning mode by using a learning network model of an AI system. The AI processor may also plan a cleaning route according to a cleaning mode.

The AI processor may be manufactured in the form of a dedicated hardware chip for AI, or may be manufactured as part of an existing general-purpose processor (e.g., a CPU or an application processor) or a dedicated graphics processor (e.g., a GPU) and mounted on the cleaning robot 1000.

The processor 1200 may be responsible for cleaning driving such as determining the moving direction of the cleaning robot 1000, position recognition, and automatic charging of a battery. For example, the processor 1200 may perform control such that the battery waits in a state of being connected to an external charging device when the battery is not in operation, so as to maintain a battery level within a preset range. When a charge request and a signal are input from a battery level detection unit at the time of operation completion or during operation, the processor 1200 may control the driving unit 1600 to return to the external charging device.

The memory 1300 may store programs for processing and control by the processor 1200 and may store input or output data (e.g., the indoor space map 500, a cleaning route, the scenario list 2033, and the like). The memory 1300 may also store an AI model.

The memory 1300 may include at least one of a flash memory-type storage medium, a hard disk-type storage medium, a multimedia card micro-type storage medium, card-type memory (e.g., secure digital (SD) or xD-picture card (XD) memory), random access memory (RAM), static random-access memory (SRAM), read-only memory (ROM), electrically erasable programmable read-only memory (EEPROM), programmable read-only memory (PROM), magnetic memory, a magnetic disc, or an optical disc. In addition, the cleaning robot 1000 may operate a web storage or a cloud server configured to perform a storage function on the Internet.

The output interface 1400 is for outputting an audio signal, a video signal, or a vibration signal, and may include a display 1411, a sound output interface 1412, and a vibration unit 1413.

The display 1411 may display information that is processed in the cleaning robot 1000. For example, the display 1411 may display a current position of the cleaning robot 1000, may display a cleaning mode of the cleaning robot 1000, or may display a cleaning state (e.g., a progress rate), a charging state (e.g., a remaining battery level), and the like, but is not limited thereto. The display 1411 may also display a user interface (UI) or a graphical UI (GUI) associated with a mode setting.

Meanwhile, when the display 1411 and a touch pad form a layered structure to constitute a touch screen, the display 1411 may also be used as an input device as well as an output device. The display 1411 may include at least one of a liquid crystal display (LCD), a thin-film transistor-liquid crystal display (TFT-LCD), an organic light-emitting diode (OLED), a flexible display, a 3D display, or an electrophoretic display. The cleaning robot 1000 may include two or more displays 1411 according to the implementation of the cleaning robot 1000.

The sound output interface 1412 may output audio data received from the communication interface 1500 or stored in the memory 1300. In addition, the sound output interface 1412 may output a sound signal associated with a function performed by the cleaning robot 1000. For example, the sound output interface 1412 may output a voice message notifying of completion of cleaning. The sound output interface 1412 may include a speaker, a buzzer, and the like.

The vibration unit 1413 may output a vibration signal. For example, the vibration unit 1413 may output a vibration signal corresponding to output of audio data or video data (e.g., a warning message or the like).

The communication interface 1500 may include at least one antenna for wirelessly communicating with another device (e.g., the server device 2000, the display device 3000, and the plurality of home appliances 4000). For example, the communication interface 1500 may include one or more components configured to enable communication between the cleaning robot 1000 and the server device 2000 or between the cleaning robot 1000 and the plurality of home appliances 4000. For example, the communication interface 1500 may include, but is not limited to, a short-range wireless communication interface 1511, and the like.

The short-range wireless communication interface 1511 may include, but is not limited to, a Bluetooth communication interface, a Bluetooth low energy (BLE) communication interface, a near field communication interface (NFC), a WLAN (Wi-Fi) communication interface, a Zigbee communication interface, an infrared data association (IrDA) communication interface, a Wi-Fi direct (WFD) communication interface, an ultra wideband (UWB) communication interface, an Ant+ communication interface, a microwave (uWave) communication interface, etc.

A mobile communication unit 1512 may transmit or receive a wireless signal with at least one of a base station, an external terminal, or a server, over a mobile communication network. Here, the wireless signal may include a voice call signal, a video call signal, or various types of data according to text/multimedia message transmission and reception.

According to an embodiment of the disclosure, the communication interface 1500 of the cleaning robot 1000 may receive a control command from one of the server device 2000 or the plurality of home appliances 4000. The communication interface 1500 of the cleaning robot 1000 may also transmit a cleaning operation execution result to one of the plurality of home appliances 4000. For example, the cleaning operation execution result may include information such as 'Cleaning completed', 'Cleaning stopped, 'Cleaning partially completed', etc., but is not limited thereto.

According to an embodiment of the disclosure, the communication interface 1500 of the cleaning robot 1000 may receive the scenario list 2033 from the server device 2000, and may transmit a scenario to one of the plurality of home appliances 4000.

According to an embodiment of the disclosure, the communication interface 1500 of the cleaning robot 1000 may request one of the plurality of home appliances 4000 to perform distributed processing while transmitting image information or sensing information thereto, and may receive a distributed processing result from one of the plurality of home appliances 4000.

The driving unit 1600 may include component used for driving (operating) of the cleaning robot 1000 and operations of devices inside the cleaning robot 1000. The driving unit 1600 may include, but is not limited to, a suction unit, a driving unit, and the like. The suction unit may function to collect dust on the floor while suctioning air, and may include, but is not limited to, a rotation brush or broom, a rotation brush motor, an air suction port, a filter, a dust collecting chamber, an air discharge port, and the like. The suction unit may additionally be mounted in a structure in which a brush capable of sweeping out dust from a corner is rotatable.

The driving unit may include, but is not limited to, two front wheels on both sides of the front, two rear wheels on both sides of the rear, motors respectively configured to rotate and drive the two rear wheels, timing belts configured to transfer powers generated from the two rear wheels to the two front wheels, and the like.

According to an embodiment of the disclosure, the cleaning robot 1000 may include an input unit (not shown). The input unit refers to a device through which the user inputs data for controlling the cleaning robot 1000. For example, the input unit may be, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezo effect-type touch pad), a jog wheel, a jog switch, or the like.

Figure 31:
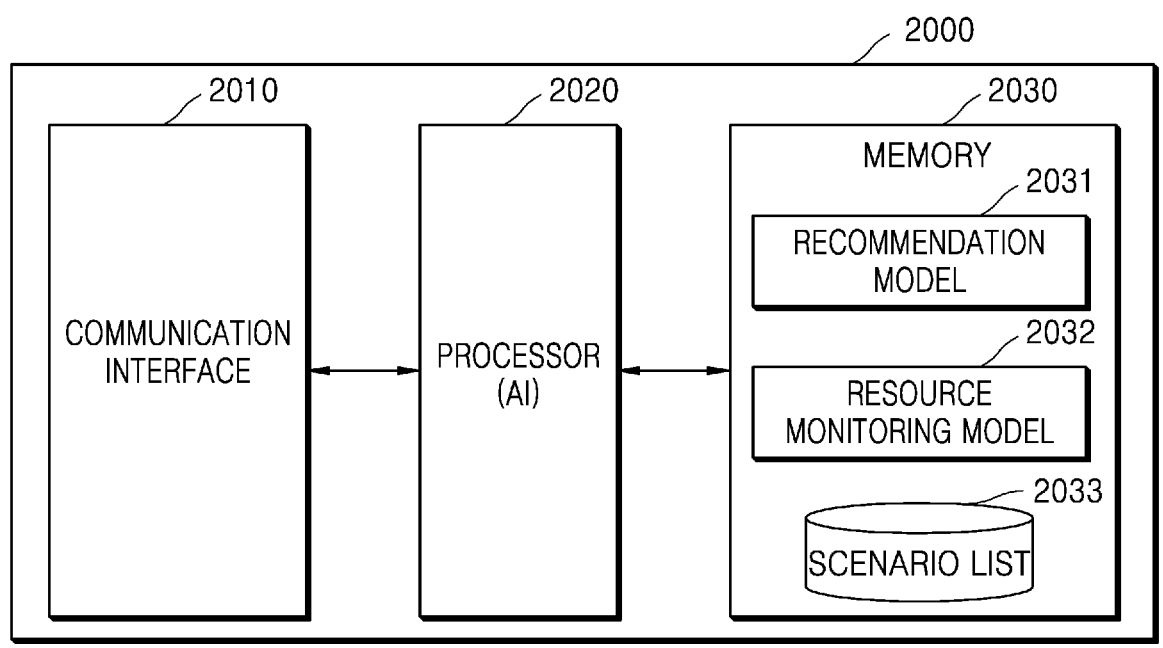
FIG. 31 is a block diagram illustrating a function of a server device, according to an embodiment of the disclosure.

FIG. 31 is a block diagram illustrating a function of the server device 2000, according to an embodiment of the disclosure.

Referring to FIG. 31, the server device 2000 may include a communication interface 2010, a processor 2020, and a memory 2030. However, all components shown in FIG. 31 are not indispensable components of the server device 2000. The server device 2000 may be implemented by more components than the components shown in FIG. 31, or by fewer components than the components shown in FIG. 31.

The respective components will be described below.

The communication interface 2010 may include one or more components configured to enable communication between the server device 2000 and the cleaning robot 1000, between the server device 2000 and home appliances (e.g., the home appliances of the first group 4100), or between the server device 2000 and the display device 3000.

According to an embodiment of the disclosure, the communication interface 2010 may receive a first user input related to the cleaning robot 1000 through a first home appliance. The communication interface 2010 may receive information about the first user input (e.g., an input type, an input time, etc.) from the first home appliance, thereby receiving the first user input through the first home appliance. Here, the first home appliance may be one of the home appliances of the first group 4100 which are connected to the server device 2000.

The first user input may be an input related to an idle button of the first home appliance, which is not matched to at least one function provided by the first home appliance. For example, in the case where the first home appliance is an air conditioner, a first manipulation of touching a wind speed button of the air conditioner three times, a second manipulation of pressing a power button for 3 seconds or longer, a third manipulation of simultaneously touching a wind direction button and a reservation button, etc. may not be matched to functions basically provided by the air conditioner. In this case, the first manipulation, the second manipulation, and the third manipulation of the air conditioner may be inputs related to the idle button of the air conditioner.

According to an embodiment of the disclosure, the communication interface 2010 may transmit a control command to the cleaning robot 1000. The control command may include movement position information, operation mode information, and the like of the cleaning robot 1000. For example, the control command may include a command to clean a first area within a preset distance from the first home appliance. The communication interface 2010 may receive a cleaning completion message from the cleaning robot 1000, and transmit, to the first home appliance, the cleaning completion message for the first area.

According to an embodiment of the disclosure, the communication interface 2010 may receive, from the home appliances, information related to current resource states (e.g., a currently used CPU state or RAM state). Resources may include, but are not limited to, a CPU, a memory, power, a storage, network resources, and like. The communication interface 2010 may receive sensor values obtained from the home appliances. The sensor value may be, but is not limited to, a fine dust sensor value, a temperature value, a humidity value, a noise value, an illuminance value, etc.

When registering the home appliances in the server device 2000, the communication interface 2010 may receive, from the home appliances, information about a key (hereinafter referred to as a fixed key or a fixed button) preset according to original functions of the home appliances. The communication interface 2010 may also receive, from the cleaning robot 1000, information about fixing buttons of identification information of the home appliances of the second group 4200, which are not connected to the server device 2000.

The processor 2020 may control the overall operation of the server device 2000 by using a program or information stored in the memory 2030.

According to an embodiment of the disclosure, the processor 2020 may identify the first scenario corresponding to the first user input from the scenario list 2033 defining the operations of the cleaning robot 1000. The processor 2020 may extract a control command including movement position information of the cleaning robot 1000, based on the first scenario. The processor 2020 may transmit the extracted control command to the cleaning robot 1000 through the communication interface 2010.

According to an embodiment of the disclosure, the processor 2020 may obtain information about idle buttons of at least one home appliance. The processor 2020 may provide a plurality of recommended scenarios in which the idle buttons of the at least one home appliance are matched to at least one operation of the cleaning robot 1000, to the user through the display device 3000.

According to an embodiment of the disclosure, the processor 2020 may receive, through the display device 3000, an input of selecting a second scenario related to an idle button of a second home appliance from among the plurality of recommended scenarios, and add the second scenario to the scenario list 2033.

According to an embodiment of the disclosure, the processor 2020 may provide the display device 3000 with a scenario setting window including a home appliance list, an idle button list, and an operation list of the cleaning robot 1000. The processor 2020 may receive an input of setting a third scenario related to an idle button of a third home appliance, through the scenario setting window. In this case, the processor 2020 may add the third scenario to the scenario list 2033.

According to an embodiment of the disclosure, the processor 2020 may obtain idle button information of the fourth home appliance which is not connected to the server device 2000, from the cleaning robot 1000 through the communication interface 2010. In this case, the processor 2020 may add identification information of the fourth home appliance and the idle button information of the fourth home appliance, to the scenario setting window.

According to an embodiment of the disclosure, the processor 2020 may receive a distributed processing request on at least one of image information or sensing information, from the cleaning robot 1000 through the communication interface 2010. In this case, the processor 2020 may check idle resource information of the plurality of home appliances according to the distributed processing request. The processor 2020 may select a fifth home appliance from among the plurality of home appliances, based on the idle resource information of the plurality of home appliances. For example, the processor 2020 may select the fifth home appliance by using a resource monitoring model 2032. The processor 2020 may request the fifth home appliance to perform distributed processing for at least one of the image information or the sensing information, through the communication interface 2010.

The processor 2020 may receive a distributed processing result for the at least one of the image information or the sensing information, from the fifth home appliance through the communication interface 2010. In this case, the processor 2020 may transmit the distributed processing result for the at least one of the image information or the sensing information to the cleaning robot 1000 through the communication interface 2010.

The memory 2030 may store a program for processing by the processor 2020 or may store input/output data. For example, the memory 2030 may store a recommendation model 2031, the resource monitoring model 2032, and the scenario list 2033.

The recommendation model 2031 may be an AI model for creating a recommended scenario. The recommendation model 2031 may create a plurality of recommended scenarios by using idle buttons of at least one home appliance. For example, the recommendation model 2031 may create the plurality of recommended scenarios by matching the idle buttons of the at least one home appliance to at least one operation of the cleaning robot 1000.

The recommendation model 2031 may create a recommended scenario considering the utilization of the user. For example, the recommendation model 2031 may create a recommended scenario based on information about the number of times the user uses a home appliance, context information of the user collected from a mobile terminal of the user (e.g., information about a space where the user mainly stays in the house), information about scenarios selected by other users, and the like.

The resource monitoring model 2032 may be an AI model for monitoring resource states of the home appliances connected to the server device 2000. For example, the resource monitoring model 2032 may monitor a CPU state or a RAM state currently used by the home appliances connected to the server device 2000, and may determine idle resources of the home appliances connected to the server device 2000.

The scenario list 2033 may include at least one scenario in which an idle button of at least one home appliance is matched to at least one operation of the cleaning robot 1000. The scenario list 2033 may include a scenario which is approved by the user in advance. For example, the scenario list 2033 may include a scenario selected by the user from among scenarios recommended by the server device 2000 or a scenario which is set by the user.

The method according to an embodiment of the disclosure may be embodied as program commands executable by various computer devices, and recorded on a computer-readable medium. The computer-readable medium may include program commands, data files, data structures, or the like separately or in combinations. The program commands to be recorded on the medium may be specially designed and configured for the disclosure or may be well-known to and be usable by one of ordinary skill in the art of computer software. Examples of the computer-readable recording medium include magnetic media such as hard disks, floppy disks, or magnetic tapes, optical media such as CD-ROMs or DVDs, magneto-optical media such as floptical disks, and hardware devices such as ROMs, RAMs, flash memories, or the like that are specially configured to store and execute program commands. Examples of the program commands include not only machine code, such as code made by a compiler, but also high-level language code that is executable by a computer by using an interpreter or the like.

Some embodiments of the disclosure may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium typically includes computer-readable instructions, data structures, program modules, other data of a modulated data signal, or other transmission mechanisms, and examples thereof include an arbitrary information transmission medium. Also, some embodiments of the disclosure may be implemented as a computer program or a computer program product including computer-executable instructions such as a computer program executed by a computer.

A machine-readable storage medium may be provided in the form of a non-transitory storage medium. The term 'non-transitory' merely means that the storage medium does not include a signal but is tangible, and does not distinguish whether data is stored semi-permanently or temporarily on the storage medium. For example, the non-transitory storage medium may include a buffer in which data is temporarily stored.

The method according to an embodiment of the disclosure may be included in a computer program product to be provided. The computer program product may be traded between a seller and a purchaser as a commodity. The computer program product may be distributed in the form of a machine-readable storage medium (e.g., compact disk read only memory (CD-ROM)), or may be distributed online (e.g., downloaded or uploaded) through an application store or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

Although embodiments of the disclosure have been described above in detail, the scope of the disclosure is not limited thereto, and various modifications and alterations by one of ordinary skill in the art using the basic concept of the disclosure defined in the following claims also fall within the scope of the disclosure.

The invention claimed is:

1. A method, performed by a server device, of controlling a cleaning robot, the method comprising:
   receiving, by at least one processor of the server device, a first user input related to the cleaning robot, through a first home appliance, based on a user selecting an idle button associated with the cleaning robot on the first home appliance;
   identifying, by the at least one processor of the server device, a first scenario corresponding to the received first user input, from a scenario list defining operations of the cleaning robot, wherein a first scenario relates to the first home appliance and the scenario list includes scenarios that match idle buttons of at least one home appliance with operations of the cleaning robot;
   identifying, by the at least one processor of the server device, a control command including movement position information indicating a destination of the cleaning robot from the identified first scenario; and
   transmitting, by the at least one processor of the server device, the identified control command to the cleaning robot.

2. The method of claim 1, wherein the idle button is not matched to an original function provided by the first home appliance.

3. The method of claim 2, wherein the first scenario comprises at least one operation of the cleaning robot, the at least one operation corresponding to the input related to the idle button of the first home appliance.

4. The method of claim 1, wherein
   the identified control command comprises a command to clean a first area within a preset distance from the first home appliance, and
   the method further comprises transmitting, to the first home appliance, a cleaning completion message with respect to the first area, according to a cleaning completion message of the cleaning robot.

5. The method of claim 1, further comprising:
   obtaining information about the idle buttons of at least one home appliance; and
   providing the user with a plurality of recommended scenarios in which each idle button of the idle buttons is matched to an operation of the cleaning robot, through a display device.

6. The method of claim 5, further comprising:
   receiving an input of selecting a second scenario related to an idle button of a second home appliance from among the plurality of recommended scenarios, through the display device; and
   adding the selected second scenario to the scenario list.

7. The method of claim 1, further comprising:
   providing a display device with a scenario setting window comprising a list of a plurality of home appliances, a list of idle buttons, and an operation list of the cleaning robot;
   receiving an input of setting a second scenario related to an idle button of a second home appliance, through the scenario setting window; and
   adding the second scenario to the scenario list.

8. The method of claim 7, wherein the providing a display device with a scenario setting window further comprises:
   obtaining, from the cleaning robot, idle button information of a third home appliance which is not connected to the server device; and
   adding, to the scenario setting window, identification information of the third home appliance and the obtained idle button information of the third home appliance.

9. The method of claim 1, further comprising:
   receiving, from the cleaning robot, a distributed processing request for at least one of image information or sensing information;
   checking idle resource information of a plurality of home appliances according to the received distributed processing request;

selecting a second home appliance from among the plurality of home appliances, based on the checked idle resource information of the plurality of home appliances; and requesting the selected second home appliance for distributed processing of the at least one of the image information or the sensing information.

10. The method of claim 9, further comprising:

receiving, from the second home appliance, a result of the distributed processing of the at least one of the image information or the sensing information; and transmitting, to the cleaning robot, the received result of the distributed processing of the at least one of the image information or the sensing information.

11. A server device comprising:

a communication interface configured to communicate with at least one home appliance and a cleaning robot;

a memory storing one or more instructions; and at least one processor connected to the memory, wherein the at least one processor is configured to execute the one or more instructions to:

receive a first user input related to the cleaning robot, through a first home appliance of the at least one home appliance, based on a user selecting an idle button associated with the cleaning robot on the first home appliance;

identify a first scenario corresponding to the received first user input, from a scenario list defining operations of the cleaning robot, wherein a first scenario relates to the first home appliance and the scenario list includes scenarios that match idle buttons of at least one home appliance with operations of the cleaning robot;

identify a control command including movement position information indicating a destination of the cleaning robot from the identified first scenario; and transmit the identified control command to the cleaning robot through the communication interface.

12. The server device of claim 11, wherein the idle button is not matched to an original function provided by the first home appliance.

13. The server device of claim 11, wherein the identified control command comprises a command to clean a first area within a preset distance from the first home appliance, and the at least one processor is further configured to execute the one or more instructions to transmit, to the first home appliance through the communication interface, a cleaning completion message with respect to the first area, according to a cleaning completion message of the cleaning robot.

14. The server device of claim 11, wherein the at least one processor is further configured to execute the one or more instructions to:

obtain information about the idle buttons of the at least one home appliance; and provide the user with a plurality of recommended scenarios in which each idle button of the idle buttons is matched to an operation of the cleaning robot, through a display device.

15. The server device of claim 14, wherein the at least one processor is further configured to execute the one or more instructions to:

receive an input of selecting a second scenario related to an idle button of a second home appliance from among the plurality of recommended scenarios, through the display device; and add the selected second scenario to the scenario list.

16. The server device of claim 11, wherein the at least one processor is further configured to execute the one or more instructions to:

provide a display device with a scenario setting window comprising a list of a plurality of home appliances, a list of idle buttons, and an operation list of the cleaning robot;

receive an input of setting a second scenario related to an idle button of a second home appliance, through the scenario setting window; and add the second scenario to the scenario list.

17. The server device of claim 16, wherein the at least one processor is further configured to execute the one or more instructions to:

obtain, from the cleaning robot through the communication interface, idle button information of a third home appliance which is not connected to the server device; and add, to the scenario setting window, identification information of the third home appliance and the idle button information of the third home appliance.

18. The server device of claim 11, wherein the at least one processor is further configured to execute the one or more instructions to:

receive, from the cleaning robot through the communication interface, a distributed processing request for at least one of image information or sensing information;

check idle resource information of a plurality of home appliances according to the received distributed processing request;

select a second home appliance from among the plurality of home appliances, based on the checked idle resource information of the plurality of home appliances; and request, through the communication interface, the selected second home appliance for distributed processing of the at least one of the image information or the sensing information.

19. The server device of claim 18, wherein the at least one processor is further configured to execute the one or more instructions to:

receive, from the second home appliance through the communication interface, a result of the distributed processing of the at least one of the image information and the sensing information; and transmit, to the cleaning robot through the communication interface, the received result of the distributed processing of the at least one of the image information or the sensing information.

20. A non-transitory computer-readable recording medium having stored therein a program that, when executed by at least one processor, causes a server device to:

receive a first user input related to a cleaning robot, through a first home appliance, based on a user selecting an idle button associated with the cleaning robot on the first home appliance;

identify a first scenario corresponding to the received first user input, from a scenario list defining operations of the cleaning robot, wherein a first scenario relates to the first home appliance and the scenario list includes scenarios that match idle buttons of at least one home appliance with operations of the cleaning robot;

identify a control command including movement position information of the cleaning robot from the identified first scenario; and transmit the identified control command to the cleaning robot.

\* \* \* \* \*